US005858269A

United States Patent [19]

Shinjo et al.

[11] Patent Number: 5,858,269
[45] Date of Patent: Jan. 12, 1999

[54] LIQUID CRYSTAL DEVICE AND LIQUID CRYSTAL APPARATUS

[75] Inventors: Kenji Shinjo; Koichi Sato, both of Atsugi; Masahiro Terada, Hadano; Syuji Yamada, Atsugi, all of Japan

[73] Assignee: Canon Kabushiki Kaisha, Tokyo, Japan

[21] Appl. No.: 715,632

[22] Filed: Sep. 18, 1996

[30] Foreign Application Priority Data

Sep. 20, 1995 [JP] Japan .................................... 7-264625
Sep. 20, 1995 [JP] Japan .................................... 7-264633

[51] Int. Cl.$^6$ ......................... C09K 19/52; G02F 1/1333
[52] U.S. Cl. ................................ 252/299.01; 252/299.4; 252/299.5; 349/127; 349/128; 349/136; 349/182; 428/1
[58] Field of Search ........................... 252/299.01, 299.2, 252/299.4, 299.5; 428/1; 349/182, 123, 127, 128, 136

[56] References Cited

U.S. PATENT DOCUMENTS

| 4,367,924 | 1/1983 | Clark et al. ................ 350/334 |
| 4,917,821 | 4/1990 | Mori et al. ................. 252/299.63 |
| 5,139,697 | 8/1992 | Togano et al. ............... 252/299.61 |
| 5,173,211 | 12/1992 | Yamashita et al. ............ 252/299.61 |
| 5,185,097 | 2/1993 | Toshida et al. .............. 252/299.01 |
| 5,189,536 | 2/1993 | Hanyu ete al. ............... 359/56 |
| 5,217,643 | 6/1993 | Yoshida et al. .............. 252/299.2 |
| 5,238,601 | 8/1993 | Shinjo et al. ............... 252/299.63 |
| 5,252,251 | 10/1993 | Sato et al. ................. 252/299.01 |
| 5,262,082 | 11/1993 | Janulis et al. .............. 252/299.01 |
| 5,364,559 | 11/1994 | Shinjo et al. ............... 252/299.6 |
| 5,391,318 | 2/1995 | Yamashita et al. ............ 252/299.61 |
| 5,424,004 | 6/1995 | Shinjo et al. ............... 252/299.61 |
| 5,437,812 | 8/1995 | Janulis et al. .............. 252/299.01 |
| 5,482,650 | 1/1996 | Janulis et al. .............. 252/299.01 |
| 5,658,491 | 8/1997 | Kistner et al. .............. 252/299.01 |

FOREIGN PATENT DOCUMENTS

| 0442499 | 8/1991 | European Pat. Off. . |
| 0641850 | 3/1995 | European Pat. Off. . |
| 0682098 | 11/1995 | European Pat. Off. . |
| 56-107216 | 8/1981 | Japan . |
| 59-193426 | 11/1984 | Japan . |
| 59-193427 | 11/1984 | Japan . |
| 60-156046 | 8/1985 | Japan . |
| 60-156047 | 8/1985 | Japan . |
| 3-252624 | 11/1991 | Japan . |
| 4-211492 | 8/1992 | Japan . |
| WO 93-022396 | 11/1993 | WIPO . |

OTHER PUBLICATIONS

M. Schadt and W. Helfrich, Applied Physics Letters, v. 18, No. 4 Feb. 151, 971, pp. 127–128.
A.D.L. Chandani et al., JJAP, v. 27, No. 5, May 1988, pp. 729–732.
Yoshida et al., Preprint of 13th Liquid Crystal Forum, (1987), pp. 142–143.
Marc D. Radcliffe et al., 4th Intl. Ferroelectric Liquid Crystal Conference, p. 46 (1993).
Structures and Properties of Ferroelectric Liquid Crystals (1990) by Hideo Takazoe, issued by Corona Publ. Co. Ltd., Tokyo.
Atsuo Fukuda (editor), Future Liquid Crystal Display and its Materials (1992), issued by K.K.C.M.C. Tokyo.

*Primary Examiner*—Shean C. Wo
*Attorney, Agent, or Firm*—Fitzpatrick, Cella, Harper & Scinto

[57] ABSTRACT

A liquid crystal device is constituted by a pair of substrates each having thereon at least an electrode and an alignment control layer, and a liquid crystal composition disposed between the substrates. At least one of the alignment control layers has a thickness of at most 200 Å or comprises polyimide. In the latter case, the pair of substrates have been subjected to mutually different aligning treatments. The liquid crystal composition comprises at least one species of a fluorine-containing mesomorphic compound in an amount of at least 70 wt. % comprising a fluorocarbon terminal portion and a hydrocarbon terminal portion, the terminal portions being connected with a central core, and having smectic mesophase or latent smectic mesophase, and comprises at least one species of a resistivity-modifying substance. The fluorine-containing mesomorphic compound comprises a compound having a fluorocarbon terminal portion containing at least one catenary ether oxygen atom in an amount of at least 30 wt. % based on the liquid crystal composition. The liquid crystal device is effective in improving switching characteristics, an alignment characteristic and display performances while retaining a bookshelf structure or a near bookshelf structure with respect to a smectic layer structure.

26 Claims, 9 Drawing Sheets

LIQUID CRYSTAL DEVICE AND LIQUID CRYSTAL APPARATUS

FIELD OF THE INVENTION AND RELATED ART

The present invention relates to a liquid crystal device including a chiral smectic liquid crystal composition used as, e.g., a light-valve for flat-panel displays, projection displays, printers, etc. The present invention also relates to a liquid crystal apparatus using the liquid crystal device.

There has been known a cathode ray tube (CRT) as a display device. The CRT has widely been used as a display terminal for outputting motion pictures of a television receiver or a video tape recording (VTR) apparatus or used as a monitor for a personal computer. However, the CRT encounters problems when outputs still images, in view of its characteristics, such that recognizability is liable to be lowered due to flickering and scanning fringes caused by an insufficient resolution and that degradation or deterioration of a fluorescent substance due to burning is caused to occur in some cases. In recent years, it has been found that an electromagnetic wave generated by the CRT adversely affects human body. As a result, the CRT can break health of video display terminal (VDT) operators in some cases. In addition, the CRT has a structure including a large volume behind a picture area (display portion), whereby space-saving utilization of an office or a house in which the CRT is used is hindered and there is a possibility that the CRT fails to sufficiently play a part in displays in an advanced information-oriented society.

Liquid crystal devices have been used as a display device having solved the above-mentioned problems of the CRT. For instance, there have been known liquid crystal devices using use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

One of the above-mentioned TN-type liquid crystal devices is a simple matrix-type liquid crystal device having the advantage of inexpensive production costs. When the liquid crystal device is driven by using an electrode matrix structure with an improved pixel density in accordance with a multiplex driving scheme, the liquid crystal device is liable to encounter a problem of occurrence of crosstalk, so that the number of pixels is restricted. Further, the uses of the device as a display device is also limited since the response speed is too slow, i.e., on the order of at least several ten milliseconds.

In recent years, there have been proposed liquid crystal devices using a thin film transistor (TFT). These liquid crystal devices can control a display state pixel by pixel since each pixel is provided with a transistor, whereby the devices solve problems of crosstalk and response speed. However, as these devices have a larger picture area, it is industrially more difficult to prepare a liquid crystal device with no defective pixels. Even if it is possible to prepare such a liquid crystal device, the device is more expensive.

To overcome the above-mentioned drawbacks of such conventional liquid crystal devices, the use of liquid crystal devices using a liquid crystal material having bistability has been proposed by Clark and Lagerwall (e.g. Japanese Laid-Open Patent Appln. (JP-A) No. 56-107216; U.S. Pat. No. 4,367,924, etc.). In this instance, as the liquid crystal material having bistability, a ferroelectric (or chiral smectic) liquid crystal having chiral smectic C-phase (SmC*) or H-phase (SmH*) is generally used. The ferroelectric liquid crystal can effect inversion switching due to its spontaneous polarization, thus showing a very high response speed. Further, the ferroelectric liquid crystal shows at least two stable states including bistable states providing a memory characteristic and is excellent in view angle characteristics, so that a liquid crystal device using a ferroelectric liquid crystal is considered suitable for a display device or light-valve having properties including high-speed responsiveness, high resolution and a large picture area. In recent years, there has been proposed an anti-ferroelectric chiral smectic liquid crystal device assuming three stable states, as described in "Japanese Journal of Applied Physics" vol. 27, p. L729 (1988) by Chanani and Takezoe et al.

In case where in such a liquid crystal device, a chiral smectic liquid crystal is aligned by using an ordinary polyimide alignment control film which has been subjected to rubbing, a resultant apparent tilt angle (a half of an angle formed by molecular axes providing two stable states) is generally at most 3–8 degrees, thus leading to a transmittance of 3–5%. As a result, such a liquid crystal device provides a considerably low contrast, i.e., a contrast ratio of about 10. Further, the contrast ratio is also lowered by occurrence of zig-zag alignment defects in some cases, as described in "Structures and Properties of Ferroelectric Liquid Crystals" (1990) by Atsuo Fukuda and Hideo Takezoe issued by Corona Publishing Co. Ltd. (Tokyo Japan). The zigzag defects may be attributable to a layer structure of a chiral smectic liquid crystal including two types of chevron layer structures between a pair of substrates.

Hanyu et al. (JP-A 3-252624 corr. to U.S. Pat. No. 5,189,536) has proposed a liquid crystal device free from zig-zag defects by increasing a pretilt angle of liquid crystal molecules at a bounary with an alignment control film and capable of providing a high contrast by increasing an apparent tilt angle. However, even when the liquid crystal device proposed by Hanyu et al is used, it is necessary to provide a tilt angle of 16 degrees in order to allow a good driving state. Accordingly, there is still room for further improvement in view of an ideal tilt angle (22.5 degrees) providing a maximum transmittance.

On the other hand, there has been recently proposed a layer structure of a (chiral smectic) liquid crystal wherein a high contrast ratio is intended to be realized by suppressing a chevron layer structure resulting in a low contrast ratio and providing the liquid crystal with a bookshelf layer structure (hereinafter referred to as "bookshelf structure") or with a structure closer to the bookshelf structure (e.g., Atsuo Fukuda (Editor)) "Future Liquid Crystal Display and Its Materials" (1992), issued by K. K. CMC (Tokyo Japan). One of methods for realizing a bookshelf structure is a method of using a naphthalene-based liquid crystal material. In this method, however, the resultant liquid crystal device has a tilt angle of about 10 degrees, which is much smaller than a tilt angle of 22.5 degrees which theoretically provides a maximum transmittance, thus resulting in a low transmittance. In addition, such a liquid crystal material fails to exhibit a bookshelf structure reversibly with respect to temperature in many cases. Another method for giving a bookshelf structure may include one inducing a bookshelf structure by externally applying an electric field to a liquid crystal device. Such a method, however, involves a problem of unstability against external stimuli such as a temperature fluctuation. In addition, various other problems to be solved are presumably present in order to put a liquid crystal material exhibiting a bookshelf structure into practical use since such a material has quite recently been discovered or proposed.

Further, in quite recent years, there have been proposed a mesomorphic (liquid crystal) compound having a perfluoroether terminal portion (U.S. Pat. No. 5,262,082 and International Publication No. WO93/22396) and a liquid crystal composition (Marc D. Radcliffe et al: The 4th International Ferroelectric Liquid Crystal Conference, P-46 (1993)) as materials exhibiting a bookshelf structure or a structure closer thereto. By using these liquid crystal materials, it is possible to provide a bookshelf structure or a structure showing a small layer inclination angle closer to the bookshelf structure without using external fields such as an external electric field. Accordingly, these liquid crystal materials are suitable for a liquid crystal device and display apparatus providing high speed responsiveness, high definition and large picture area.

However, these liquid crystal materials (compounds and compositions) still leave room for improvement in several characteristics, such as response speed, alignment characteristic, contrast and driving stability, singly or in combination thereof for the purpose of providing a high performance liquid crystal device or apparatus.

In case where a liquid crystal device using a conventinal liquid crystal composition showing a large spontaneous polarization (Ps) is actually driven continuously, i.e., liquid crystal molecules are repetitively switched, at high speed, a smectic layer structure of the liquid crystal composition is changed and broken in some cases. This leads to not only a lowering in display quality, such as an occurrence of display irregularity or an appearance of a display (switching) failure portion due to a local change in switching conditions but also loss of display functions in some cases.

Further, the liquid crystal device using a conventional liquid crystal composition showing a large spontaneous polarization (Ps) has caused switching failure due to reverse voltage within the liquid crystal devie in some cases as described in Preprint of the 13-th Liquid Crystal Forum, p. 142 (1987) by Yoshida et al. As a result, when a "black" image is rewritten in a "white" image by using such a device, a "blurring black" image is recognized as an after-image, thus resulting in a lowering in display quality.

Yoshida et al has proposed a liquid crystal device wherein an internal electric induced by switching of ferroelectric liquid crystal molecules is quickly attenuated by reducing a resistivity of a liquid crystal composition to provide a good bistability (JP-A 4-211492 corr. to U.S. Pat. No. 5,217,643).

However, the liquid crystal device using a liquid crystal composition is one described above providing a small apparent tilt angle leading to a low transmittance and a low contrast.

In case where a resistivity modifier described in JP-A 4-211492 is added in a liquid crystal composition used in JP-A 3-252624 to prepare a liquid crystal device providing a relatively larger apparent tilt angle, an alignment state of liquid crystal molecules is disordered and bistability thereof is lost.

SUMMARY OF THE INVENTION

An object of the present invention is to provide a liquid crystal device using a liquid crystal composition showing a layer structure of a bookshelf structure or a structure, having a small layer inclination angle, closer to the bookshelf structure, in order to realize a large-area chiral smectic liquid crystal device having improved properties such as high responsiveness, high contrast, high definition, high brightness, high reliability, high quality and high durability.

Another object of the present invention is to provide a liquid crystal apparatus using the liquid crystal device.

According to a first aspect of the present invention, there is provided a liquid crystal device, comprising: a pair of substrates each having thereon at least an electrode and an alignment control layer, and a liquid crystal composition disposed between the substrates, wherein at least one of the alignment control layers comprises polyimide, the pair of substrates have been subjected to mutually different aligning treatments, and the liquid crystal composition comprises at least one species of a fluorine-containing mesomorphic compound in an amount of at least 70 wt. % comprising a fluorocarbon terminal portion and a hydrocarbon terminal portion, the terminal portions being connected with a central core, and having smectic mesophase or latent smectic mesophase, and comprises at least one species of a resistivity-modifying substance, wherein the fluorine-containing mesomorphic compound comprises a compound having a fluorocarbon terminal portion containing at least one catenary ether oxygen atom in an amount of at least 30 wt. % based on the liquid crystal composition.

The liquid crystal device according to the first aspect of the present invention is particularly effective in improving drive characteristics substantially free from a layer structure-destroying phenomenon as mentioned above.

According to a second aspect of the present invention, there is provided a liquid crystal device, comprising: a pair of substrates each having thereon at least an electrode and an alignment control layer, and a liquid crystal composition disposed between the substrates, wherein at least one of the alignment control layers has a thickness of at most 200 Å, and the liquid crystal composition comprises at least one species of a fluorine-containing mesomorphic compound in an amount of at least 70 wt. % comprising a fluorocarbon terminal portion and a hydrocarbon terminal portion, the terminal portions being connected with a central core, and having smectic mesophase or latent smectic mesophase, and comprises at least one species of a resistivity-modifying substance, wherein the fluorine-containing mesomorphic compound comprises a compound having a fluorocarbon terminal portion containing at least one catenary ether oxygen atom in an amount of at least 30 wt. % based on the liquid crystal composition.

The liquid crystal device according to the second aspect of the present invention is particularly effective in improving drive characteristics substantially free from an after image phenomenon as mentioned above.

The present invention further provides liquid crystal apparatus including the above-mentioned liquid crystal devices, respectively.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
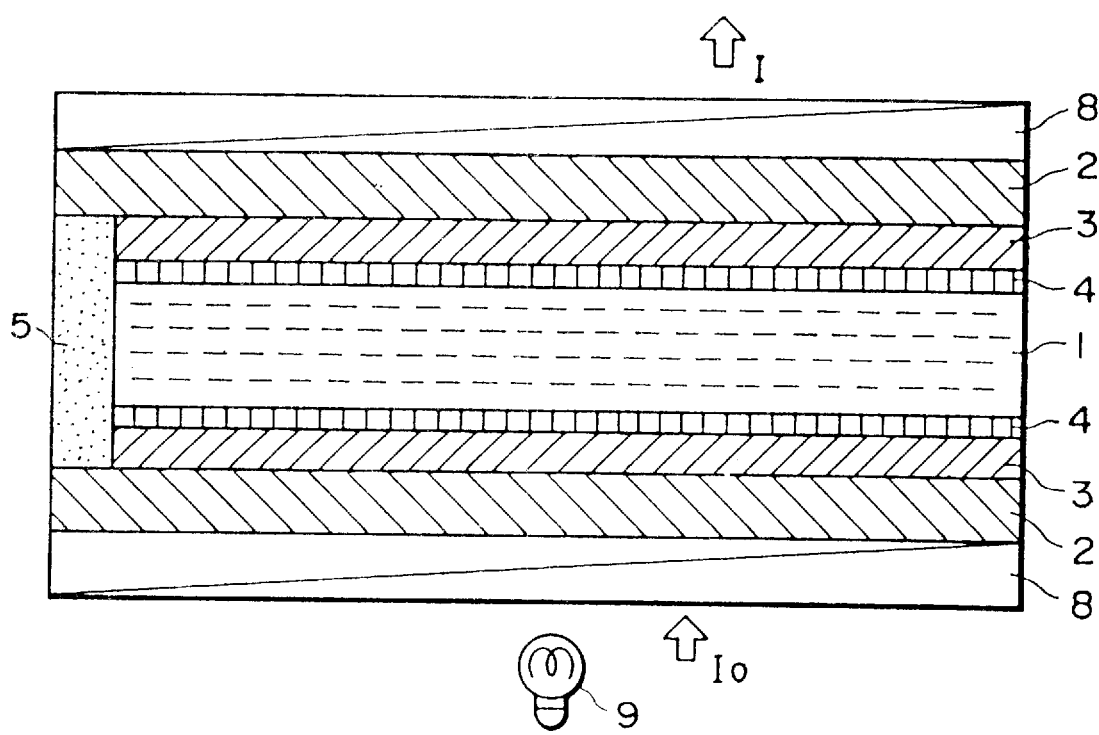
FIG. 1 is a schematic sectional view of an embodiment of a liquid crystal device according to the present invention.

The liquid crystal device according to the present invention is characterized by using a specific liquid crystal composition. The liquid crystal composition may preferably be a chiral smectic liquid crystal composition.

The liquid crystal composition used in the present invention comprises at least one species of a fluorine-containing mesomorphic compound, in an amount of at least 70 wt. % and at least one species of a resistivity-modifying substance as an electroconductive dopant.

The fluorine-containing mesomorphic compound comprises a compound having fluorocarbon terminal portion containing at least one catenary ether oxygen atom in an amount of at least 30 wt. %, preferably at least 50 wt. %, based on the liquid crystal composition in order to provide a bookshelf structure or a structure closer thereto having a small layer inclination angle.

Herein, the "catenary ether oxygen atom" means an ether oxygen atom present in a perfluoroether chain and located between adjacent carbon atoms.

The fluorine-containing mesomorphic compound comprises a fluorocarbon terminal portion, a hydrocarbon terminal portion, and a central core connecting the terminal portions and assumes a smectic (mesomorphic) phase or a latent smectic (mesomorphic) phase. Herein, the compound having a latent smectic mesophase (or latent smectic phase) means a compound not showing (exhibiting) a smectic (meso)phase by itself but showing a smectic (meso)phase when used together with a compound showing a smectic (meso)phase or another compound having a latent smectic (meso)phase under an appropriate condition.

The term "mesomorphic compound" used herein covers not only a compound assuming a mesomorphic phase (mesophase) but also a compound not assuming a mesomorphic phase per se as long as a liquid crystal composition containing such a compound assumes a mesomorphic phase.

In a preferred class of the fluorine-containing mesomorphic compound, the fluorocarbon terminal portion may preferably be:

a group represented by the formula $-D^1-C_{xa}F_{2xa}-X$, where xa is 1–20; X is —H or —F; $-D^1-$ is —CO—O—$(CH_2)_{ra}-$, —O—$(CH_2)_{ra}-$, —$(CH_2)_{ra}-$, —O—$SO_2-$, —$SO_2-$, —$SO_2-(CH_2)_{ra}-$, —O—$(CH_2)_{ra}$—O—$(CH_2)_{rb}-$, —$(CH_2)_{ra}-N(C_{pa}H_{2pa+1})-SO_2-$ or —$(CH_2)_{ra}-N(C_{pa}H_{2pa+1})-CO-$; where ra and rb are independently 1–20; and pa is 0–4; or a group having at least one catenary ether oxygen atom represented by $-D^2-(C_{xb}F_{2xb}-O)_{za}-C_{ya}F_{2ya+1}$, wherein xb is 1–10 independently for each ($C_{xb}F_{2xb}$—O); ya is 1–10; za is 1–10; $-D^2-$ is —CO—O—$C_{rc}H_{2rc}$, —O—$C_{rc}H_{2rc}-$ —$C_{rc}H_{2rc}-$, —O—$(C_{sa}H_{2sa}-O)_{ta}-C_{rd}H_{2rd}-$, —O—$SO_2-$, —$SO_2-$, —$SO_2-C_{rc}H_{2rc}-$, —$C_{rc}H_{2rc}-N(C_{pb}H_{2pb+1})-SO_2-$, —$C_{rc}H_{2rc}-N(C_{pb}H_{2pb+1})-CO-$, or a covalent bond, where rc and rd are independently 1–20; sa is independently 1–10 for each ($C_{sa}H_{2sa}$—O); ta is 1–6; and pb is 0–4.

In the case of a mesomorphic compound having a perfluoroalkyl-type terminal portion, the mesomorphic compound may preferably have a central core comprising at least two aromatic, heteroaromatic, cycloaliphatic, or substituted aromatic, heteroaromatic, or cycloaliphatic rings. The aromatic or heteroaromatic ring may be selected from fused aromatic, heteroaromatic, or non-fused aromatic or heteroaromatic rings, and the rings may be connected one with another by means of functional groups selected from —COO—, —COS—, —HC=N—, —COSe—. Heteroatoms within the heteroaromatic ring comprise at least one atom selected from N, O or S. The central core may preferably comprise a benzene ring and a pyrimidine ring.

In the case of a mesomorphic compound having a perfluoroalkyl ether-type terminal portion containing at least one catenary ether oxygen atom, the mesomorphic compound may preferably have a central core comprising at least two rings independently selected from aromatic, heteroaromatic, cycloaliphatic, or substituted aromatic, heteroaromatic, or cycloaliphatic rings, connected one with another by a covalent bond or by groups selected from —COO—, —COS—, —HC=N—, —COSe—. Rings may be fused or non-fused. Heteroatoms within the heteroaromatic ring comprise at least one atom selected from N, O or S. Non-adjacent methylene groups in cycloaliphatic rings may be substituted by O or S atoms. The central core may preferably comprise a benzene ring and a pyrimidine ring.

It is particularly preferred to use a fluorine-containing mesomorphic compound of the following general formula (I) having a perfluoroalkyl-type terminal portion or general formula (II) having a perfluoroether-type terminal portion (containing at least one catenary ether oxygen atom):

Formula (I):

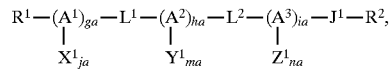

wherein $A^1$, $A^2$ and $A^3$ are each independently

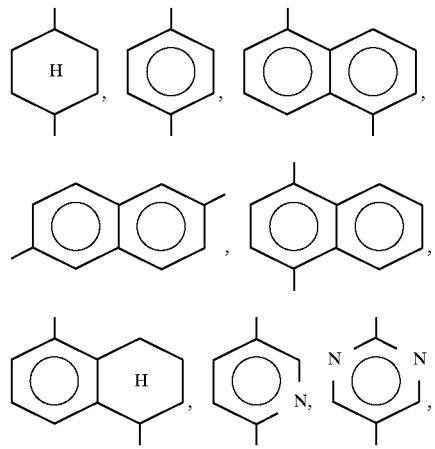

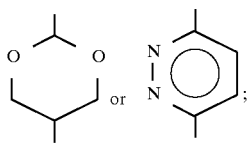

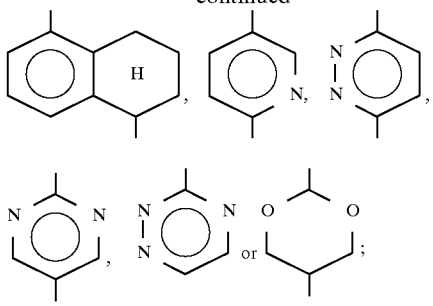

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C≡C—, —CH=N—, —N=CH—, —CH$_2$—O—, —O—CH$_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —OCH$_3$, —CH$_3$, —CN or —NO$_2$;

each ja, ma and na are independently an integer of 0–4;

$J^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO—; where ra and rb are independently 1–20, and pa is 0–4;

$R^1$ is —O—C$_{qa}$H$_{2qa}$—O—C$_{qb}$H$_{2qb+1}$, —C$_{qa}$H$_{2qa}$—O—C$_{qb}$H$_{2qb+1}$, —C$_{qa}$H$_{2qa}$—R$^3$, —O—C$_{qa}$H$_{21qa}$—R$^3$, —CO—O—C$_{qa}$H$_{2qa}$—R$^3$, or —O—CO—C$_{qa}$H$_{2qa}$—R$^3$ which may be either straight chain or branched; where $R^3$ is —O—CO—C$_{qb}$H$_{2qb+1}$, —CO—O—C$_{qb}$H$_{2qb+1}$, —H, —Cl, —F, —CF$_3$, —NO$_2$ or —CN; and qa and qb are independently 1–20;

$R^2$ is C$_{xa}$F$_{2xa}$—X, where X is —H or —F, xa is an integer of 1–20.

Formula (II):

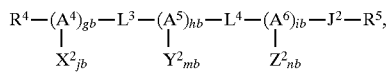

wherein $A^4$, $A^5$ and $A^6$ are each independently

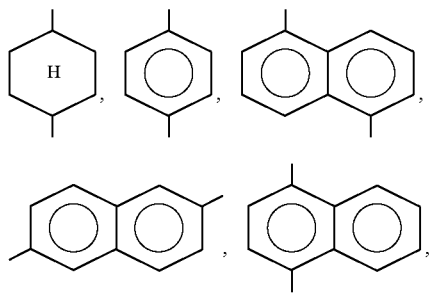

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$—(ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO—; rc and rd are independently 1–20; sa is independently 1–10 for each (C$_{sa}$H$_{2sa}$—O), ta is 1–6; pb is 0–4;

$R^4$ is —O—(C$_{qc}$H$_{2qc}$—O)$_{wa}$—C$_{qb}$H$_{2b+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched; $R^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

$R^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

A perfluoroalkyl-type mesomorphic compound as represented by the formula (I) may be synthesized through processes similar to those descried in JP-A (Kokai) 2-142753 and U.S. Pat. No. 5,082,587. Specific examples of such a mesomorphic compound of the formula (I) may include those (Example Compound Nos. I-1 to I-103) shown below.

I-1

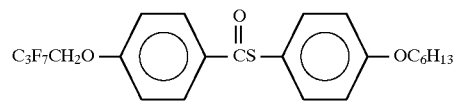

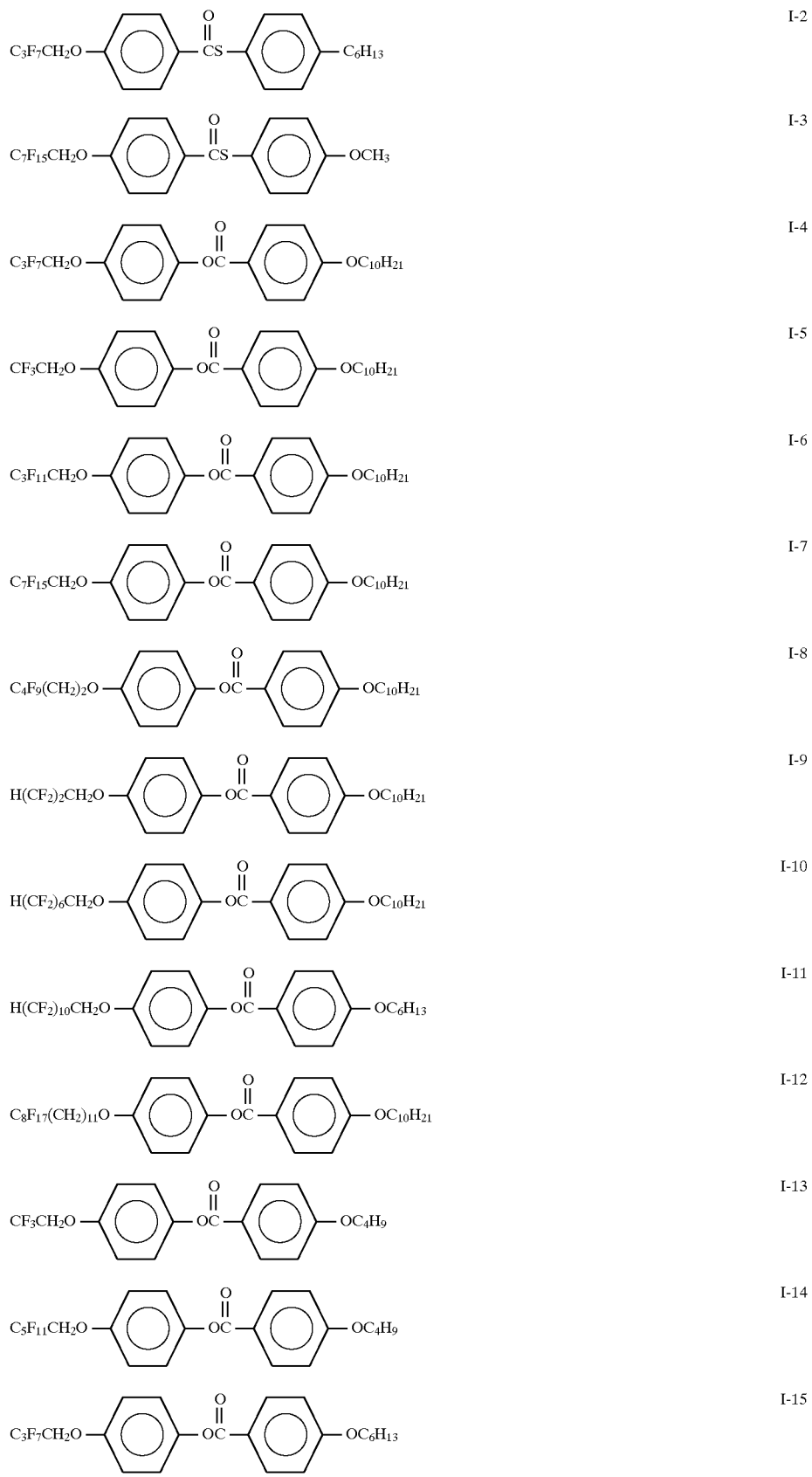

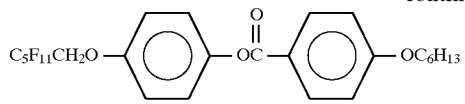
I-16
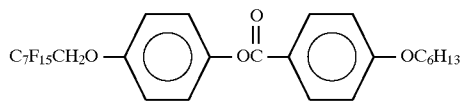
I-17
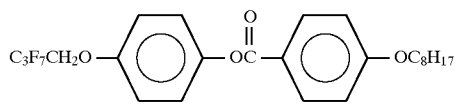
I-18
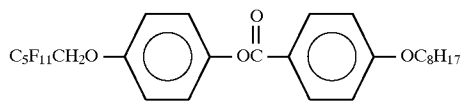
I-19
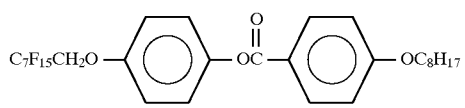
I-20
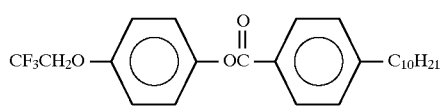
I-21
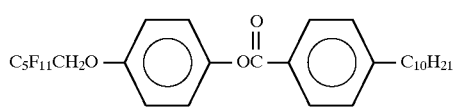
I-22
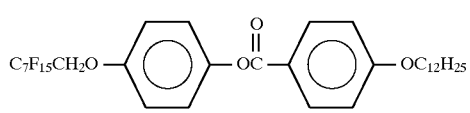
I-23
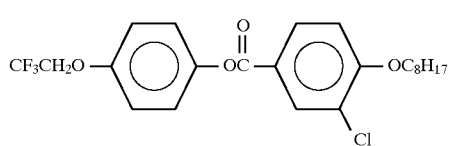
I-24
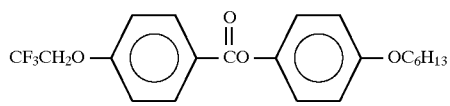
I-25
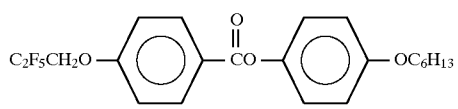
I-26
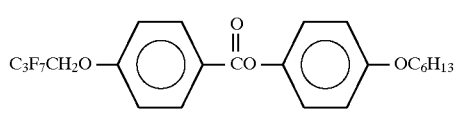
I-27
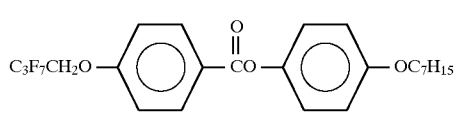
I-28
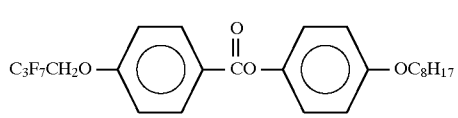
I-29

-continued
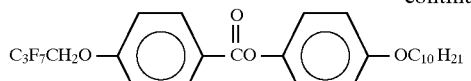
I-30
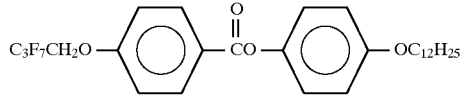
I-31
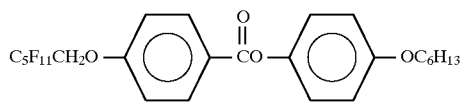
I-32
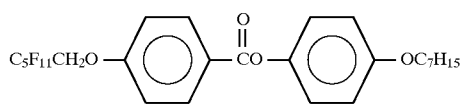
I-33
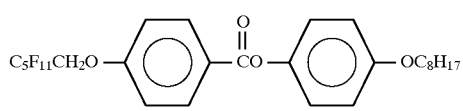
I-34
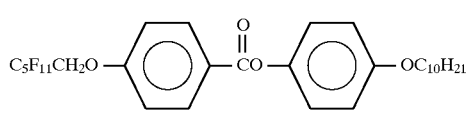
I-35
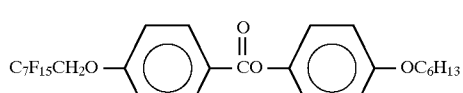
I-36
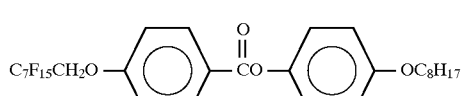
I-37
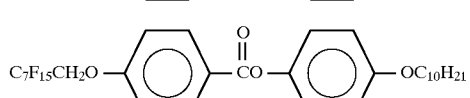
I-38
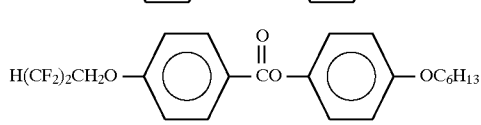
I-39
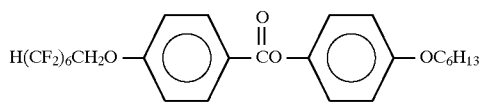
I-40
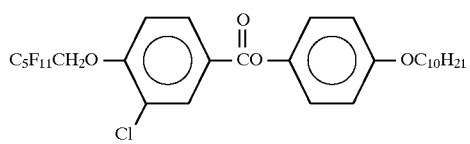
I-41
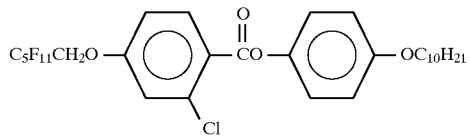
I-42
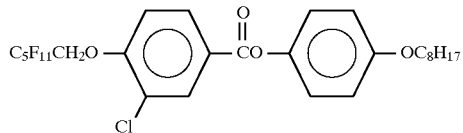
I-43

-continued
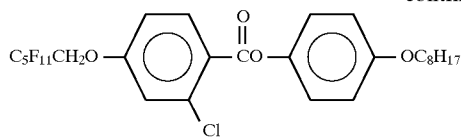 I-44
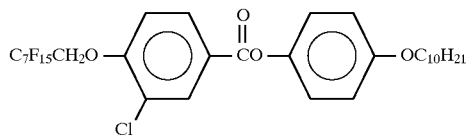 I-45
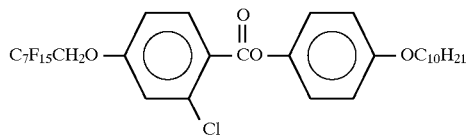 I-46
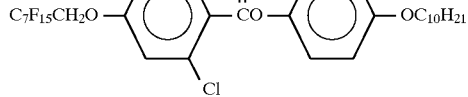 I-47
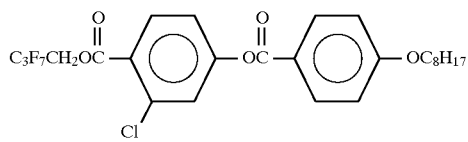 I-48
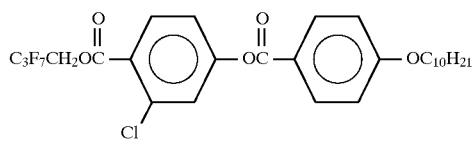 I-49
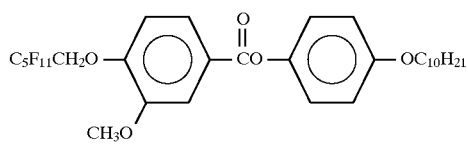 I-50
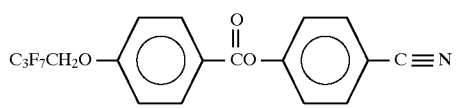 I-51
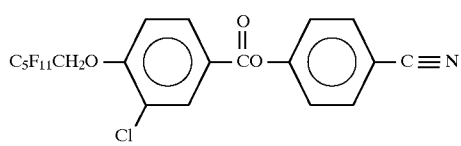 I-52
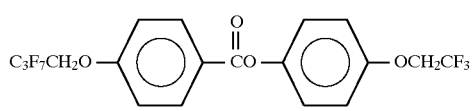 I-53
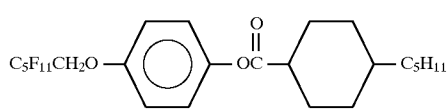 I-54
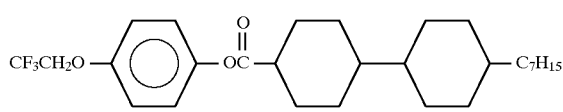 I-55
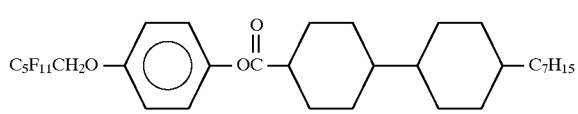

-continued
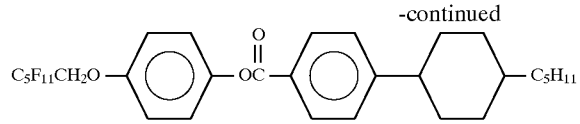 I-56
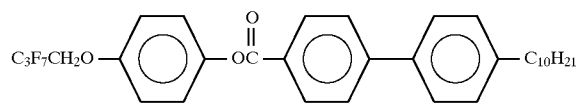 I-57
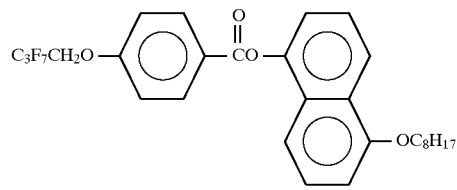 I-58
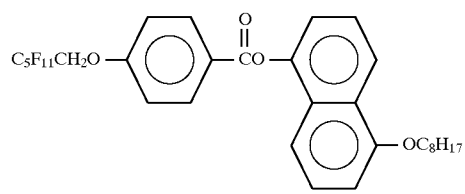 I-59
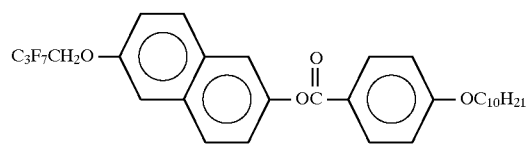 I-60
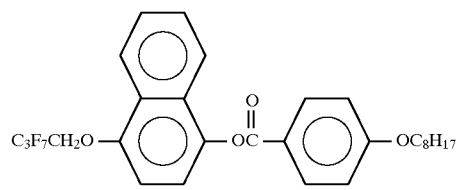 I-61
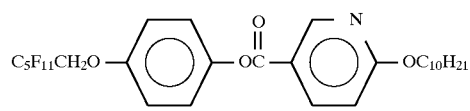 I-62
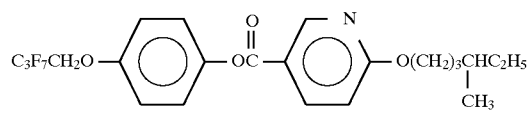 I-63
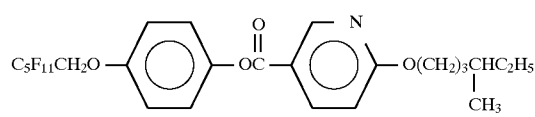 I-64
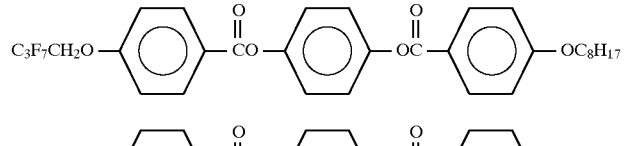 I-65
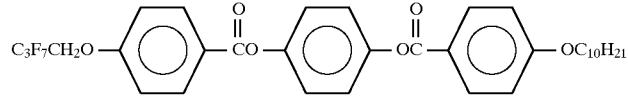 I-66
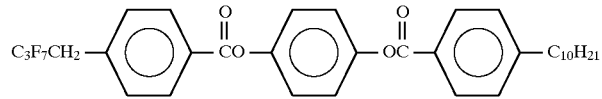 I-67

-continued
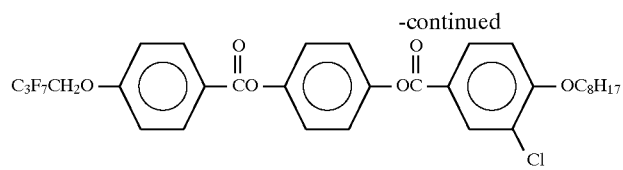
I-68
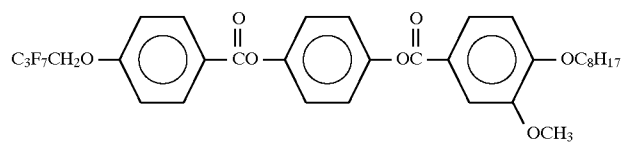
I-69
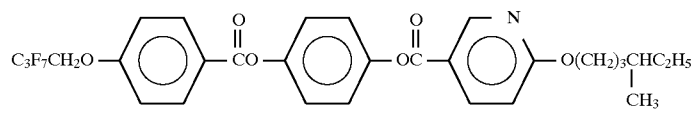
I-70
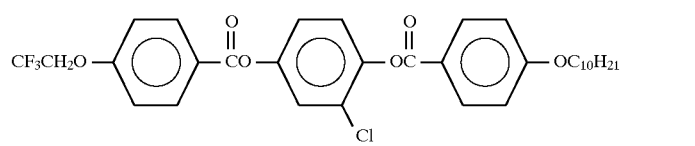
I-71
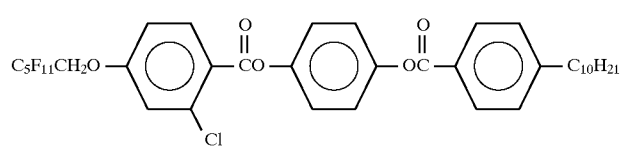
I-72
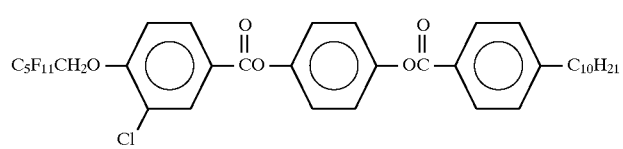
I-73
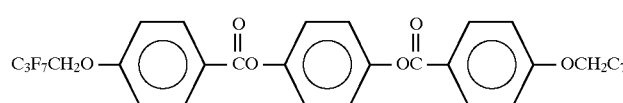
I-74
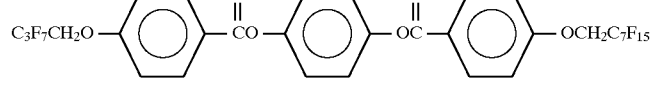
I-75
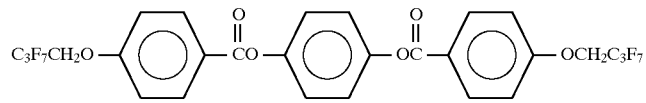
I-76
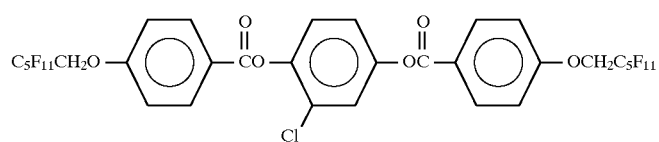
I-77
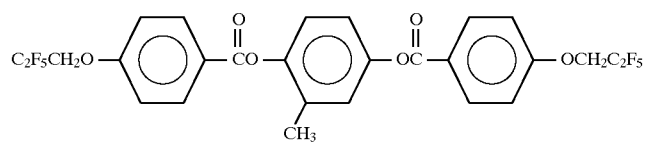
I-78
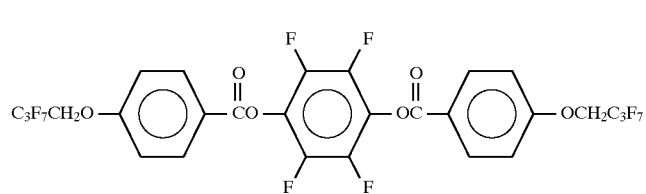

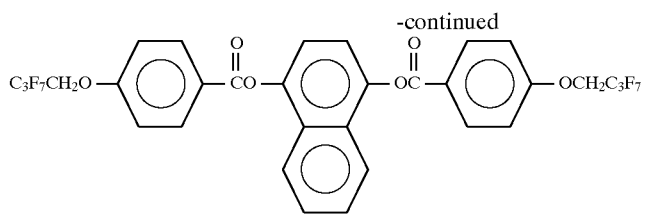
I-79
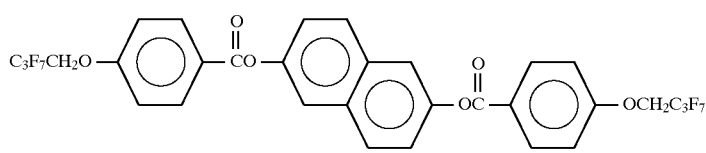
I-80
I-81
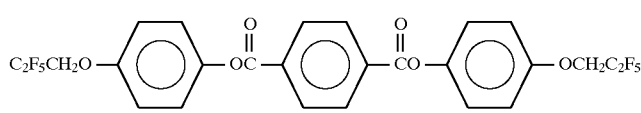
I-82
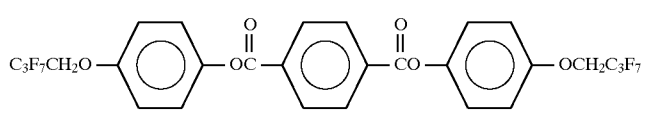
I-83
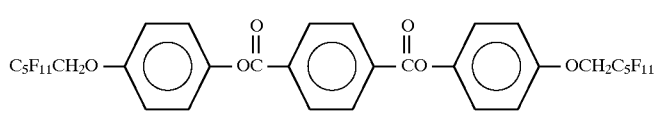
I-84
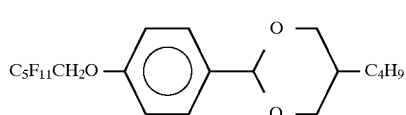
I-85
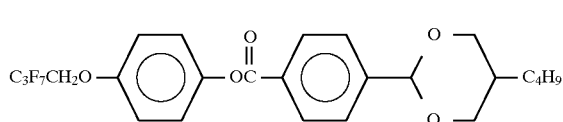
I-86
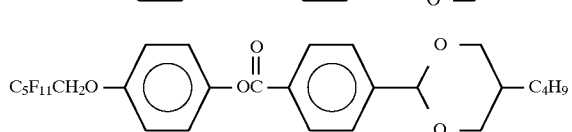
I-87
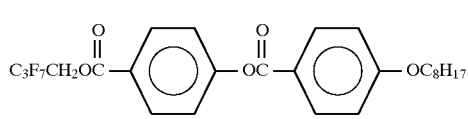
I-88
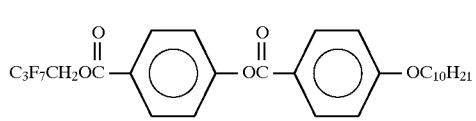
I-89
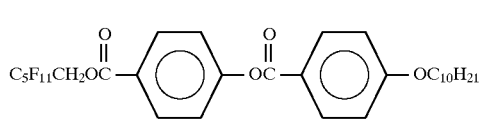
I-90
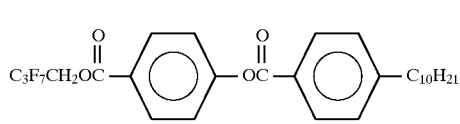
I-91

-continued
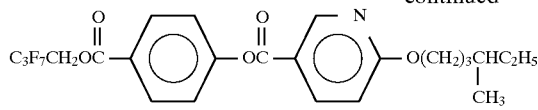
I-92
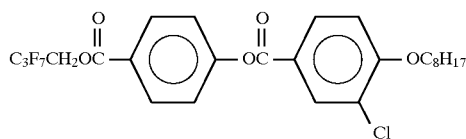
I-93
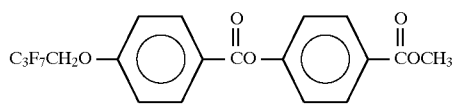
I-94
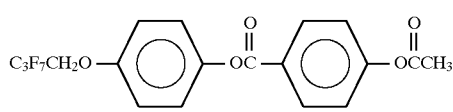
I-95
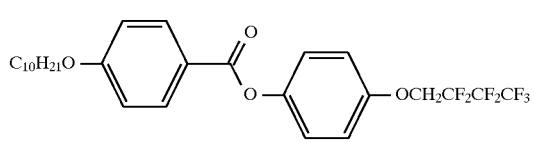
I-96
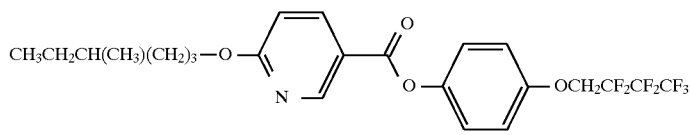
I-97
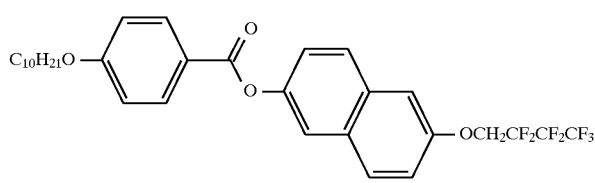
I-98
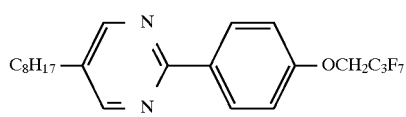
I-99
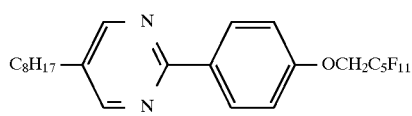
I-100
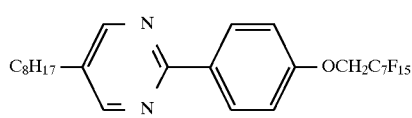
I-101
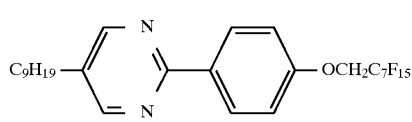
I-102
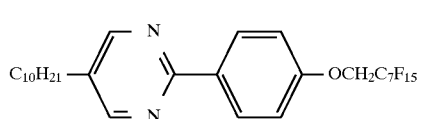
I-103
A perfluoroether-type mesomorphic compound as represented by the formula (II) having at least one catenary ether oxygen atom may include compounds described in U.S. Pat. No. 5,262,082, WO93/22396, and The 4th Int'l FLC conference, P-46 (1993) (Marc D. Radcliffe et al).

The perfluoroether-type mesomorphic compound as represented by the formula (II) may be synthesized through processes similar to those described in JP-A (Kohyo) 7-506368 and WO93/22396. Specific examples of such mesomorphic compounds of the formula (II) may include those (Example Compound Nos. II-1 to II-45) shown below.
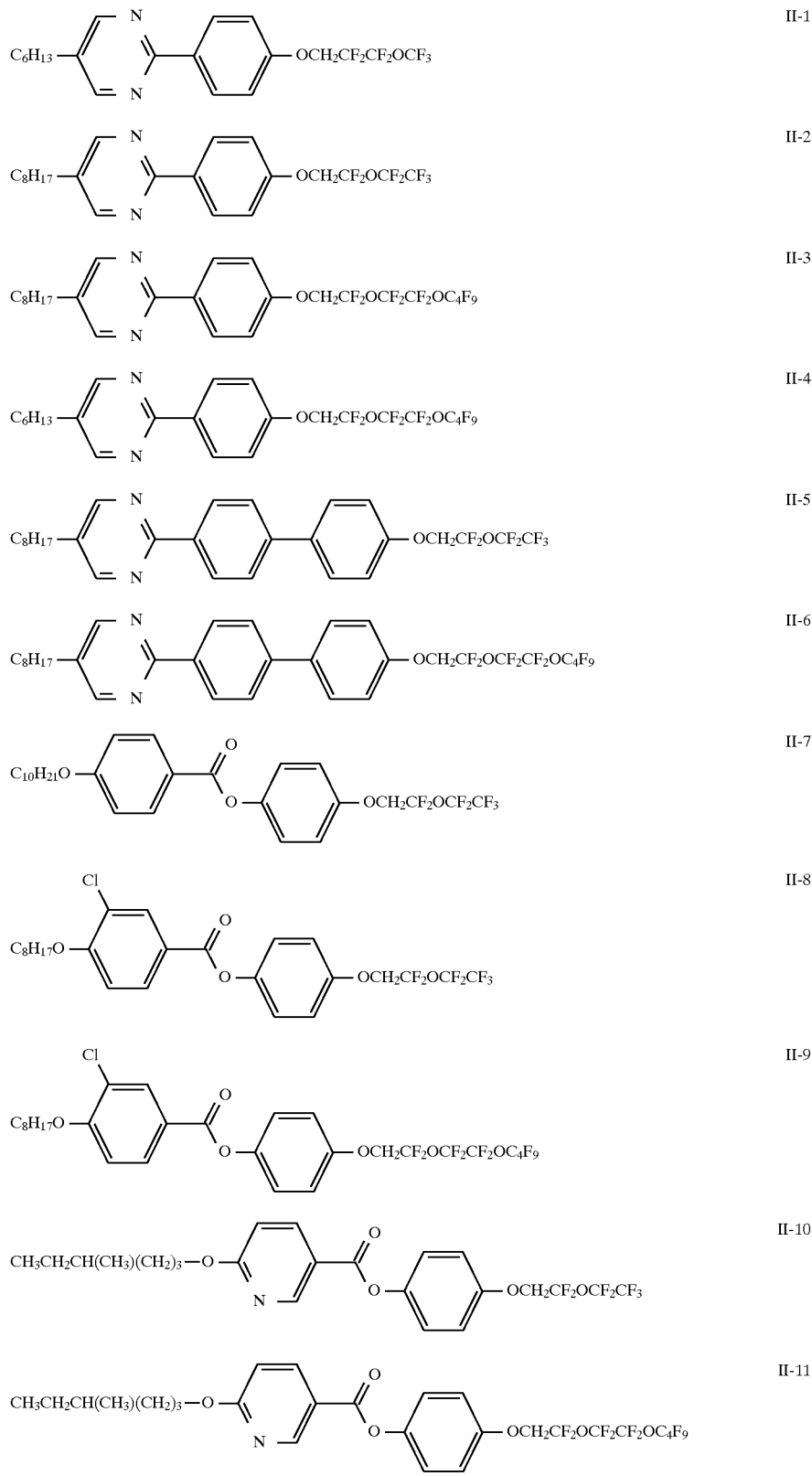

-continued
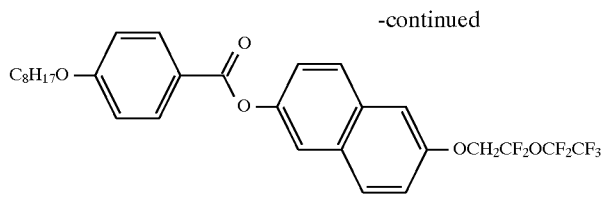
II-12
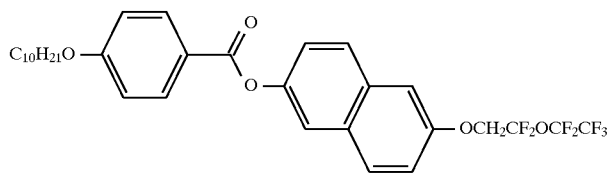
II-13
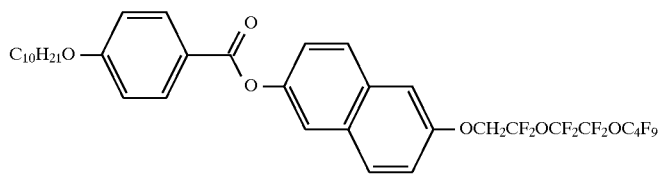
II-14
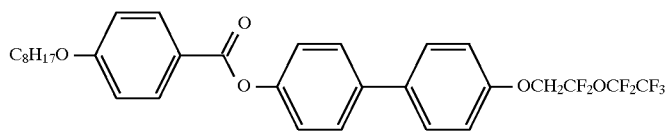
II-15
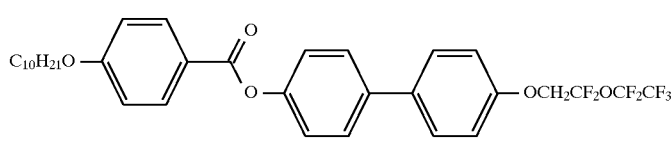
II-16
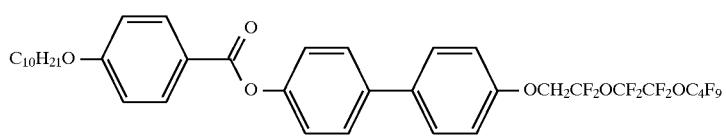
II-17
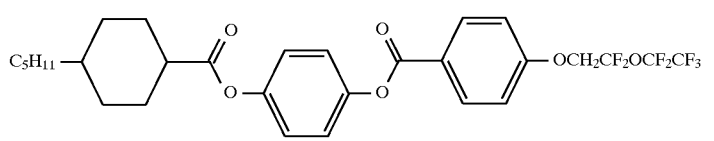
II-18
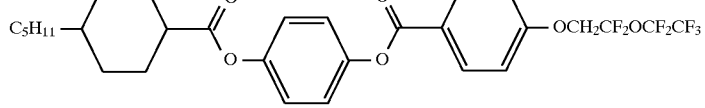
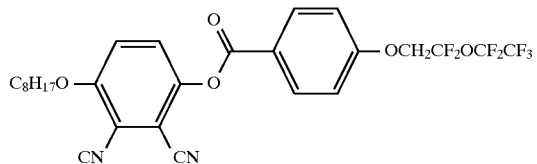
II-19
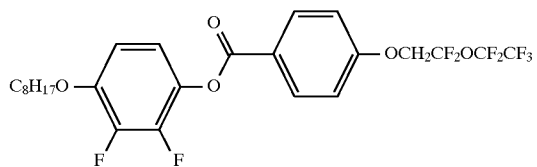
II-20
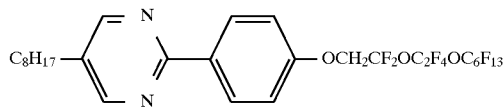
II-21
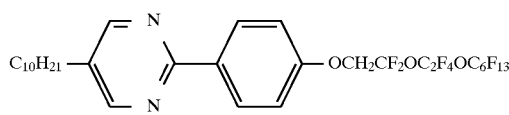
II-22

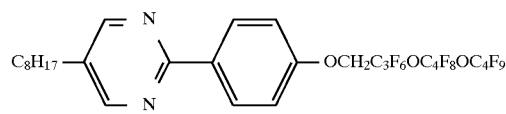 II-23
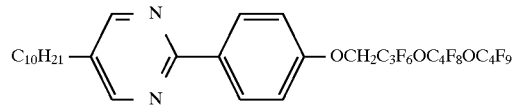 II-24
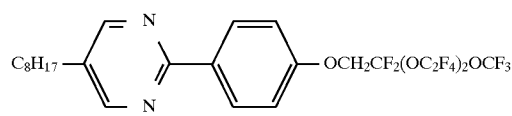 II-25
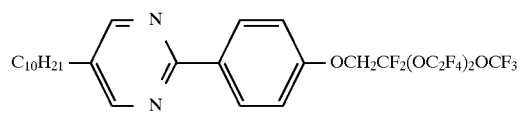 II-26
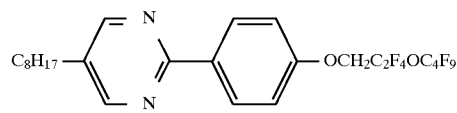 II-27
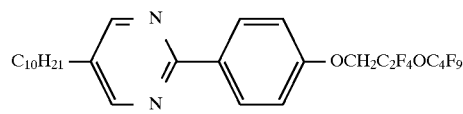 II-28
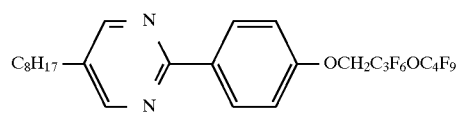 II-29
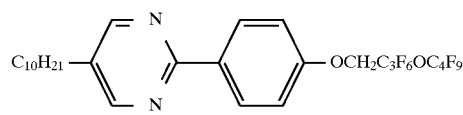 II-30
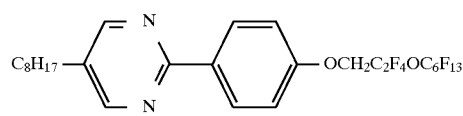 II-31
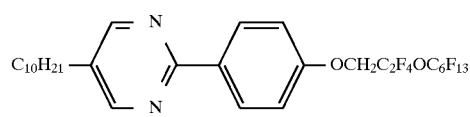 II-32
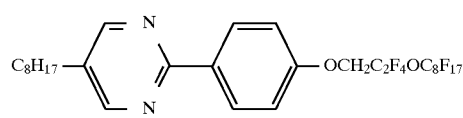 II-33
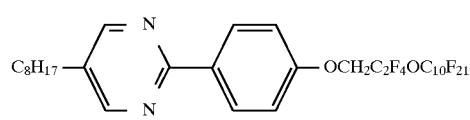 II-34
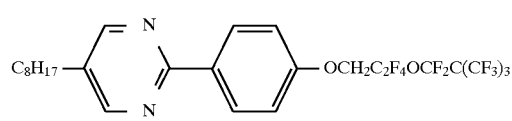 II-35

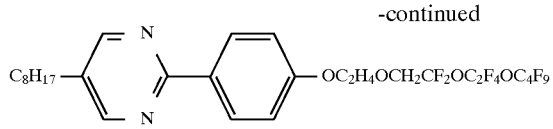 II-36

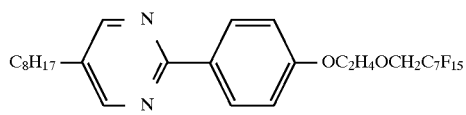 II-37

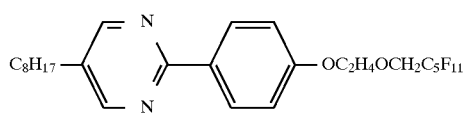 II-38

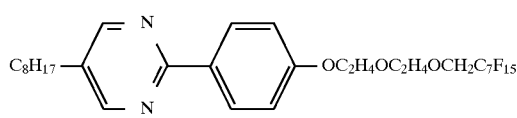 II-39

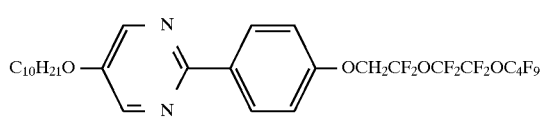 II-40

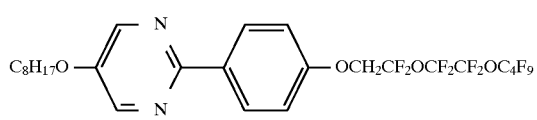 II-41

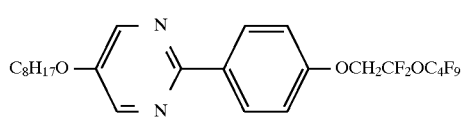 II-42

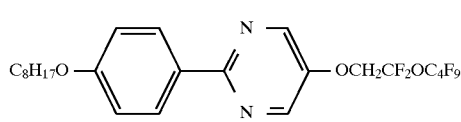 II-43

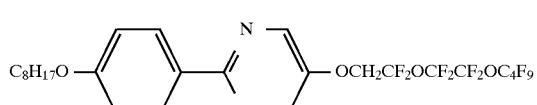 II-44

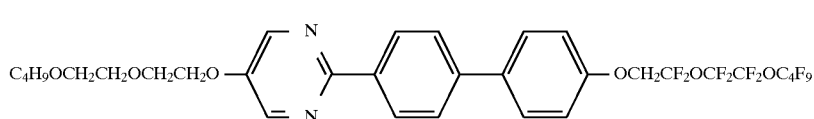 II-45

In the present invention, the liquid crystal composition may preferably contain at least one species of a compound as a resistivity-modifying substance (electroconductive dopant) represented by the following formulas (1) to (4):

Formula (1):

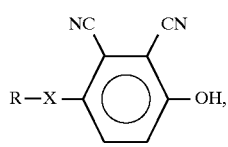

wherein R denotes hydrogen, or a linear or branched alkyl group having 1–18 carbon atoms capable of having a substituent; and X denotes —O—, $$-\underset{\underset{O}{\|}}{C}O- \text{ or } -O\underset{\underset{O}{\|}}{C}-;$$

Formula (2):

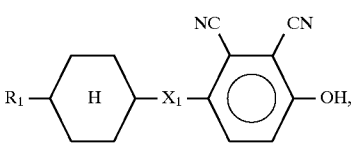

wherein $R_1$ denotes a linear or branched alkyl or alkoxy group having 1–18 carbon atoms capable of having a substituent; and $X_1$ denotes

or —CH$_2$O—;

Formula (3):

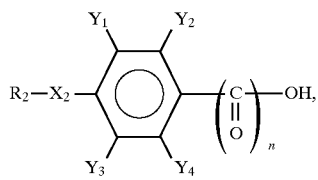

wherein R$_2$ denotes hydrogen, or a linear or branched alkyl group having 1–18 carbon atoms capable of having a substituent; X$_2$ denotes a single bond, —O—,

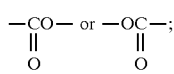

Y$_1$, Y$_2$, Y$_3$, and Y$_4$ respectively denote hydrogen, fluorine or —CF$_3$ with the proviso that at least one of Y$_1$, Y$_2$, Y$_3$ and Y$_4$ is fluorine or —CF$_3$; and n is 0 or 1; and Formula (4):

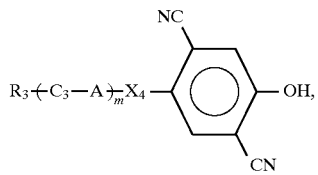

wherein R$_3$ denotes a linear or branched alkyl group having 1–18 carbon atoms capable of having a substituent; —A— denotes

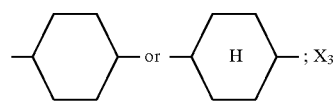

denotes

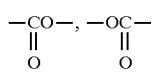

or a single bond, X$_4$ denotes —O—,

and m is 0 or 1.

In the formula (1) described above, R may preferably be selected from the following groups (i) and (ii):

(i) an n-alkyl group having 1–18 carbon atoms, particularly 4–14 carbon atoms; and (ii)

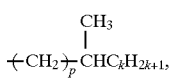

wherein p denotes an integer of 0–7 and k denotes an integer of 1–9 (optically active or inactive when k is 2 or above).

Further, X may preferably be —O— in the formula (1).

Specific examples of the resistivity-modifying substance as represented by the above-mentioned general formula (1) may include those denoted by the following structural formulas.

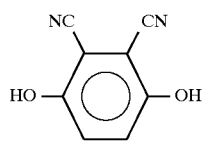 (1-1)

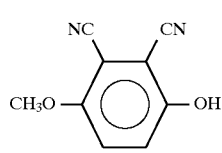 (1-2)

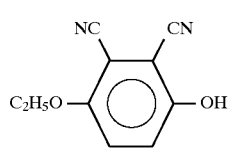 (1-3)

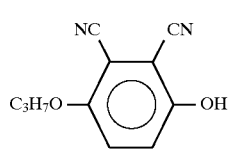 (1-4)

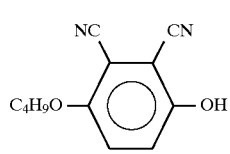 (1-5)

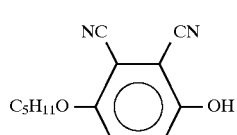 (1-6)

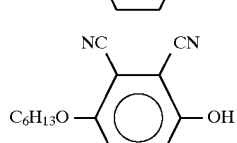 (1-7)

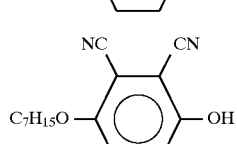 (1-8)

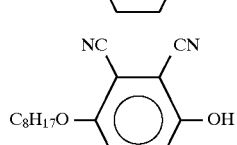 (1-9)

-continued
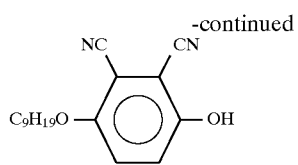 (1-10)
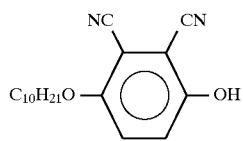 (1-11)
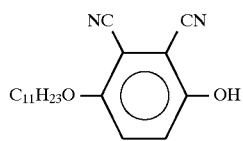 (1-12)
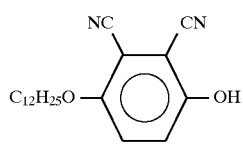 (1-13)
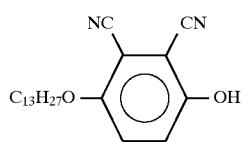 (1-14)
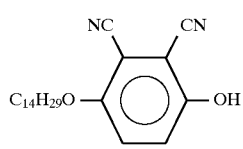 (1-15)
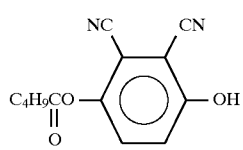 (1-16)
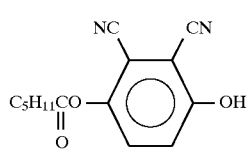 (1-17)
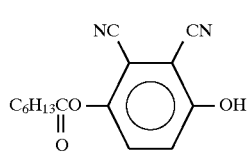 (1-18)
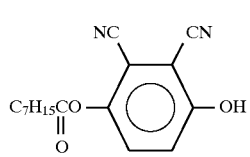 (1-19)
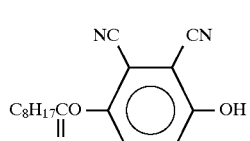 (1-20)
-continued
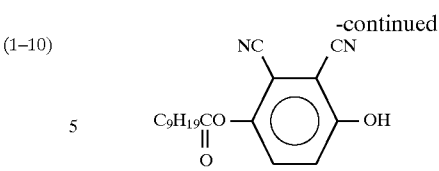 (1-21)
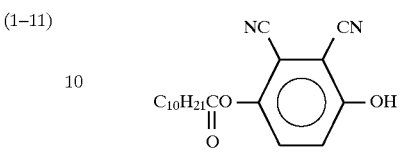 (1-22)
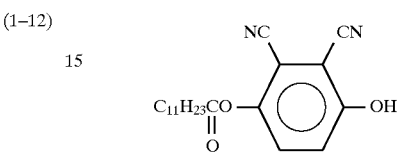 (1-23)
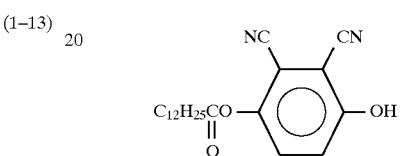 (1-24)
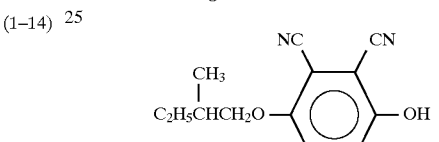 (1-25)
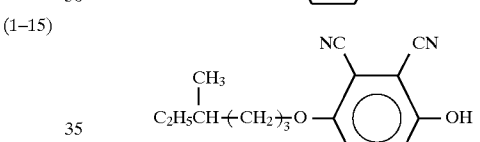 (1-26)
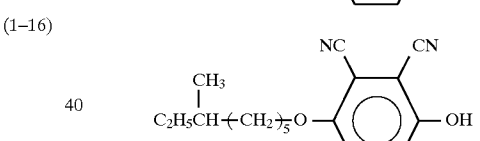 (1-27)
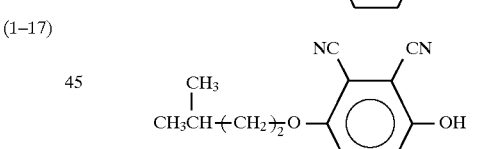 (1-28)
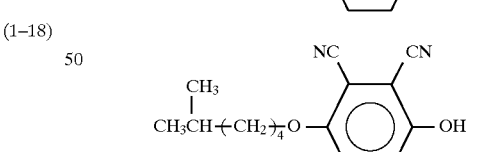 (1-29)
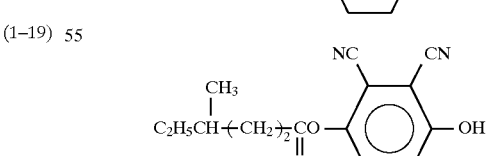 (1-30)
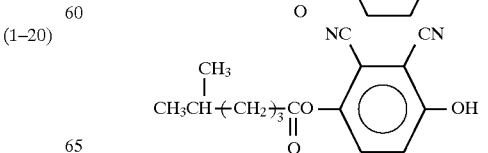 (1-31)

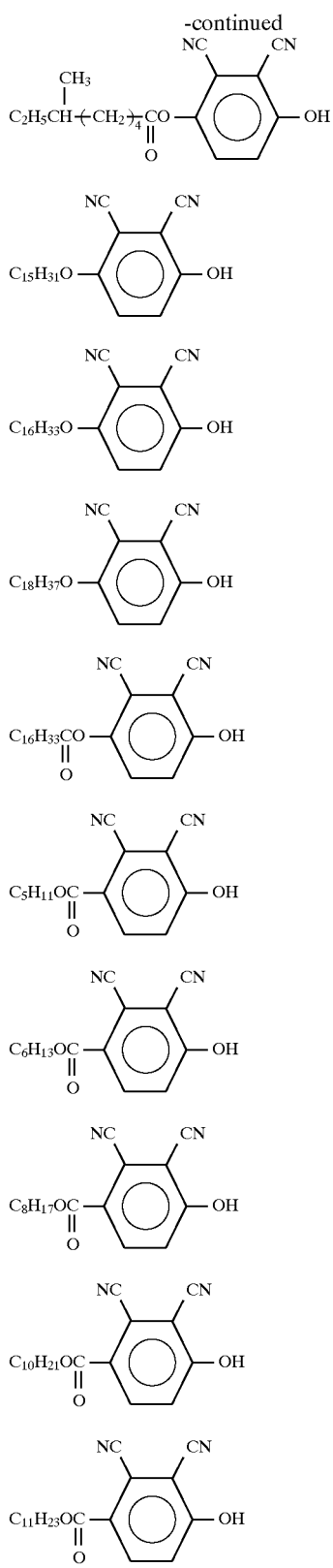

(Case where X is —O—)

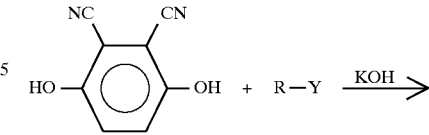

In the above, Y denotes —Br, —I or

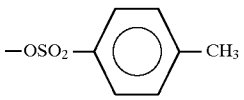

and R denotes the same as defined above.

(Case where X is —CO—)
              ‖
              O

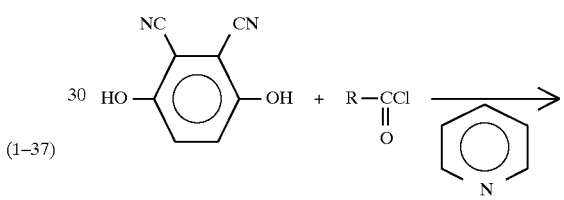

In the above, R denotes the same as defined above.

SYNTHESIS EXAMPLE 1

Production of 2,3-dicyano-4-hexyloxyphenol (Example Compound No. 1-7)

27 g (168.8 mM) of 2,3-dicyanohydroquinone and 22.2 g (337 mM) of 85%-potassium hydroxide were dissolved in a mixture solvent of 65 ml of methanol and 302 ml of dimethylformamide, followed by heating to 50° C. To the solution, 33.4 g (202.4 mM) of hexyl bromide were added dropwise in 25 minutes, followed by heating to 100° C. and stirring for 3 hours. The reaction mixture was poured into cold water and washed with ether. The water layer was acidified with 6N-hydrochloric acid to provide a pH value of 1, followed by precipitation of a crystal. The crystal was extracted with ether, and the ether layer was washed with 5%-sodium hydrogen-carbonate aqueous solution and further washed with water, followed by distilling-off of the solvent to obtain a crude product. The crude product was treated with activated carbon and recrystallized from methanol to obtain 13.1 g of 2,3-dicyano-4-hexyloxyphenol.

The resistivity-modifying substance represented by the formula (1) may generally be synthesized through the following reaction schemes.

In the formula (2) described above, $R_1$ may preferably be an n-alkyl group having 1–18 carbon atoms, more preferably 3–14 carbon atoms.

Specific examples of the resistivity-modifying substance as represented by the formula (2) may include those denoted by the following structural formulas.
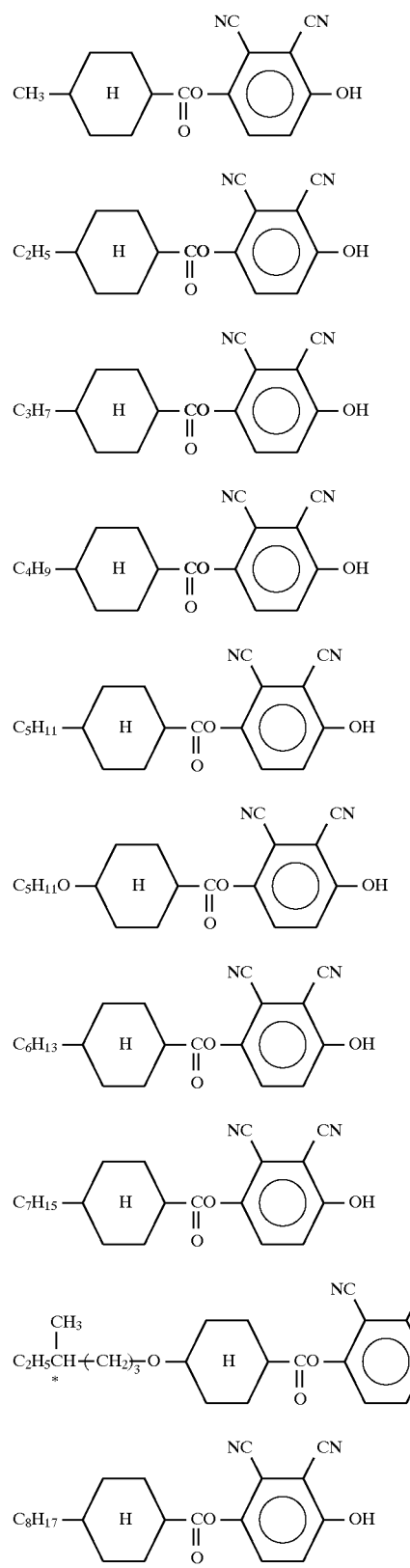
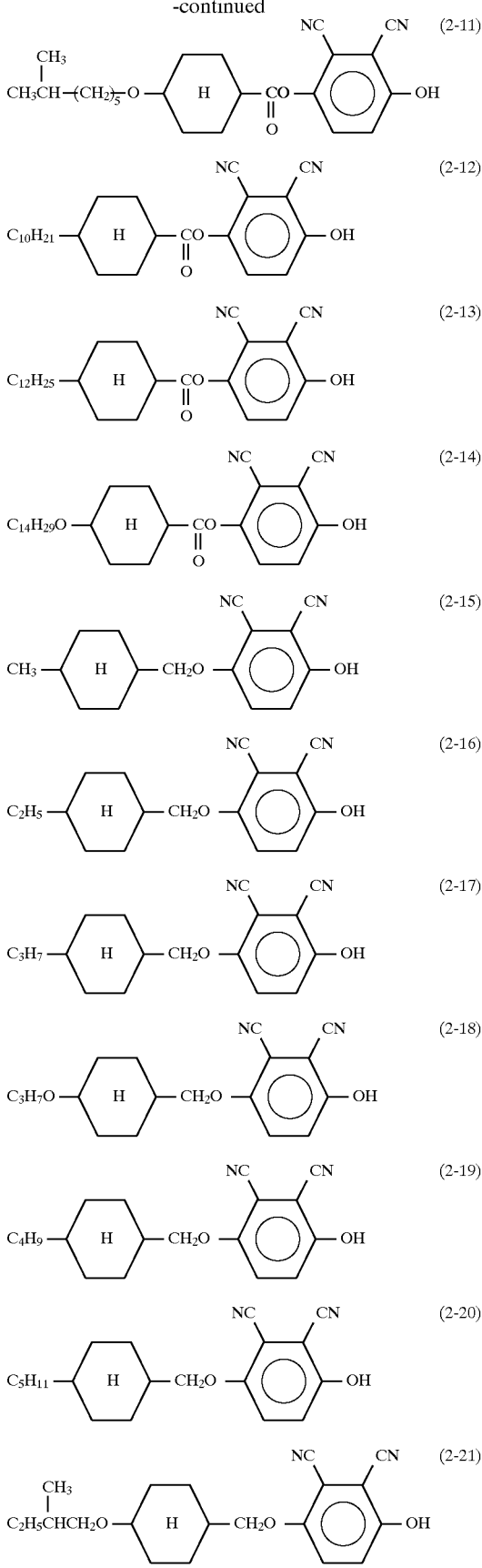

-continued

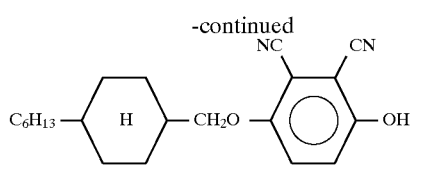  (2-22)

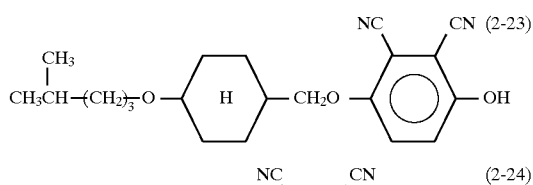  (2-23)

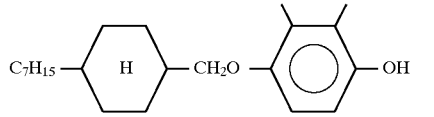  (2-24)

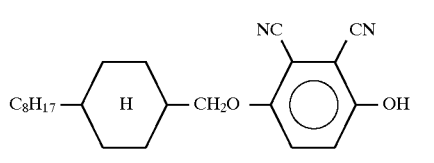  (2-25)

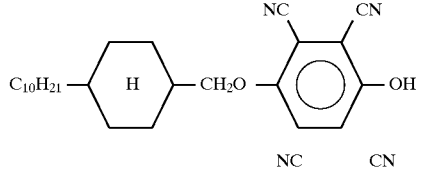  (2-26)

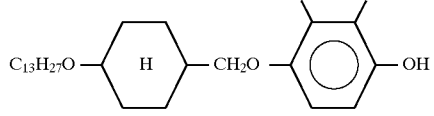  (2-27)

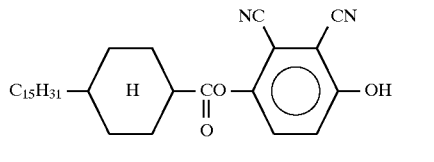  (2-28)

(2-29)

(2-30)

The resistivity-modifying substance represented by the formula (2) may generally be synthesized through the following reaction schemes.

(case where $X_1$ is —CO—, $\parallel$, O)

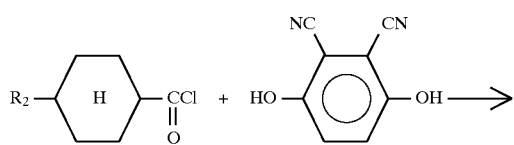

-continued

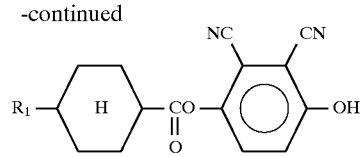

(Case where $X_1$ is —CH$_2$O)

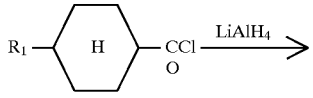

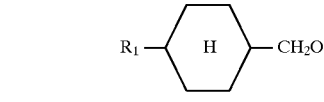

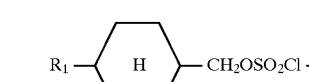

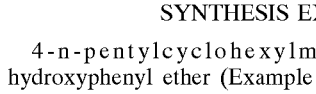

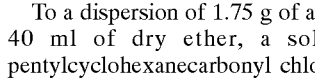

SYNTHESIS EXAMPLE 2

4-n-pentylcyclohexylmethyl 2,3-dicyano-4-hydroxyphenyl ether (Example Compound No. 2-20) was synthesized through the following steps i)–iii).

Step i)

To a dispersion of 1.75 g of aluminum lithium hydride in 40 ml of dry ether, a solution of 10 g of 4-n-pentylcyclohexanecarbonyl chloride in 12 ml of ether was added dropwise below 5° C., followed by stirring overnight at room temperature. After the reaction, the reaction mixture was acidified with 5%-hydrochloric acid aqueous solution until a pH value of 1 were shown and was subjected to extraction with ether. The organic layer was washed successively with water, 5%-sodium hydroxide, and water, followed by drying with anhydrous magnesium sulfate. The resultant organic layer was subjected to filtration, followed by distilling-off of the solvent to obtain 8.2 g of 4-n-pentylcyclohexylmethanol.

Step ii)

8.0 g of 4-n-pentylcyclohexylmethanol was dissolved in a mixture solvent of 8 ml of pyridine and 8 ml of toluene. To the solution, 6.0 g of methanesulfonyl chloride was added dropwise below 10° C., followed by stirring overnight at room temperature. After the reaction, the reaction mixture was poured into cold water and subjected to extraction with toluene, followed by washing successively with 5%-hydrochloric acid aqueous solution and water and drying with anhydrous magnesium sulfate. The resultant organic layer was subjected to filtration, followed by distilling-off of the solvent to obtain 11.3 g of 4-n-pentylcyclohexylmethyl methanesulfonate.

Step iii)

5.6 g of 2,3-dicyanohydroquinone and 4.6 g of 85%-potassium hydroxide were added to a mixture solvent to 15 ml of methanol and 60 ml of N,N-dimethylformamide, followed by heating to 50° C. to provide a solution. To the solution, 11.0 g of 4-n-pentylcyclohexylmethyl methanesulfonate was added, followed by stirring for 3 hours at 100° C. After the reaction, the reaction mixture was poured into cold water and washed with ether. The water layer was acidified with 6N-hydrochloric acid aqueous solution until a pH value of 1 was shown, and was subjected to extraction with ether. The organic layer was washed successively with 5%-sodium hydrogenecarbonate aqueous solution and water, followed by drying with anhydrous magnesium sulfate and distilling-off of the solvent to obtain a crude product. The crude product was purified by silica gel column chromatography (eluent: toluene-ethyl acetate) and treated with activated carbon, followed by recrystallization from methanol to obtain 3.6 g of 4-n-pentylcyclohexylmethyl 2,3-dicyano-4-hydroxyphenyl ether.

In the formula (3) described above, $R_2$ may preferably be any one of hydrogen and the following groups (i) and (ii):

(i) an n-alkyl group having 1–18 carbon toms, particularly 4–14 carbon atoms; and (ii)

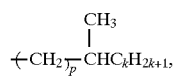

wherein p denotes an integer of 0–7 and k denotes an integer of 1–9 (optically active or inactive when k is 2 or above).

Further, $Y_1$, $Y_2$, $Y_3$ and $Y_4$ may preferably include the following combinations (iii) to (xi):

(iii) $Y_1=Y_3=Y_4=H$ and $Y_2=F$;
(iv) $Y_1=F$ and $Y_2=Y_3=Y_4=H$;
(v) $Y_1=Y_3=H$ and $Y_2=Y_4=F$;
(vi) $Y_1=Y_3=F$ and $Y_2=Y_4=H$;
(vii) $Y_1=Y_4=F$ and $Y_2=Y_3=H$;
(viii) $Y_1=Y_2=F$ and $Y_3=Y_4=H$;
(ix) $Y_1=Y_2=Y_3=Y_4=F$;
(x) $Y_1=Y_3=H$ and $Y_2=Y_4=CF_3$; and
(xi) $Y_1=Y_3=CF_3$ and $Y_2=Y_4=H$.

Specific examples of the resistivity-modifying substance as represented by the formula (3) may include those denoted by the following structural formulas.

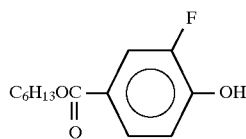
(3-1)

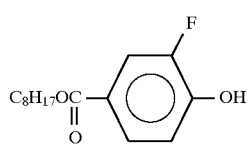
(3-2)

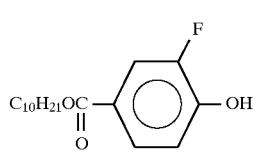
(3-3)

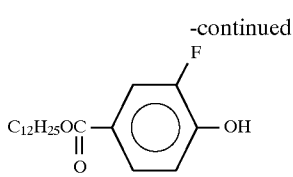
(3-4)

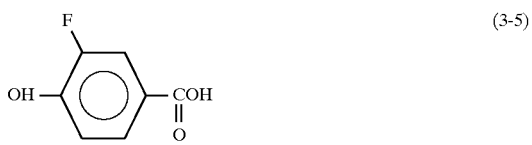
(3-5)

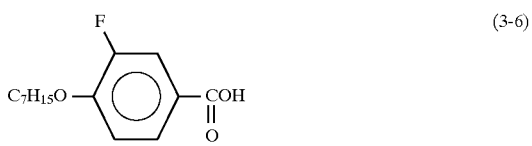
(3-6)

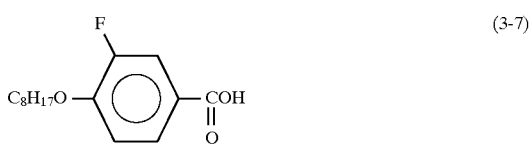
(3-7)

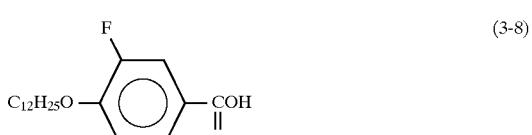
(3-8)

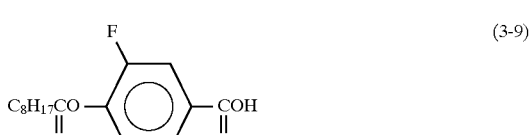
(3-9)

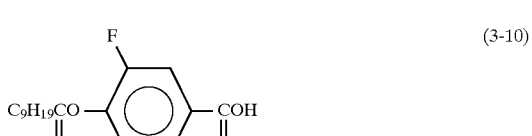
(3-10)

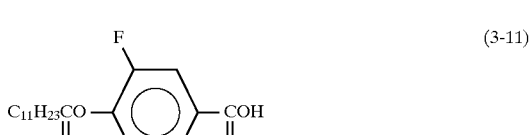
(3-11)

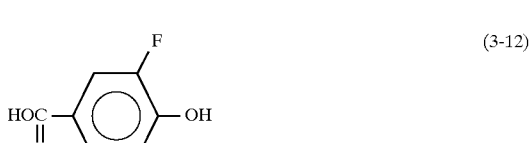
(3-12)

(3-13)

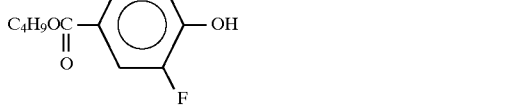

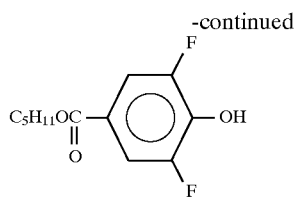 (3-14)
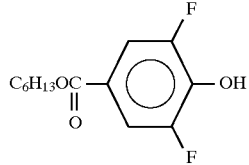 (3-15)
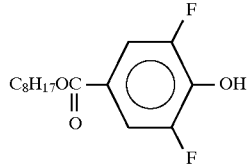 (3-16)
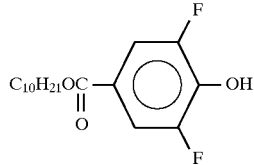 (3-17)
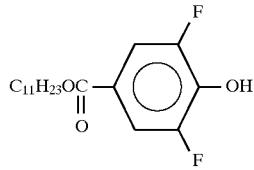 (3-18)
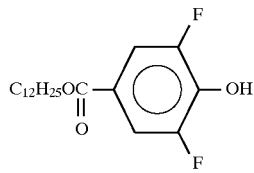 (3-19)
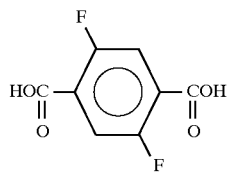 (3-20)
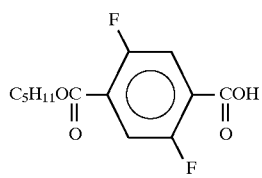 (3-21)
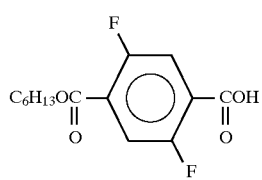 (3-22)
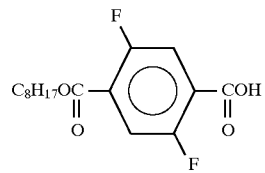 (3-23)
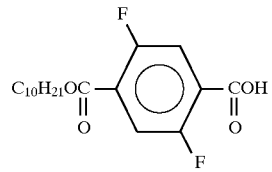 (3-24)
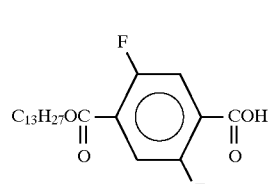 (3-25)
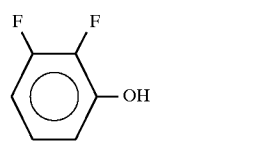 (3-26)
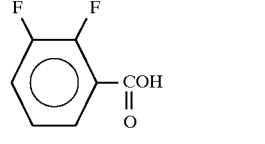 (3-27)
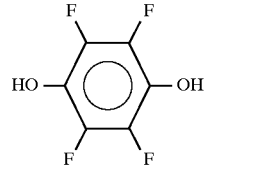 (3-28)
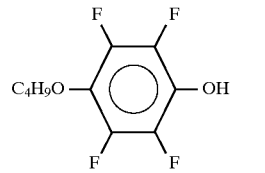 (3-29)
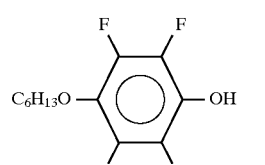 (3-30)
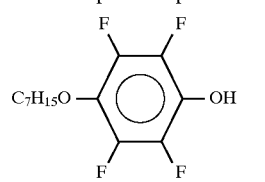 (3-31)

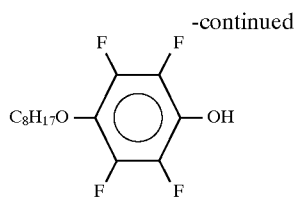 (3-32)
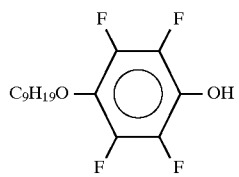 (3-33)
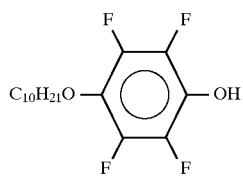 (3-34)
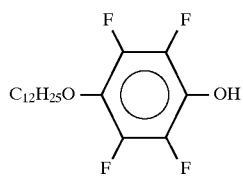 (3-35)
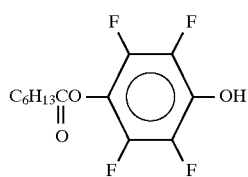 (3-36)
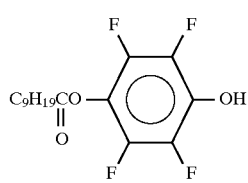 (3-37)
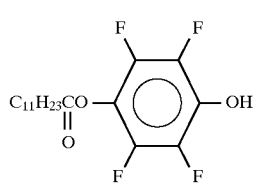 (3-38)
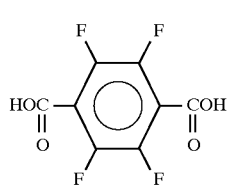 (3-39)
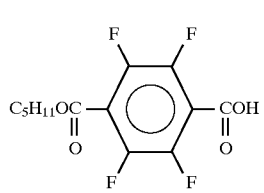 (3-40)
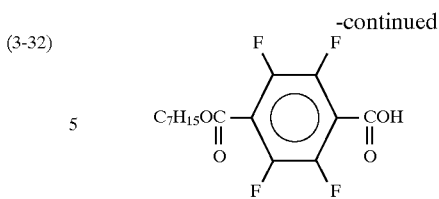 (3-41)
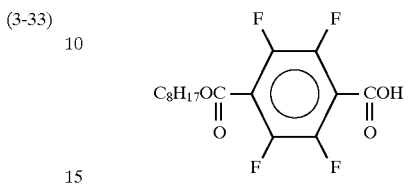 (3-42)
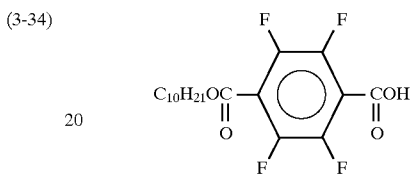 (3-43)
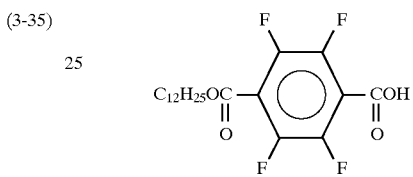 (3-44)
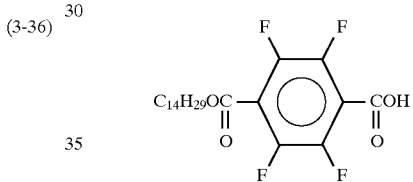 (3-45)
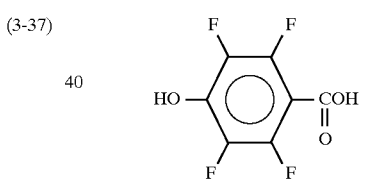 (3-46)
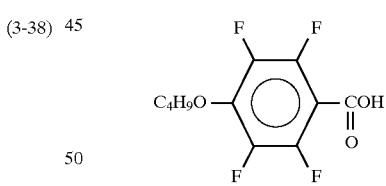 (3-47)
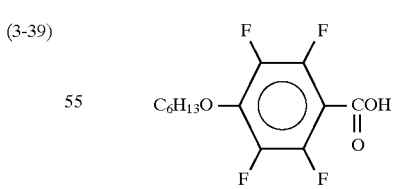 (3-48)
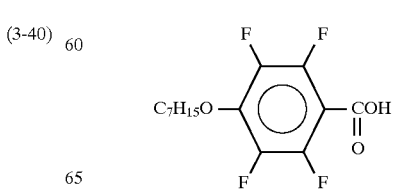 (3-49)

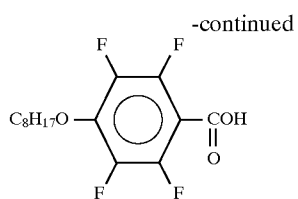 (3-50)
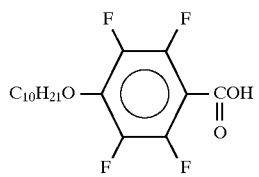 (3-51)
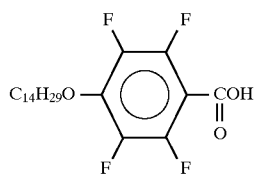 (3-52)
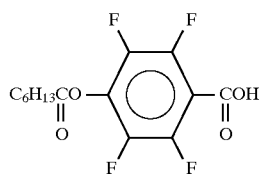 (3-53)
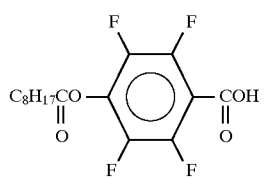 (3-54)
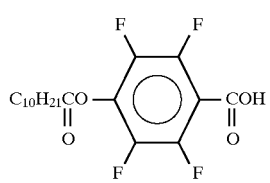 (3-55)
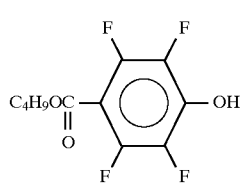 (3-56)
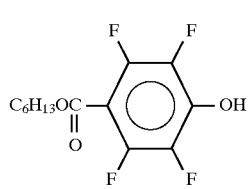 (3-57)
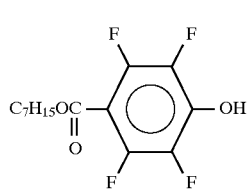 (3-58)
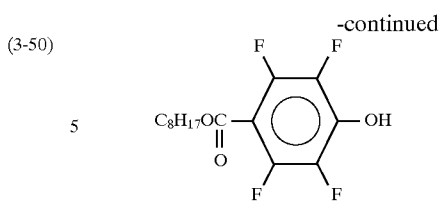 (3-59)
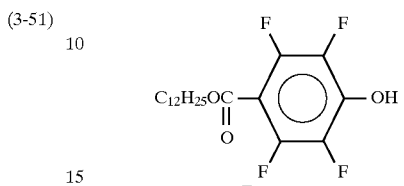 (3-60)
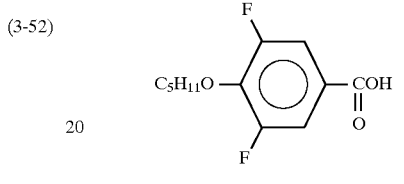 (3-61)
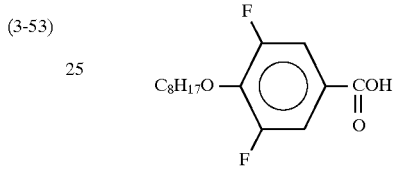 (3-62)
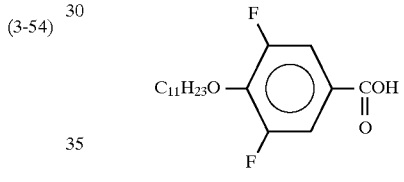 (3-63)
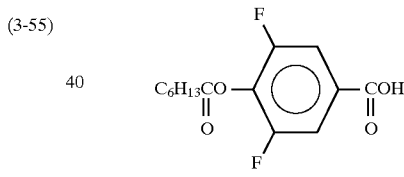 (3-64)
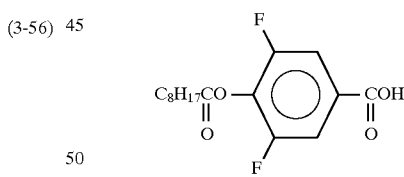 (3-65)
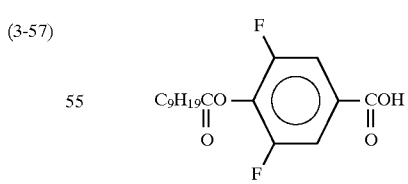 (3-66)
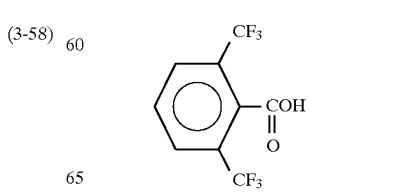 (3-67)

-continued

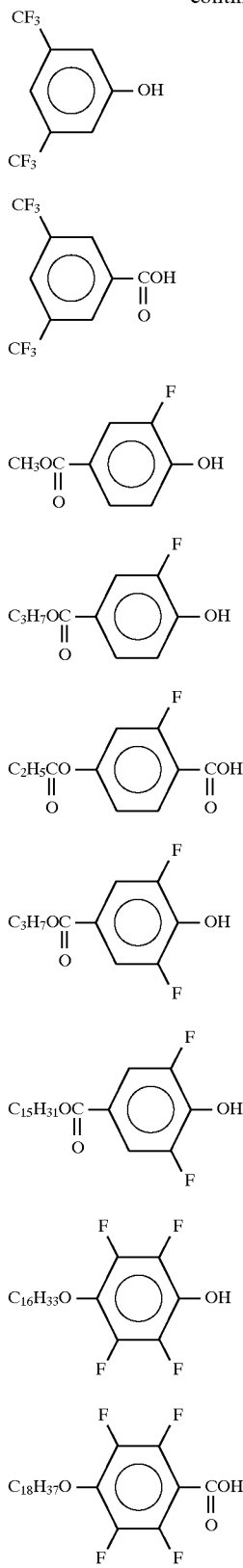

The resistivity-modifying substance represented by the formula (3) may generally be synthesized through the following reaction schemes.

(Case where X₂ is —O—)

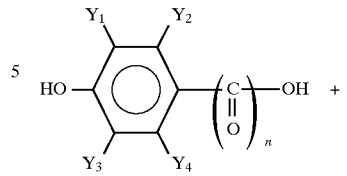

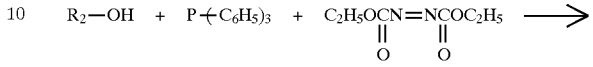

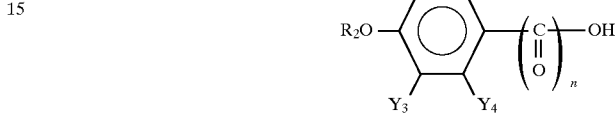

(case where X₂ is —CO—)
                    ||
                    O

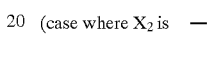

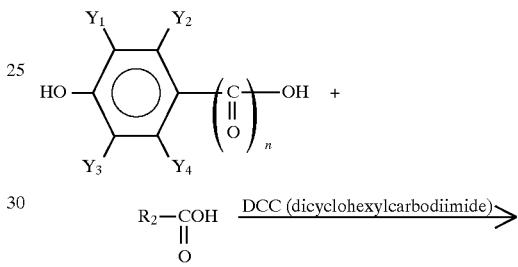

(Case where X₂ is —OC—)
                     ||
                     O

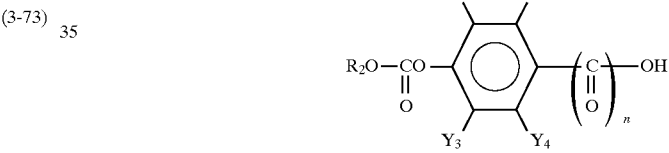

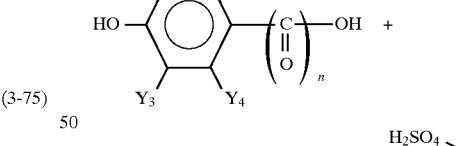

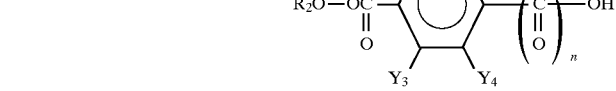

SYNTHESIS EXAMPLE 3

Production of 4-nonanoyloxy-2,3,5,6-tetrafluorophenol (Example Compound No. 3-33)

2.0 g (11.0 mM) of 2,3,5,6-tetrafluorohydroquinone, 0.87 g (5.5 mM) of nonanoic acid, 1.13 g (5.5 mM) of dicyclohexylcarbodiimide and a catalytic amount of 4-pyrrolidinopyridine were added to 20 ml of tetrahydrofuran, followed by stirring for 3 hours at room temperature. After the reaction, the insoluble residue was filtered off, followed by distilling-off of the solvent to obtain a crude product. The crude product was purified by silica gel column chromatography (eluent: toluene) to obtain 0.57 g of an objective product (Yield: 32.2%).

SYNTHESIS EXAMPLE 4

Production of octyl 4-hydroxy-3-fluorobenzoate (Example Compound No. 3-2)

To 40 ml of 1,2-dichloroethane, 2.0 g (12.8 mM) of fluorobenzoic acid, 5.0 g (38.5 mM) of n-octanol and 20 ml of concentrated sulfuric acid were added, followed by heat-refluxing for 8 hours. After the reaction, the reaction mixture was poured into 100 ml of water and extracted three times with 50 ml of dichloromethane. The organic layer was repeatedly washed with water until the washing liquid showed a neutral pH value, followed by drying with anhydrous magnesium sulfate and further filtration. The solvent was distilled off and the resultant crude product was purified by silica gel column chromatography (eluent: toluene/ethyl acetate=5/1) to obtain 1.26 g of an objective product (Yield: 36.6%).

In the formula (4) described above, $R_3$ may preferably include any of the following groups (i) and (ii):

(i) an n-alkyl group having 1–18 carbon atoms, particularly 4–14 carbon atoms; and (ii)

$$-(CH_2)_p-\overset{CH_3}{\underset{|}{CH}}_kH_{2k+1},$$

wherein p denotes an integer of 0–7 and k denotes an integer of 1–9 (optically active or inactive when k is 2 or above).

Further, $X_4$ may preferably be —O— or $$-\underset{\underset{O}{\|}}{C}O-$$

when m is 0 and may preferably be $$-\underset{\underset{O}{\|}}{C}O-$$

when m is 1.

$X_3$ may preferably be a single bond and when —A— is $$-\left\langle\begin{array}{c}\\ H\\ \end{array}\right\rangle-.$$

Specific example of the resistivity-modifying substance as represented by the formula (4) may include those denoted by the following structural formulas.

(4-1) $C_3H_7O$—[benzene ring with NC at top, OH at right, CN at bottom]

(4-2) $C_4H_9O$—[benzene ring with NC, OH, CN]

(4-3) $C_5H_{11}O$—[benzene ring with NC, OH, CN]

(4-4) $C_6H_{13}O$—[benzene ring with NC, OH, CN]

(4-5) $C_7H_{15}O$—[benzene ring with NC, OH, CN]

(4-6) $C_8H_{17}O$—[benzene ring with NC, OH, CN]

(4-7) $C_9H_{19}O$—[benzene ring with NC, OH, CN]

(4-8) $C_{10}H_{21}O$—[benzene ring with NC, OH, CN]

(4-9) $C_{11}H_{23}O$—[benzene ring with NC, OH, CN]

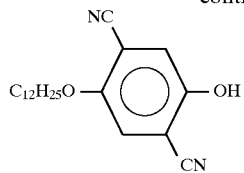 (4-10)
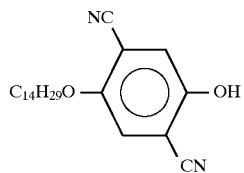 (4-11)
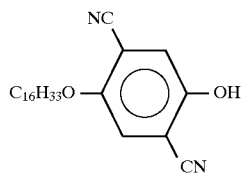 (4-12)
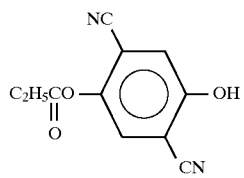 (4-13)
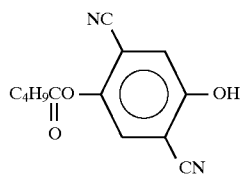 (4-14)
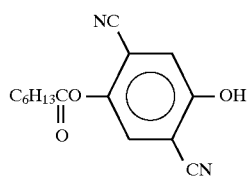 (4-15)
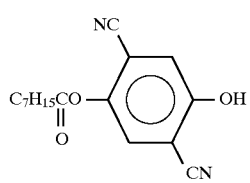 (4-16)
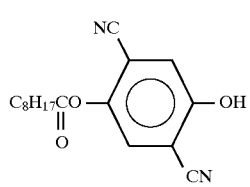 (4-17)
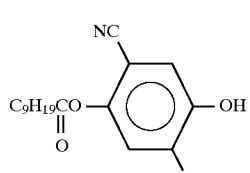 (4-18)
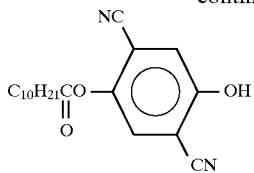 (4-19)
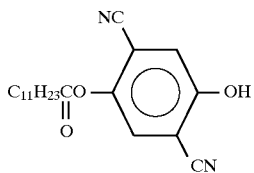 (4-20)
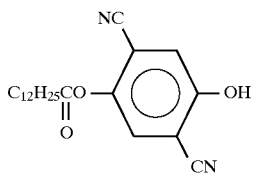 (4-21)
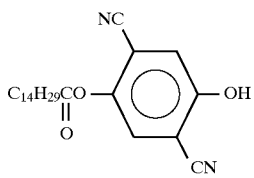 (4-22)
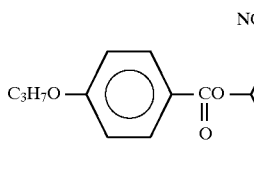 (4-23)
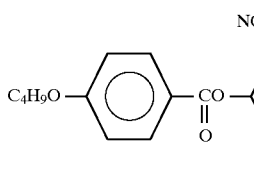 (4-24)
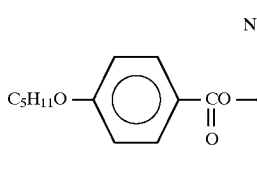 (4-25)
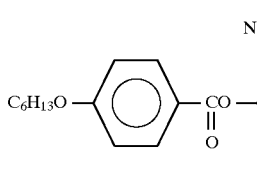 (4-26)
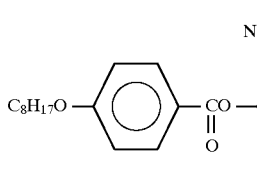 (4-27)

-continued
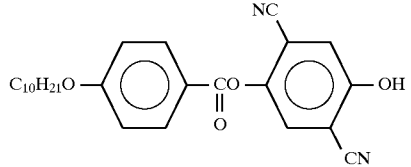 (4-28)
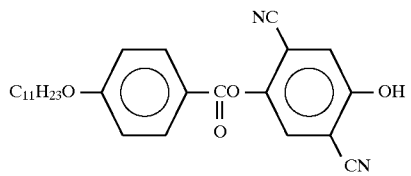 (4-29)
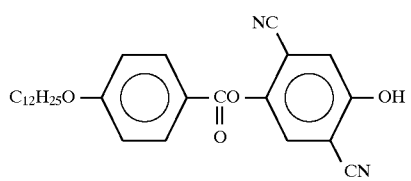 (4-30)
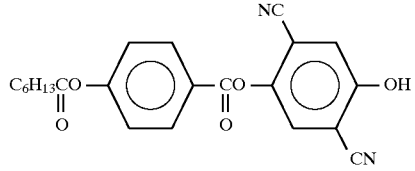 (4-31)
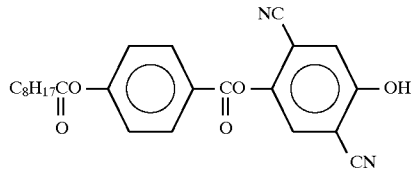 (4-32)
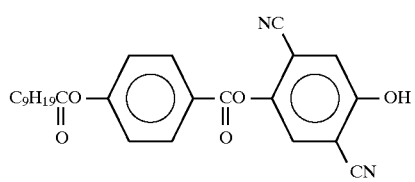 (4-33)
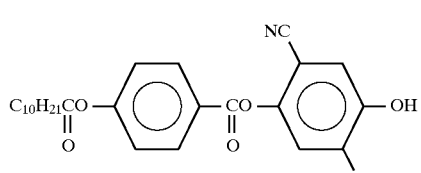 (4-34)
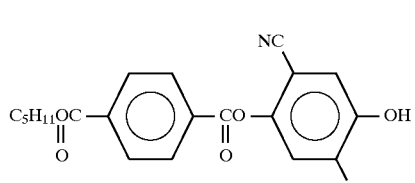 (4-35)
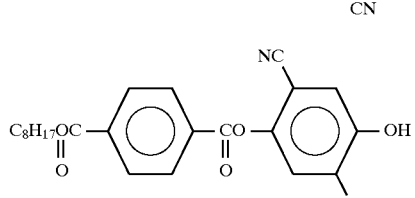 (4-36)
-continued
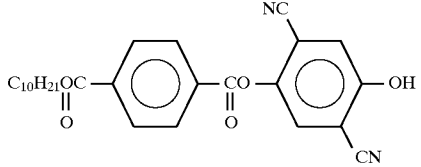 (4-37)
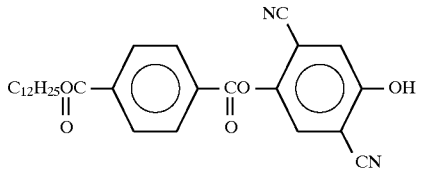 (4-38)
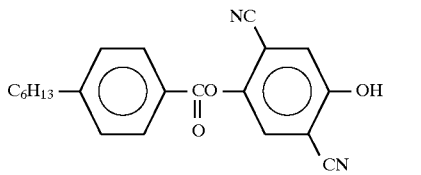 (4-39)
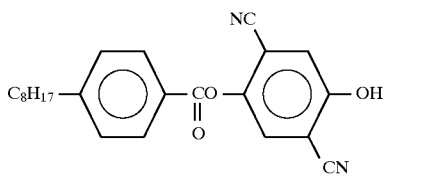 (4-40)
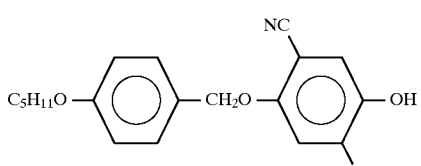 (4-41)
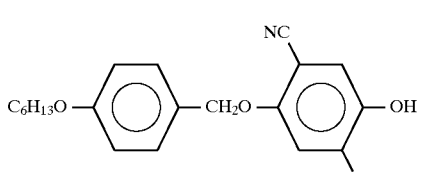 (4-42)
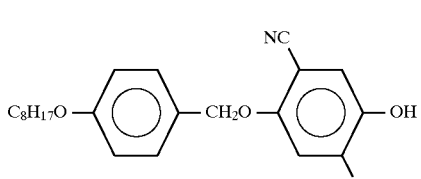 (4-43)
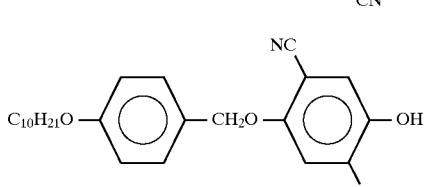 (4-44)
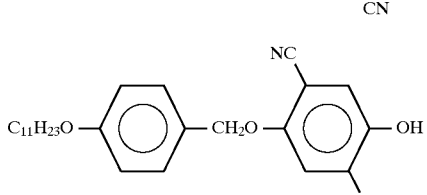 (4-45)

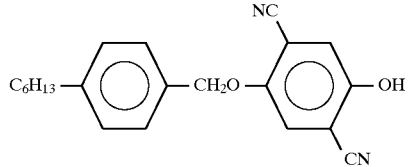 (4-46)
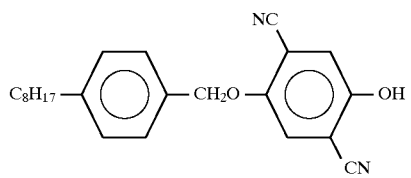 (4-47)
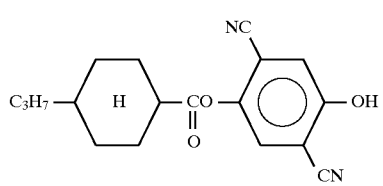 (4-48)
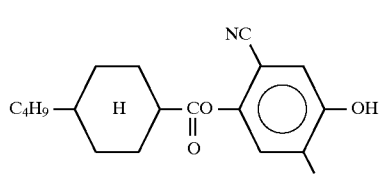 (4-49)
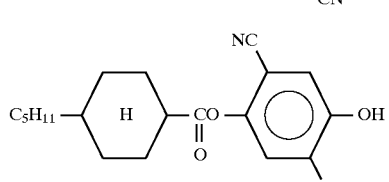 (4-50)
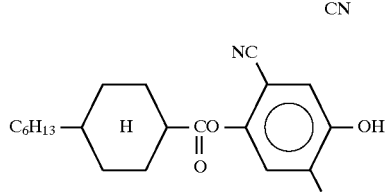 (4-51)
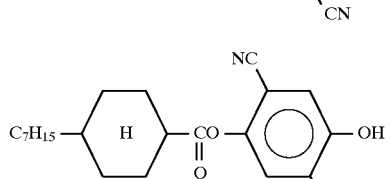 (4-52)
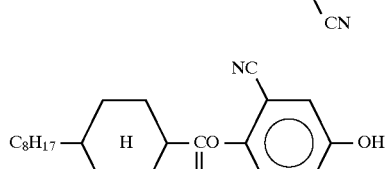 (4-53)
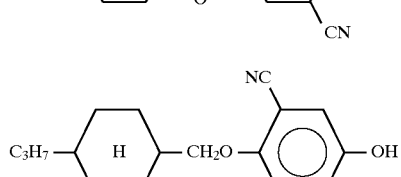 (4-54)
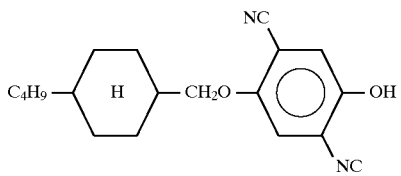 (4-55)
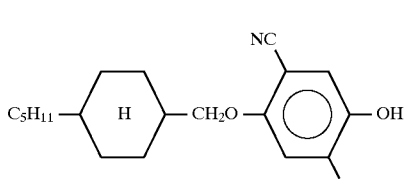 (4-56)
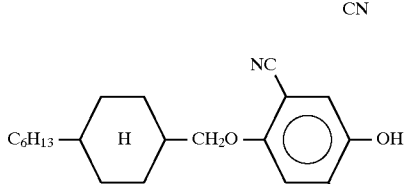 (4-57)
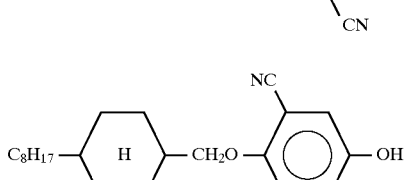 (4-58)
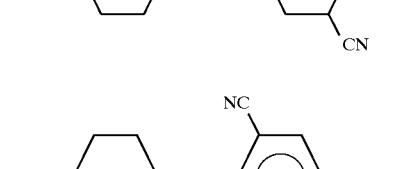 (4-59)
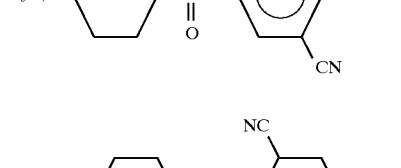 (4-60)
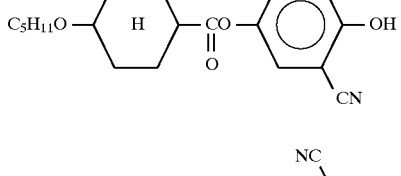 (4-61)
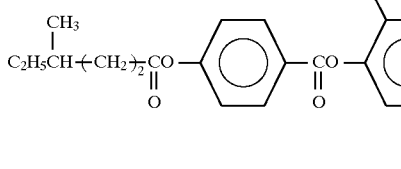 (4-62)
The resistivity-modifying substance represented by the formula (4) may generally be synthesized through the following reaction schemes.

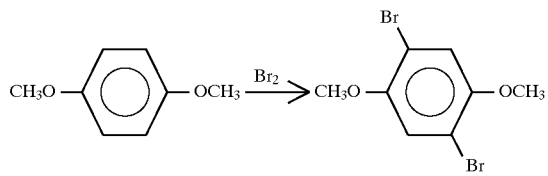

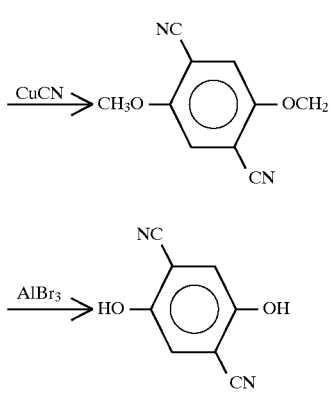

(Case where $X_4$ is —O—)

① when m is 0 or 1 and A is (Case where $X_4$ is —O—)

① when m is 0 or 1 and A is —[H]—

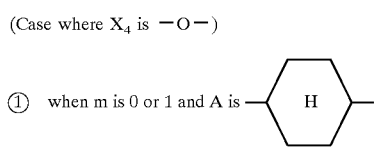

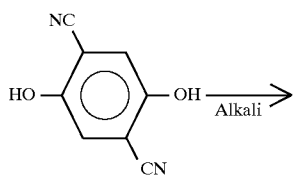

② when m is 1 and A is —⌬—

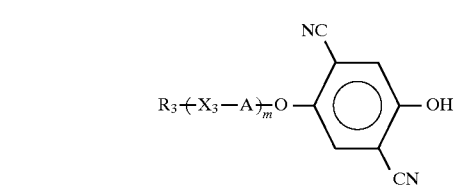

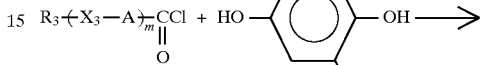

(Case where $X_4$ is —CO—)
    ||
    O

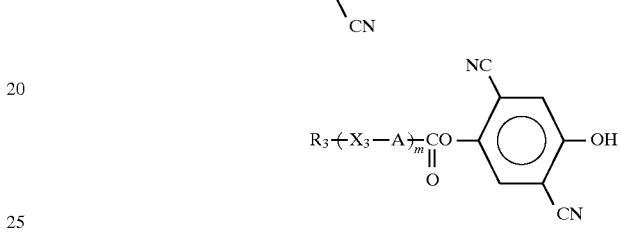

(Case where $X_4$ is —CH₂O—)

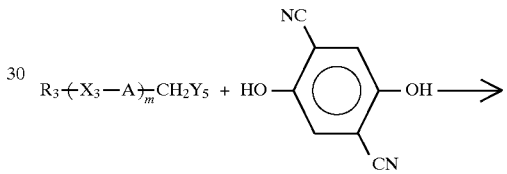

In the above, $R_3$, $X_3$, A and m are the same as defined above, and $Y_5$ denotes a group such as —Br, —I or

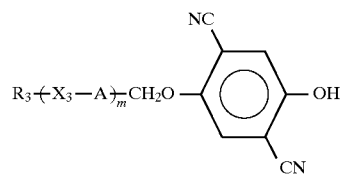

SYNTHESIS EXAMPLE 5

4-hexyloxy-2,5-dicyanophenol (Example Compound No. 4-3) was synthesized through the following steps i) to iv).

Step i)

In a 2 liter-reaction vessel, 200 g (1.45M) of hydroquinone dimethyl ether and 1 liter of gracial acetic acid were placed. To the mixture, a solution of 463 g (2.90M) of bromine in 300 ml of gracial acetic acid was added dropwise in 3 hours below 10° C., followed by stirring for 20 hours at room temperature to precipitate a crystal. The crystal was recovered by filtration and washed successively with water and methanol, followed by drying to obtain 323 g of 2,5-dibromo-1,4-dimethoxybenzene (Yield: 75.3%).

Step ii)

In a 3 liter-reaction vessel, 300 g (1.01M) of 2,5-dibromo-1,4-dimethoxybenzene, 215 g (2.40M) of cuprous cyanide and 1.5 liters of DMF (N,N-dimethylformamide) were placed, followed by heat-refluxing for 8 hours. After the reaction, the reaction mixture was cooled and poured into a solution of ferric chloride hexahydrate in 1.6N-hydrochloric acid to precipitate a crystal. The crystal was recovered by filtration and washed successively with 20%-ammonia water, water, and methanol, followed by drying to obtain 142 g of 2,5-dicyano-1,4-dimethoxybenzene (Yield: 74.8%).
Step iii)

In a 5 liter-reaction vessel, 100 g ($5.32 \times 10^{-1}$M) of 2,5-dicyano-1,4-dimethoxybenzene, 312.5 g (1.17M) of anhydrous aluminum tribromide and 2.5 liters of dry benzene were placed, followed by heat-refluxing for 7 hours. After the reaction, the reaction mixture as cooled and poured into a mixture of 3 kg of crushed ice and 500 ml of concentrated hydrochloric acid to precipitate a crystal. The crystal was recovered by filtration and dissolved in 2N-sodium hydroxide aqueous solution. The resultant insoluble residue was filtered off and the filtrate was acidified with 2N-hydrochloric acid to precipitate a crystal. The crystal was recovered by filtration and washed with water, followed by drying to obtain 35.5 g of 2,5-dicyanohydroquinone (Yield: 41.7%).
Step iv)

In a 300 ml-reaction vessel, 350 g ($2.19 \times 10^{-1}$M) of 2,5-dicyanohydroquinone, 23.8 g ($1.44 \times 10^{-1}$M) of n-hexylbromide, 20.0 g ($1.45 \times 10^{-1}$M) of potassium carbonate and 180 ml of DMF were placed, followed by stirring for 3 hours at 120° C. After the reaction, the reaction mixture was cooled and poured into 500 ml of 4N-hydrochloric acid, followed by extraction with ethyl acetate. The organic layer was washed with water and dried with anhydrous magnesium sulfate, followed by distilling-off of the solvent. The resultant residue was purified by silica gel column chromatography (eluent: n-hexane/ethyl acetate=2/1) to obtain 17.6 g of a crude product. The crude product was dissolved in ethanol and treated with activated carbon, followed by recrystallization from ethanol to obtain 8.2 g of 4-hexyloxy2,5-dicyanophenol (Yield: 22.9%).

Other resistivity-modifying substances contained in the liquid crystal composition may include various ionic substances, such as tetrabutylammonium bromide, triethylammonium bromide, tetrabenzylammonium bromide, tetrapropylammonium bromide, and tri(2-hydroxyethyl) ammonium bromide.

In formulating the liquid crystal composition according to the present invention, at least one species of a resistivity-modifying substance (electroconductive dopant) represented by the formulae (1)–(4) may preferably be contained in a total amount of 0.01–5 wt. % in the liquid crystal composition in view of its resistivity-reducing effect.

The liquid crystal composition used in the present invention may preferably contain the perfluoroalkyl-type mesomorphic compound as represented by the formula (I) together with the perfluoroether-type mesomorphic compound as represented by the formula (II) as the fluorine-containing mesomorphic compound since these mesomorphic compounds are excellent in mutual solubility (compatibility).

The liquid crystal composition may preferably contain at least one species of an optically active (chiral) compound which may have a fluorocarbon terminal portion. In case where the optically active compound has a fluorocarbon terminal portion, the liquid crystal composition may preferably contain the optically active compound in an appropriate amount depending on its type but may more preferably contain the optically active compound in an amount of 0.5–50 wt. %. In case where the optically active compound does not have a fluorocarbon terminal portion, such an optically active compound may preferably be contained in an amount of 0.1–10 wt. % based on the liquid crystal composition in view of its solubility with the fluorine-containing mesomorphic compound having a fluorocarbon terminal portion.

The liquid crystal composition may further contain another mesomorphic compound having no fluorocarbon terminal portion (so-called "hydrocarbon-type mesomorphic compound") in an appropriate amount, preferably in an amount of at least 30 wt. %.

Specific examples of the hydrocarbon-type mesomorphic compound (free from a fluorocarbon chain) as another mesomorphic compound may include those (Example Compound Nos. III-1 to III-121) shown below.

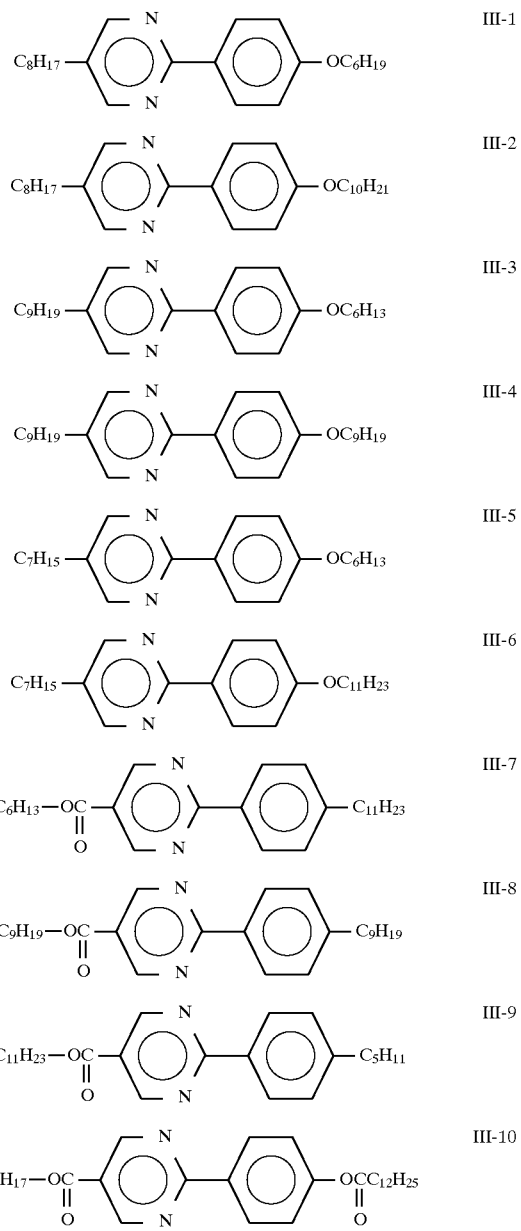

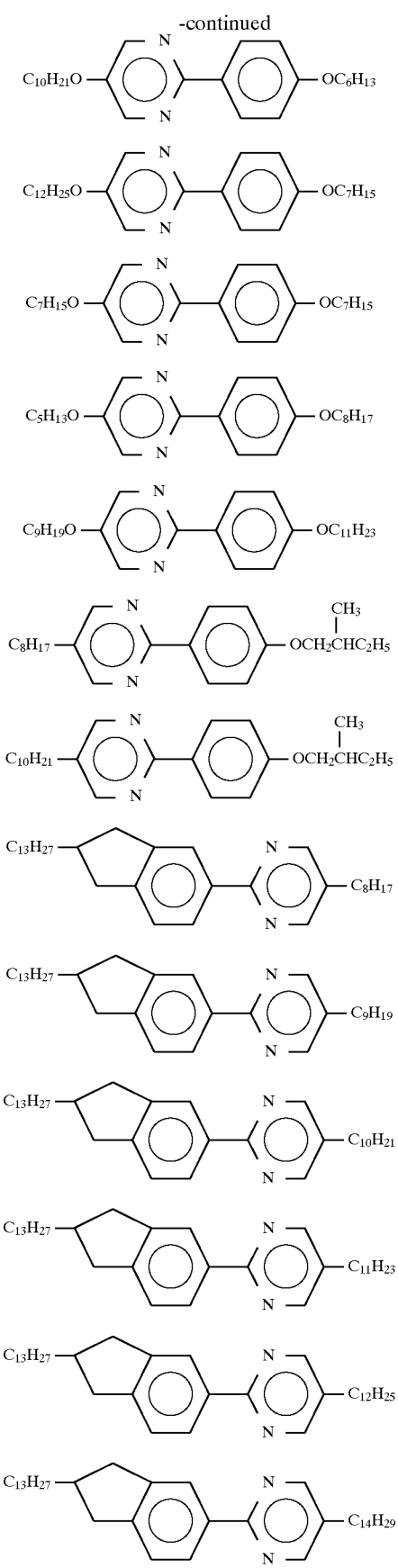
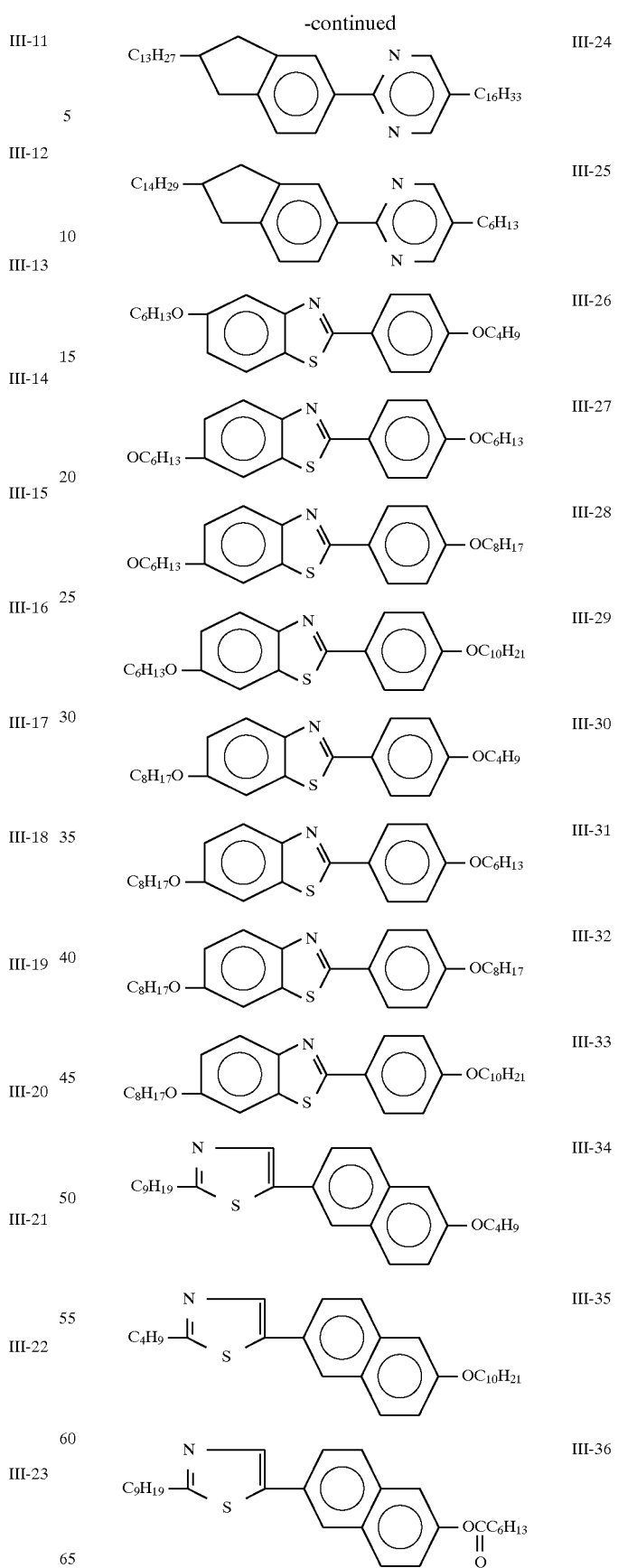

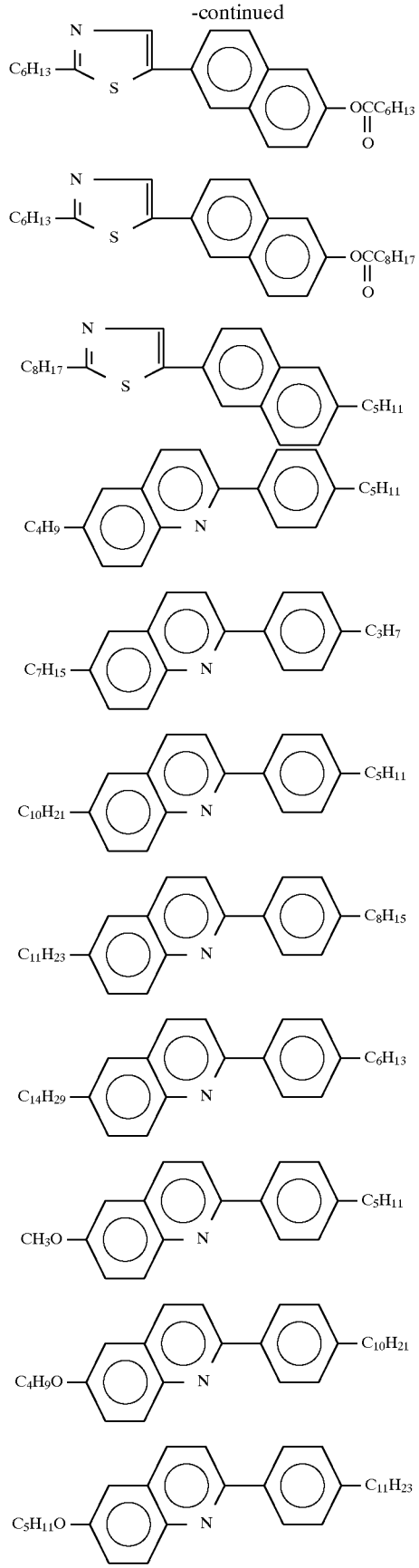
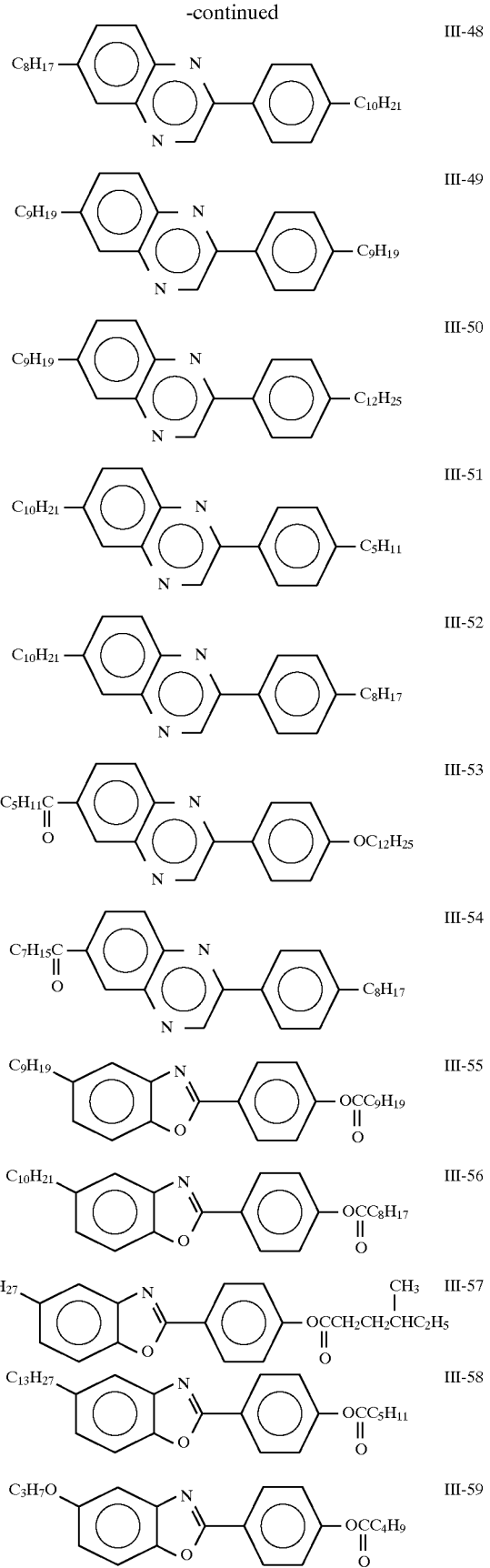

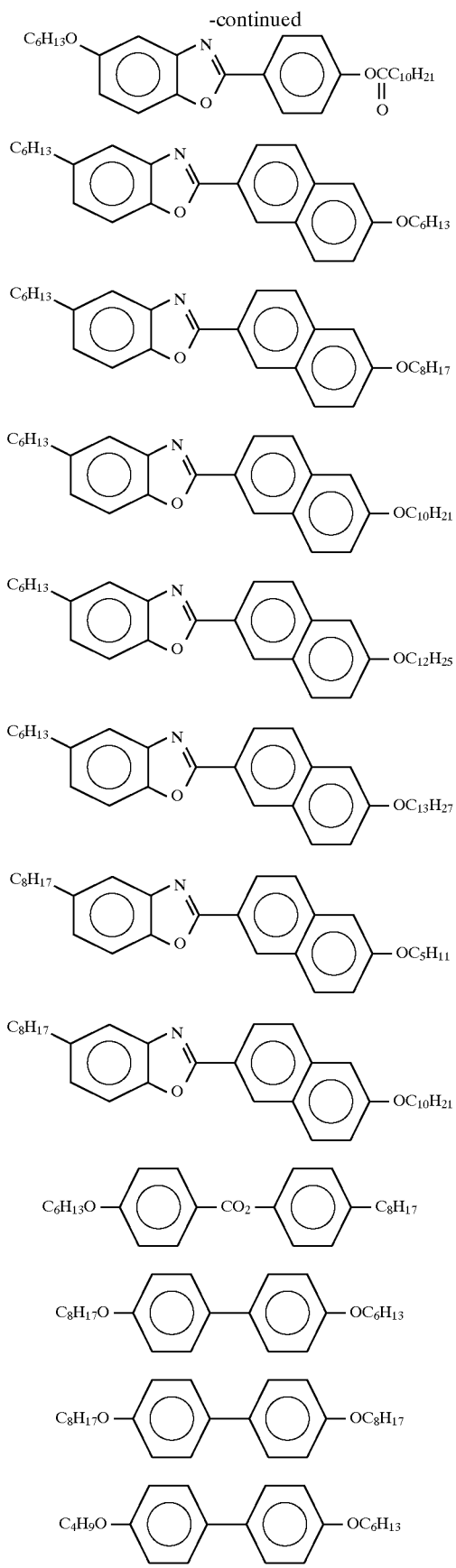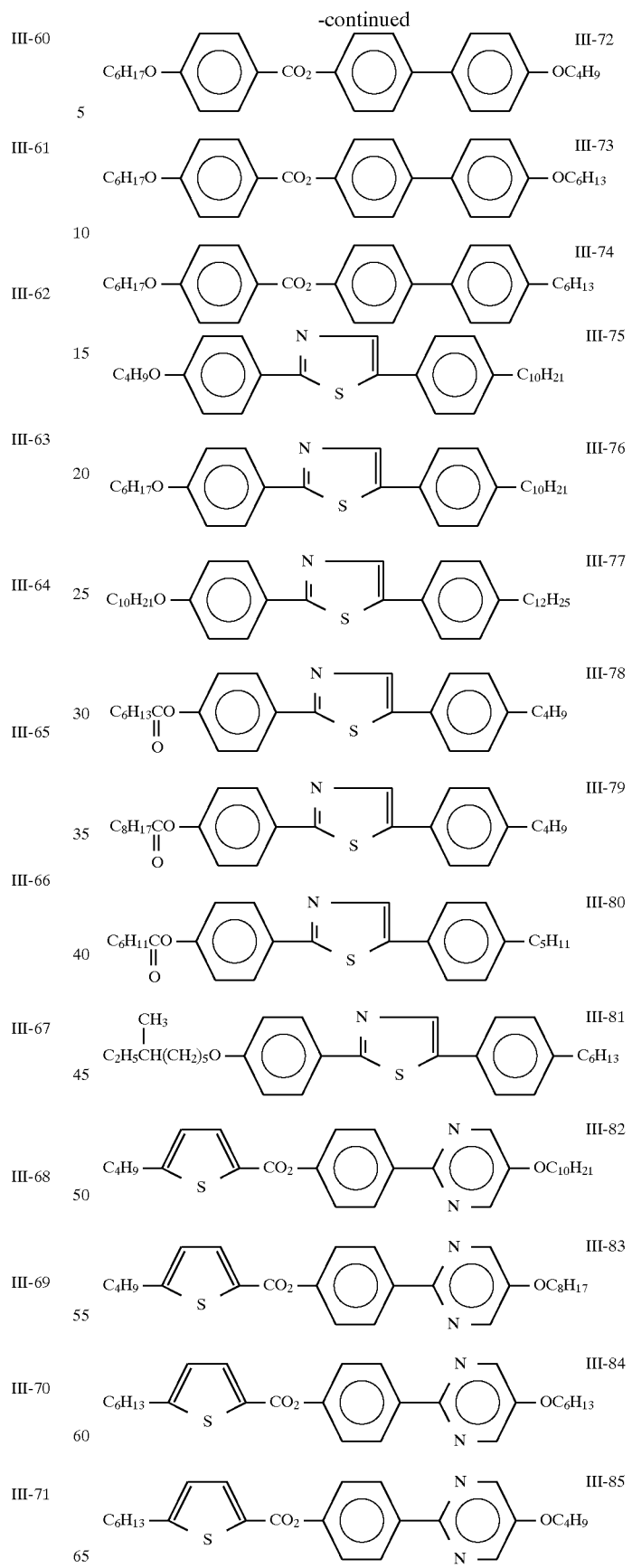

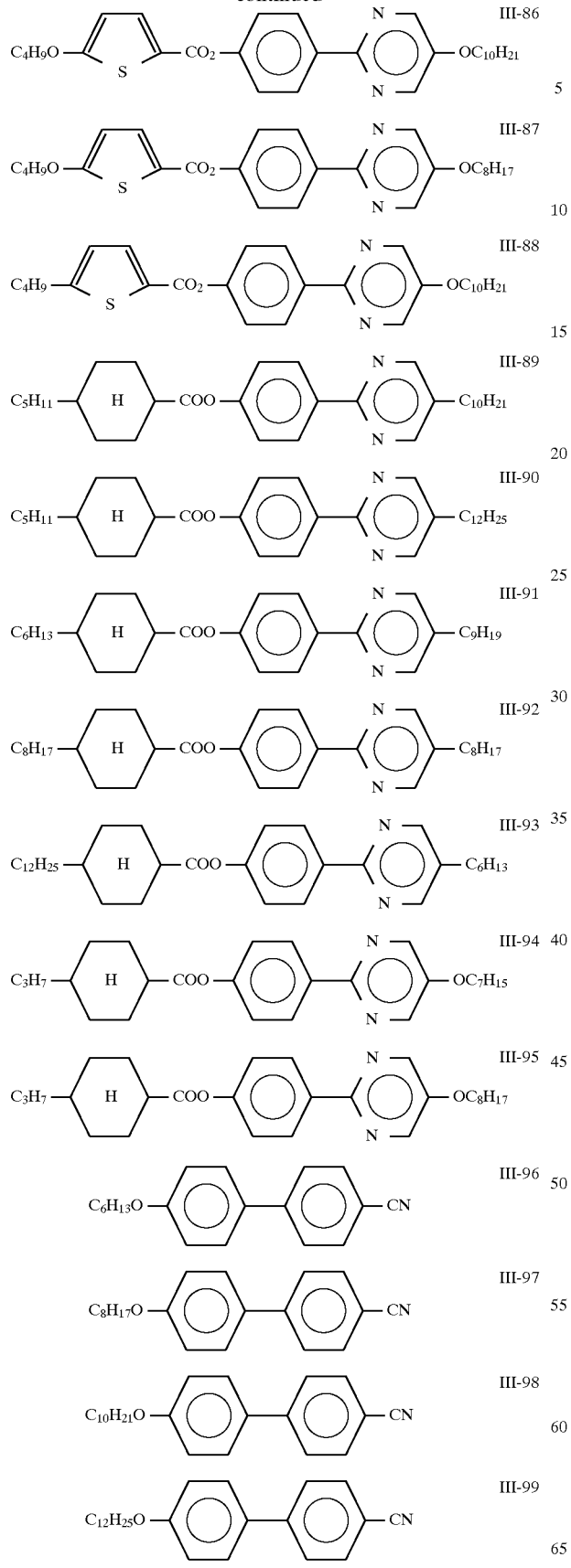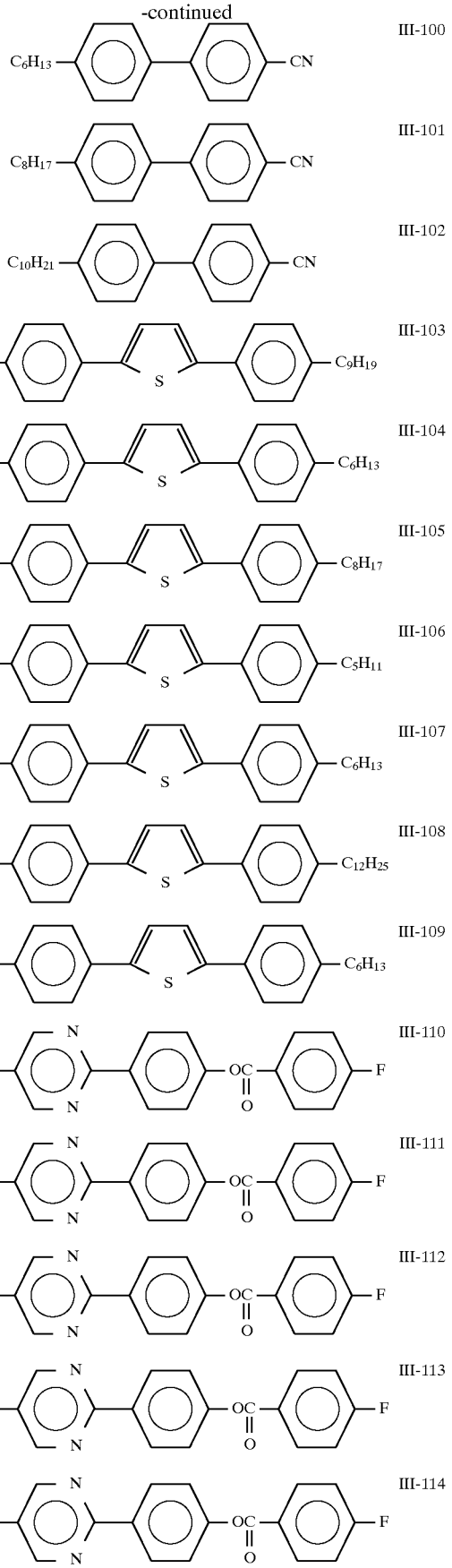

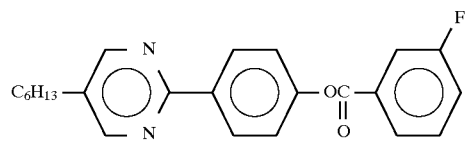

III-115

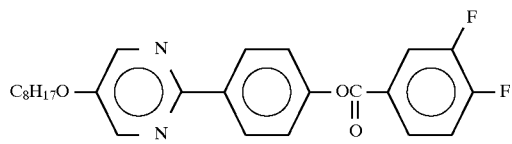

III-116

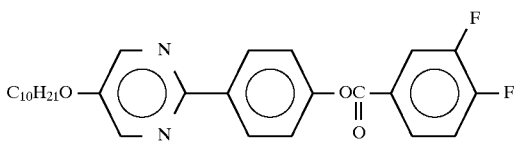

III-117

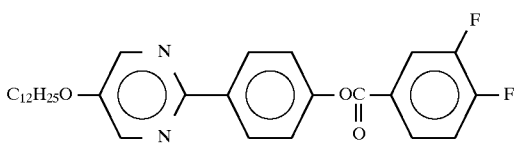

III-118

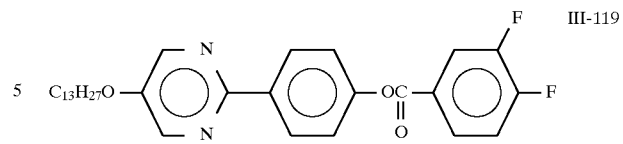

III-119

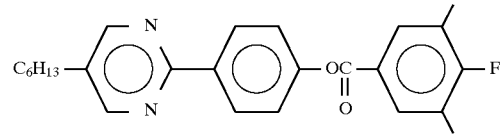

III-120

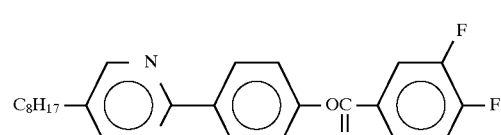

III-121

Specific examples of the optically active compound may preferably include those shown below.

TABLE A (for Compounds Nos. A-1 to A-105)
$R^{6"}-A^{6"}-X^{6"}-A^{7"}-A^{8"}-X^{7"}-R^{7"}-\Sigma^{**}-R^{9"}$

| No. | $R^{6"}$ | $A^{5"}$ | $X^{5"}$ | $A^{7"}$ | $A^{5"}$ | $X^{7"}$ | $R^{7"}$ | $\Sigma^{**}$ | $R^{5"}$ | $R^{9"}$ |
|---|---|---|---|---|---|---|---|---|---|---|
| 1 | $C_6H_{13}$ | — | — | Ph | Ph | — | M1 | Σ | H | $C_8H_{17}$ |
| 2 | $C_8H_{17}O$ | — | — | Ph | Ph | — | M1 | Σ | H | $C_{18}H_{37}$ |
| 3 | $C_5H_{11}O$ | — | — | Ph | Ph2F | — | M1 | Σ | H | $C_6H_{13}$ |
| 4 | $CH_3O$ | — | — | Ph | Ph | — | M1 | Σ | H | $C_6H_{13}$ |
| 5 | $C_6H_{13}CH(CH_3)(CH_2)_2O$ | — | — | Ph | Ph | — | M1 | Σ | H | $C_6H_{13}$ |
| 6 | $C_7H_{15}O$ | — | — | Ph | P23F | — | M1 | Σ | H | $C_6H_{13}$ |
| 7 | $C_6H_{13}$ | — | — | Ph | Ph | — | M1 | Σ | H | $C_9H_{19}$ |
| 8 | $C_7H_{15}O$ | — | — | Ph | Ph | — | M1 | Σ | H | $C_5H_{11}$ |
| 9 | $C_8H_{17}O$ | — | — | Ph | Ph | — | M1 | Σ | H | $C_6H_{13}$ |
| 10 | $C_8H_{17}$ | — | — | Pr1 | Ph | — | M1 | Σ | H | $C_8H_{17}$ |
| 11 | $C_{10}H_{21}$ | — | — | Pr2 | Ph | — | M1 | Σ | H | $C_4H_9$ |
| 12 | $C_{11}H_{23}$ | — | — | Pr2 | Ph | — | M1 | Σ | H | $C_6H_{13}$ |
| 13 | $C_{12}H_{25}$ | — | — | Pr2 | Ph | — | M1 | Σ | H | $C_8H_{17}$ |
| 14 | $C_4H_9O$ | — | — | Py1 | Ph | — | M1 | Σ | H | $C_{10}H_{21}$ |
| 15 | $C_{13}H_{27}$ | — | — | Py2 | Ph | — | M1 | Σ | H | $C_5H_{11}$ |
| 16 | $C_6H_{13}$ | — | — | Py2 | Ph | — | M1 | Σ | H | $C_8H_{17}$ |
| 17 | $C_6H_{13}CH(CH_3)CH_2O$ | — | — | Py2 | Ph | — | M1 | Σ | H | $C_9H_{19}$ |
| 18 | $C_5H_{11}O$ | — | — | Py2 | P23F | — | M1 | Σ | H | $C_4H_9$ |
| 19 | $C_{10}H_{21}$ | — | — | Py2 | Ph | — | M1 | Σ | H | $C_6H_{13}$ |
| 20 | $C_8H_{17}$ | — | — | Py2 | Ph3F | — | M1 | Σ | H | $C_8H_{17}$ |
| 21 | $C_6H_{13}$ | — | — | Cy | Ph | — | M1 | Σ | H | $C_4H_9$ |
| 22 | $C_3H_7$ | — | — | Cy | Ph | — | M1 | Σ | H | $C_5H_{11}$ |
| 23 | $C_5H_{11}$ | — | — | Cy | Ph | — | M1 | Σ | H | $C_{14}H_{20}$ |
| 24 | $C_{10}H_{21}$ | — | — | Cy | Ph | — | M1 | Σ | H | $C_{10}H_{21}$ |
| 25 | $C_6H_{13}$ | — | — | Pa | Ph | — | M1 | Σ | H | $C_{10}H_{31}$ |
| 26 | $C_7H_{15}OCO$ | — | — | Pd | Ph | — | M1 | Σ | H | $C_3H_7$ |
| 27 | $C_6H_{13}$ | — | — | Dt2 | Ph | — | M1 | Σ | H | $C_6H_{13}$ |
| 28 | $C_8H_{17}$ | — | — | Tn | Ph | — | M1 | Σ | H | $C_9H_{19}$ |
| 29 | $C_5H_{11}$ | — | — | Tz1 | Ph | — | M1 | Σ | H | $C_9H_{19}$ |
| 30 | $C_9H_{19}O$ | — | — | Tz2 | Ph | — | M1 | Σ | H | $C_6H_{13}$ |
| 31 | $C_2H_5$ | — | — | Td | Ph | — | M1 | Σ | H | $C_7H_{15}$ |
| 32 | $C_{10}H_{21}$ | — | — | Dx2 | Ph | — | M1 | Σ | H | $C_8H_{17}$ |
| 33 | $C_6H_{13}$ | — | — | Boa2 | Ph | — | M1 | Σ | H | $C_{10}H_{21}$ |
| 34 | $C_{15}H_{31}$ | — | — | Bob2 | Ph | — | M1 | Σ | H | $C_{10}H_{21}$ |
| 35 | $C_7H_{15}$ | — | — | Bta2 | Ph | — | M1 | Σ | H | $C_6H_{13}$ |
| 36 | $C_{16}H_{33}O$ | — | — | Btb2 | Ph | — | M1 | Σ | H | $C_9H_{19}$ |

TABLE A-continued (for Compounds Nos. A-1 to A-105)
$R^{6''}—A^{6''}—X^{6''}—A^{7''}—A^{8''}—X^{7''}—R^{7''}—\Sigma^{**}—R^{9''}$

| No. | $R^{6''}$ | $A^{5''}$ | $X^{5''}$ | $A^{7''}$ | $A^{5''}$ | $X^{7''}$ | $R^{7''}$ | $\Sigma^{**}$ | $R^{5''}$ | $R^{9''}$ |
|---|---|---|---|---|---|---|---|---|---|---|
| 37 | $C_6H_{13}$ | — | — | Np | Ph | — | M1 | Σ | H | $C_6H_{13}$ |
| 38 | $C_5H_{11}$ | — | — | Np | Ph | — | Cb | Σ | H | $C_5H_9$ |
| 39 | $C_8H_{17}CH(CH_3)CH_2O$ | — | — | Ep1 | Ph | — | Cb | Σ | H | $C_6H_{13}$ |
| 40 | $C_4H_9$ | — | — | Ep2 | Ph | — | M1 | Σ | H | $C_8H_{17}$ |
| 41 | $C_6H_{13}$ | — | — | Gp1 | Ph | — | M1 | Σ | H | $C_6H_{13}$ |
| 42 | $C_7H_{15}$ | — | — | Gp2 | Ph | — | M1 | Σ | H | $C_{12}H_{25}$ |
| 43 | $C_6H_{13}$ | — | — | Cm1 | Ph | — | M1 | Σ | H | $C_{10}H_{21}$ |
| 44 | $C_8H_{17}$ | — | — | Io1 | Ph | — | M1 | Σ | H | $C_{12}H_{25}$ |
| 45 | $C_{18}H_{37}$ | — | — | Id1 | Ph | M1 | M1 | Σ | H | $C_6H_{13}$ |
| 46 | $C_{11}H_{23}$ | — | — | Id1 | Ph | — | M1 | Σ | H | $C_5H_{11}$ |
| 47 | $C_8H_{17}$ | — | — | Id1 | Ph | — | M1 | Σ | H | $C_5H_{11}$ |
| 48 | $C_5H_{11}$ | — | — | Id1 | Ph2F | — | M1 | Σ | H | $C_6H_{13}$ |
| 49 | $C_6H_{13}$ | — | — | Tn | Ph | — | M1 | Σ | H | $C_6H_{13}$ |
| 50 | $C_4H_9O$ | — | — | TGz2 | Phy | — | M1 | Σ | H | $C_8H_{17}$ |
| 51 | $C_{12}H_{25}$ | — | — | Btb2 | Ph | — | M1 | Σ | H | $C_{10}H_{21}$ |
| 52 | $C_6H_{13}O$ | — | — | Btb2 | Ph | — | M1 | Σ | H | $C_6H_{13}$ |
| 53 | $CH_2=CH(CH_2)_3O$ | — | — | Ep2 | Ph | — | M1 | Σ | H | $C_5H_{11}$ |
| 54 | $C_9H_{19}$ | — | — | Gp2 | Ph | — | M1 | Σ | H | $C_6H_{13}$ |
| 55 | $C_5H_{11}$ | — | — | Np | Ph | — | M1 | Σ | H | $C_6H_{13}$ |
| 56 | $C_6H_{13}$ | Ph | — | Ph | Ph | Cb | M1 | Σ | H | $C_6H_{13}$ |
| 57 | $C_8H_{17}COO$ | Pr2 | — | Ph | Ph | — | M1 | Σ | H | $C_5H_{11}$ |
| 58 | $C_3H_7$ | Py2 | — | Ph | Ph | — | M1 | Σ | H | $C_4H_9$ |
| 59 | $C_5H_{11}$ | — | — | Ha2 | Ph | — | M1 | Σ | H | $C_4H_9$ |
| 60 | $C_6H_{13}$ | Ph | COO | Pr2 | Ph | — | M1 | Σ | H | $C_6H_{13}$ |
| 61 | $C_9H_{19}$ | Ph | — | Pr1 | Ph | — | Cb | Σ | H | $C_6H_{13}$ |
| 62 | $C_{13}H_{27}$ | Ph | — | Cy | P3Br | M1 | Cb | Σ | H | $C_5H_{11}$ |
| 63 | $C_{10}H_{21}O$ | Ph | OCO | Py1 | Ph | — | M1 | Σ | My | $C_6H_{13}$ |
| 64 | $C_7H_{15}$ | Ph | — | Py2 | Ph | — | M1 | Σ | H | $C_5H_{11}$ |
| 65 | $C_4H_9$ | Ph3TF | COO | Pa | Ph | — | M1 | Σ | H | $C_6H_{13}$ |
| 66 | $CH_3$ | — | — | Hb2 | Ph | — | M1 | Σ | H | $C_8H_{17}$ |
| 67 | $C_8H_{17}$ | Ph | — | Tn | Ph | — | M1 | Σ | H | $(CH_2)_3CH(CH_3)_2$ |
| 68 | $C_2H_5$ | Ph | — | Tz1 | Ph2M | — | M1 | Σ | H | $C_8H_{17}$ |
| 69 | $C_6H_{13}$ | Ph | — | Ph | Ph | — | M1 | Σ | H | $C_8H_{17}$ |
| 70 | $C_{10}H_{21}$ | Ph | — | Td | Ph | — | M1 | Σ | H | $(CH_2)_3CH(CH_3)_2$ |
| 71 | $C_{10}H_{21}$ | — | — | Ph | Py1 | — | M1 | Σ | H | $C_6H_{13}$ |
| 72 | $C_6H_{13}$ | — | — | Ph | Py1 | — | M1 | Σ | H | $C_4H_9$ |
| 73 | $C_6H_{13}OCO$ | — | — | Ph | Py1 | — | M1 | Σ | H | $C_6H_{13}$ |
| 74 | $C_7H_{15}$ | — | — | Ph | Pr2 | — | M1 | Σ | H | $C_5H_{11}$ |
| 75 | $C_9H_{19}$ | — | — | Ph | Pr2 | — | M1 | Σ | H | $(CH_2)_3CH(CH_3)_2$ |
| 76 | $C_7H_{15}$ | — | — | Ph | Pr2 | — | M1 | Σ | H | $C_6H_{13}$ |
| 77 | $C_5H_{11}O$ | — | — | Py2 | Cy | — | M1 | Σ | H | $C_{10}H_{21}$ |
| 78 | $C_4H_9$ | — | — | Ph | Cy | — | M1 | Σ | H | $C_{12}H_{25}$ |
| 79 | $C_{12}H_{25}$ | — | — | Ph | Cy | — | M1 | Σ | H | $C_5H_{11}$ |
| 80 | $C_6H_{13}C\equiv C$ | — | — | Ph | Pa | — | M1 | Σ | H | $C_{10}H_{21}$ |
| 81 | $C_8H_{17}O$ | — | — | Ph | Pd | — | M1 | Σ | H | $C_6H_{13}$ |
| 82 | $C_3H_7$ | — | — | P2Cl | Tn | — | M1 | Σ | H | $C_{10}H_{21}$ |
| 83 | $C_4H_9$ | — | — | Ph | Tn | — | M1 | Σ | H | $C_8H_{17}$ |
| 84 | $C_8H_{17}$ | — | — | Ph | Tz1 | — | M1 | Σ | H | $C_8H_{17}$ |
| 85 | $C_4H_9OCH(CH_3)COO$ | — | — | Ph | Tz1 | — | M1 | Σ | H | $C_7H_{15}$ |
| 86 | $C_6H_{13}$ | — | — | Ph2F | Td | — | M1 | Σ | My | $(CH_2)_3CH(CH_3)C_6H_{13}$ |
| 87 | $C_5H_{11}$ | — | — | Py2 | Np | — | M1 | Σ | H | $C_9H_{19}$ |
| 88 | $CH_3$ | — | — | Ph | Np | — | M1 | Σ | H | $C_{12}H_{25}$ |
| 89 | $C_{11}H_{23}$ | — | — | Ph | Np | — | M1 | Σ | H | $C_6H_{13}$ |
| 90 | $C_5H_{11}$ | — | — | Py1 | Ep1 | — | M1 | Σ | H | $C_5H_{11}$ |
| 91 | $C_8H_{17}OC_2H_4$ | — | — | Ph | Ep1 | — | M1 | Σ | H | $C_5H_{11}$ |
| 92 | $C_6H_{13}$ | — | — | Ph | Ep1 | — | M1 | Σ | H | $C_8H_{17}$ |
| 93 | $C_9H_{19}$ | — | — | Py1 | Gp1 | — | M1 | Σ | H | $C_5H_{11}$ |
| 94 | $C_8H_{17}$ | — | — | Ph | Gp1 | — | M1 | Σ | H | $C_6H_{13}$ |
| 95 | $C_3H_7COO$ | — | — | Ph | GP1 | — | M1 | Σ | H | $C_8H_{17}$ |
| 96 | $C_4H_9$ | — | — | Ph | Id1 | — | M1 | Σ | H | $C_8H_{17}$ |
| 97 | $C_{12}H_{25}$ | — | — | Ph | Io1 | Cb | M1 | Σ | H | $C_6H_{13}$ |
| 98 | $C_{10}H_{21}$ | — | — | Ph | Cm1 | — | M1 | Σ | H | $C_8H_{17}$ |
| 99 | $C_6H_{13}$ | — | — | Ph | Ph | — | M1 | Σ | H | $C_8H_{17}$ |
| 100 | $C_3H_7$ | Ph | $OCH_2$ | Ph | Py1 | — | M1 | Σ | H | $C_{12}H_{25}$ |
| 101 | $C_4H_9$ | PH2CN | — | Ph | Pr1 | — | M1 | Σ | H | $C_{10}H_{21}$ |
| 102 | $C_5H_{11}$ | Ph | $CH_2O$ | Ph3F | Tz1 | Cb | M1 | Σ | H | $C_6H_{13}$ |
| 103 | $C_6H_{13}$ | Ph | — | Ph | Tn | — | M1 | Σ | H | $C_8H_{17}$ |
| 104 | $C_7H_{15}$ | Tn | — | Ph | Py1 | — | M1 | Σ | H | $C_8H_{17}$ |
| 105 | $C_{10}H_{21}$ | Ph | — | Ph | Cy1 | — | M1 | Σ | H | $C_5H_{11}$ |

In Table A, the respective abbreviations (symbols) mean the following groups, respectively.

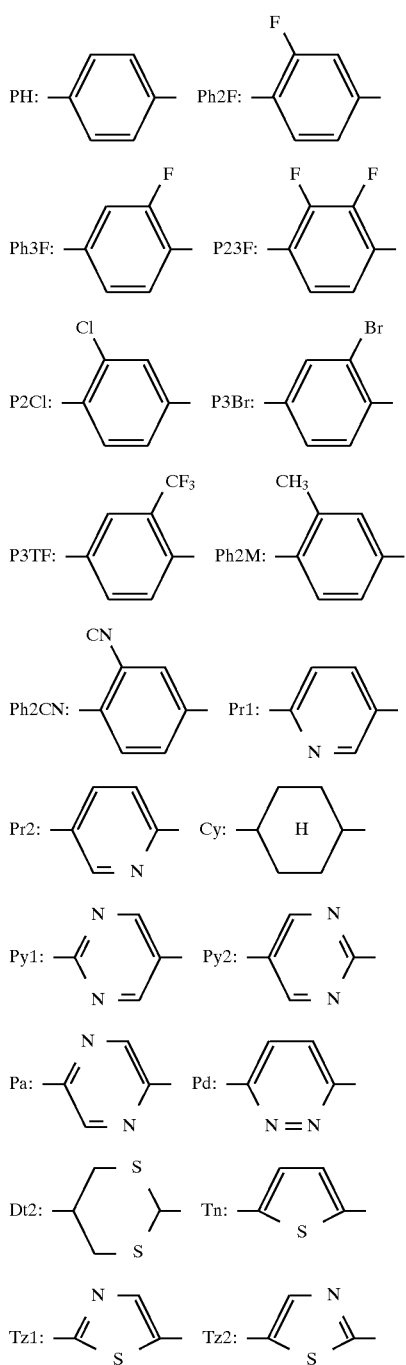
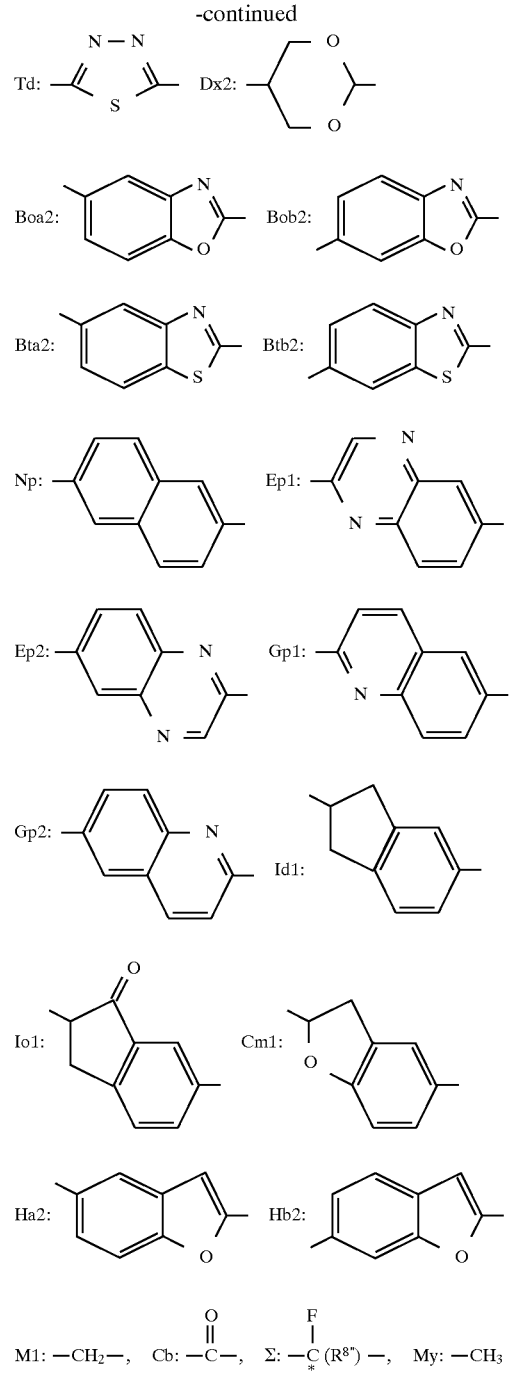

TABLE B (for Compounds Nos. B-1 to B-105)

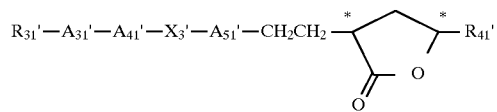

| No. | $R_{31}'$ | $A_{31}'$ | $A_{41}'$ | $X_3'$ | $A_{51}'$ | L | $R_{41}'$ |
|---|---|---|---|---|---|---|---|
| 1 | $C_6H_{13}$ | — | — | — | Ph | L | $C_8H_{17}$ |
| 2 | $C_8H_{17}O$ | — | — | — | Ph | L | $C_{18}H_{37}$ |
| 3 | $C_5H_{11}O$ | — | — | — | Ph2F | L | $C_6H_{13}$ |
| 4 | $CH_3O$ | — | Ph | — | Ph | L | $C_6H_{13}$ |
| 5 | $C_6H_{13}*CHF(CH_2)_2O$ | — | Ph | — | Ph | L | $C_6H_{13}$ |
| 6 | $C_7H_{15}O$ | — | Ph | — | Ph23F | L | $C_6H_{13}$ |
| 7 | $C_6H_{13}$ | — | Ph | $-OCH_2-$ | Ph | L | $C_9H_{19}$ |
| 8 | $C_6F_{13}CH_2O$ | — | Ph | $-C\equiv C-$ | Ph | L | $C_5H_{11}$ |
| 9 | $C_8H_{17}O$ | — | Ph | $-COO-$ | Ph | L | $C_5H_{13}$ |
| 10 | $C_8H_{17}$ | — | Pr1 | — | Ph | L | $C_8H_{17}$ |
| 11 | $C_{10}H_{21}$ | — | Pr2 | — | Ph | L | $C_4H_9$ |
| 12 | $C_{11}H_{23}$ | — | Pr2 | — | Ph | L | $C_6H_{13}$ |
| 13 | $C_{12}H_{26}$ | — | Pr2 | $-COO-$ | Ph | L | $C_8H_{17}$ |
| 14 | $C_4H_9O$ | — | Py1 | — | Ph | L | $C_{10}H_{21}$ |
| 15 | $C_{13}H_{27}$ | — | Py2 | — | Ph | L | $C_5H_{11}$ |
| 16 | $C_6H_{13}O$ | — | Py2 | — | Ph | L | $C_8H_{17}$ |
| 17 | $C_6H_{13}*CHFCH_2O$ | — | Py2 | — | Ph | L | $C_9H_{19}$ |
| 18 | $C_5H_{11}O$ | — | Py2 | — | Ph23F | L | $C_4H_9$ |
| 19 | $C_{10}H_{21}$ | — | Py2 | — | Ph | L | $C_6H_{13}$ |
| 20 | $C_8H_{17}$ | — | Py2 | — | Ph3F | L | $C_7H_{15}$ |
| 21 | $C_6H_{13}$ | — | Cy | — | Ph | L | $C_4H_8OC_4H_9$ |
| 22 | $C_7H_{15}OCO$ | — | Cy | — | Ph | L | $C_{14}H_{29}$ |
| 23 | $C_6H_{13}$ | — | Cy | $-CH=CH-$ | Ph | L | $C_{10}H_{21}$ |
| 24 | $C_3H_7$ | — | Cy | $-COO-$ | Ph | L | $C_6H_{13}$ |
| 25 | $C_5H_{11}$ | — | Pa | — | Ph | L | $C_8H_{17}$ |
| 26 | $C_{10}H_{21}$ | — | Pd | — | Ph | L | $C_6H_{13}$ |
| 27 | $C_6H_{13}$ | — | Dt2 | — | Ph | L | $(CH_2)_7CH=CH_2$ |
| 28 | $C_8H_{17}$ | — | Tn | — | Ph | L | $C_9H_{19}$ |
| 30 | $C_5H_{11}$ | — | Tz1 | — | Ph | L | $C_8H_{17}$ |
| 31 | $C_9H_{19}O$ | — | Tz2 | — | Ph | L | $C_5H_{11}$ |
| 32 | $C_2H_5$ | — | Td | — | Ph | L | $C_8H_{17}$ |
| 33 | $C_{10}H_{21}$ | — | Dx2 | — | Ph | L | $C_7H_{15}$ |
| 34 | $C_6H_{13}$ | — | Boa2 | — | Ph | L | $C_{10}H_{21}$ |
| 35 | $C_7H_{15}$ | — | Bob2 | — | Ph | L | $C_5H_{13}$ |
| 36 | $C_{16}H_{33}O$ | — | Bta2 | — | Ph | L | $C_6H_{13}$ |
| 37 | $C_6H_{13}$ | — | Btb2 | — | Ph | L | $C_{14}H_{29}$ |
| 38 | $C_5H_{11}$ | — | Np | $-COO-$ | Ph | L | $C_7H_{15}$ |
| 39 | $C_8H_{17}*CFHCH_2O$ | — | Ep1 | — | Ph | L | $C_{10}H_{21}$ |
| 40 | $C_4H_9$ | — | Ep2 | — | Ph | L | $C_6H_{13}$ |
| 41 | $C_6H_{13}$ | — | Gp1 | — | Ph | L | $C_{12}H_{25}$ |
| 42 | $C_7H_{15}$ | — | Gp2 | — | Ph | L | $C_6H_{13}$ |
| 43 | $C_6H_{13}$ | — | Cm1 | — | Ph | L | $C_8H_{17}$ |
| 44 | $C_8H_{17}$ | — | Io1 | — | Ph | L | $C_6H_{13}$ |
| 45 | $C_{20}H_{41}$ | — | Id1 | $-COO-$ | Ph | L | $C_4H_9$ |
| 46 | $C_{11}H_{23}$ | — | Id1 | — | Ph | L | $C_8H_{17}$ |
| 47 | $C_8H_{17}$ | — | Id1 | — | Ph | L | $C_8H_{17}$ |
| 48 | $C_5H_{11}$ | — | Id1 | — | Ph2F | L | $C_6H_{13}$ |
| 49 | $C_6H_{13}$ | — | Tn | — | Ph | L | $C_7H_{15}$ |
| 50 | $C_4H_9O$ | — | Tz2 | — | Ph | L | $C_9H_{19}$ |
| 51 | $C_{12}H_{25}$ | — | Btb2 | — | Ph | L | $C_6H_{13}$ |
| 52 | $C_6H_{13}O$ | — | Btb2 | — | Ph | L | $C_9H_{19}$ |
| 53 | $CH_2=CH(CH_2)_3O$ | — | Ep2 | — | Ph | L | $C_6H_{13}$ |
| 54 | $C_9H_{19}$ | — | Gp2 | — | Ph | L | $C_5H_{11}$ |
| 55 | $C_5H_{11}O$ | — | Np | — | Ph | L | $C_{10}H_{21}$ |
| 56 | $C_6H_{13}$ | Ph | Ph | — | Ph | L | $C_3H_7$ |
| 57 | F | Pr2 | Ph | — | Ph | L | $C_6H_{13}$ |
| 58 | $C_3H_7$ | Py2 | Ph | — | Ph | L | $C_8H_{17}$ |
| 59 | $C_5H_{11}$ | — | Ha2 | — | Ph | L | $C_{11}H_{23}$ |
| 60 | $C_6H_{13}$ | Ph | Pr2 | — | Ph | L | $C_6H_{13}$ |
| 61 | $C_9H_{19}$ | Ph | Pr1 | — | Ph | L | $C_5H_{11}$ |
| 62 | $C_{13}H_{27}$ | Ph | Cy | — | Ph3Br | L | $C_7H_{15}$ |
| 63 | $C_{10}H_{21}O$ | Ph | Py1 | — | Ph | L | $C_6H_{13}$ |
| 64 | $C_7H_{15}$ | Ph | Py2 | — | Ph | L | $C_{10}H_{21}$ |
| 65 | $C_4H_9$ | Ph3TF | Pa | — | Ph | L | $(CH_2)_3CH(CH_3)_2$ |
| 66 | H | — | Hb2 | — | Ph | L | $C_8H_{17}$ |
| 67 | $C_8H_{17}$ | Ph | Tn | — | Ph | L | $C_5H_{11}$ |
| 68 | $C_2H_5$ | Ph | Tz1 | — | Ph2M | L | $C_3H_7$ |
| 69 | $C_6H_{13}$ | Ph | Tz2 | — | Ph | L | $C_6H_{13}$ |

TABLE B-continued (for Compounds Nos. B-1 to B-105)

$$R_{31}'-A_{31}'-A_{41}'-X_3'-A_{51}'-CH_2CH_2-\overset{*}{\underset{O}{\diagup}}\overset{*}{\diagdown}R_{41}'$$

| No. | $R_{31}'$ | $A_{31}'$ | $A_{41}'$ | $X_3'$ | $A_{51}'$ | L | $R_{41}'$ |
|---|---|---|---|---|---|---|---|
| 70 | $C_{10}H_{21}$ | Ph | Td | — | Ph | L | $C_7H_{15}$ |
| 71 | $C_{10}H_{21}$ | — | Ph | — | Py1 | L | $C_6H_{13}$ |
| 72 | $C_6H_{13}$ | — | Ph | — | Py1 | L | $C_6H_{13}$ |
| 73 | $C_6H_{13}OCO$ | — | Ph | — | Py1 | L | $C_5H_{11}$ |
| 74 | $C_7H_{15}$ | — | — | — | Pr2 | L | $C_{10}H_{21}$ |
| 75 | $C_9H_{19}$ | — | Ph | — | Pr2 | L | $C_8H_{17}$ |
| 76 | $C_3H_7$ | — | Ph | — | Pr2 | L | $C_6H_{13}$ |
| 77 | $C_5H_{11}O$ | — | — | — | Cy | L | $C_4H_9$ |
| 78 | $C_4H_9$ | — | Ph | $-CH_2O-$ | Cy | L | $C_7H_{15}$ |
| 79 | $C_{12}H_{25}$ | — | Ph | — | Cy | L | $C_3H_7$ |
| 80 | $C_6H_{13}C\equiv C$ | — | Ph | — | Pa | L | $C_6H_{13}$ |
| 81 | $C_8H_{17}O$ | — | Ph | — | Pd | L | $C_5H_{11}$ |
| 82 | $C_3H_7$ | — | Ph2Cl | — | Tn | L | $C_{10}H_{21}$ |
| 83 | $C_4H_9$ | — | Ph | — | Tn | L | $C_7H_{15}$ |
| 84 | $C_8H_{17}$ | — | Ph | — | Tz1 | L | $C_{12}H_{25}$ |
| 85 | $C_4H_9OCH(CH_3)COO$ | — | Ph | — | Tz1 | L | $C_5H_{11}$ |
| 86 | $C_6H_{13}$ | — | Ph2F | — | Td | L | $(CH_2)_3CH(CH_3)C_6H_{13}$ |
| 87 | $C_5H_{11}$ | — | — | — | Np | L | $C_9H_{19}$ |
| 88 | $C_8H_{17}OCH_2CH_2$ | — | Ph | — | Np | L | $C_5H_{11}$ |
| 89 | $C_{11}H_{23}$ | — | Ph | — | Np | L | $C_6H_{13}$ |
| 90 | $C_5H_{11}$ | — | — | — | Ep1 | L | $C_4H_9$ |
| 91 | $CH_3$ | — | Ph | — | Ep1 | L | $C_7H_{15}$ |
| 92 | $C_6H_{13}$ | — | Ph | — | Ep1 | L | $C_6H_{13}$ |
| 93 | $C_9H_{19}O$ | — | — | — | Gp1 | L | $C_8H_{17}$ |
| 94 | $C_8H_{17}$ | — | Ph | — | Gp1 | L | $C_{10}H_{21}$ |
| 95 | $C_3H_7COO$ | — | Ph | — | Gp1 | L | $C_{11}H_{23}$ |
| 96 | $C_4H_9$ | — | Ph | — | Id1 | L | $C_7H_{15}$ |
| 97 | $C_{12}H_{25}$ | — | Ph | — | Io1 | L | $C_6H_{13}$ |
| 98 | $C_{10}H_{21}$ | — | Ph | — | Cm1 | L | $C_5H_{11}$ |
| 99 | $C_6H_{13}$ | — | Ph | — | Ph | L | $(CH_2)_4C_3F_7$ |
| 100 | $C_3H_7$ | Ph | Ph | — | Py1 | L | $C_7H_{15}$ |
| 101 | $C_4H_9$ | Ph2CN | Ph | — | Pr1 | L | $C_4H_9$ |
| 102 | $C_5H_{11}$ | Ph | Ph3F | — | Tz1 | L | $C_3H_7$ |
| 103 | CN | Ph | Ph | — | Tn | L | $CH_3$ |
| 104 | $C_7H_{15}$ | Tn | Ph | — | Py1 | L | $C_8H_{17}$ |
| 105 | $C_{10}H_{21}$ | Ph | Ph | — | Cy | L | $C_6H_{13}$ |

In Table B, the respective abbreviations (symbols) mean the following groups, respectively.

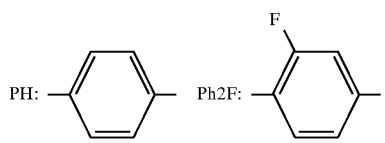

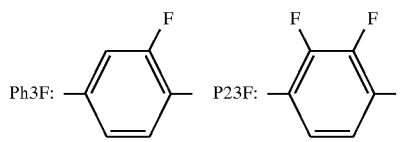

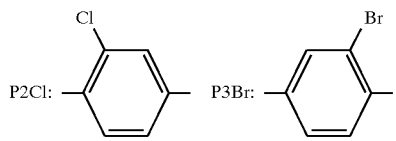

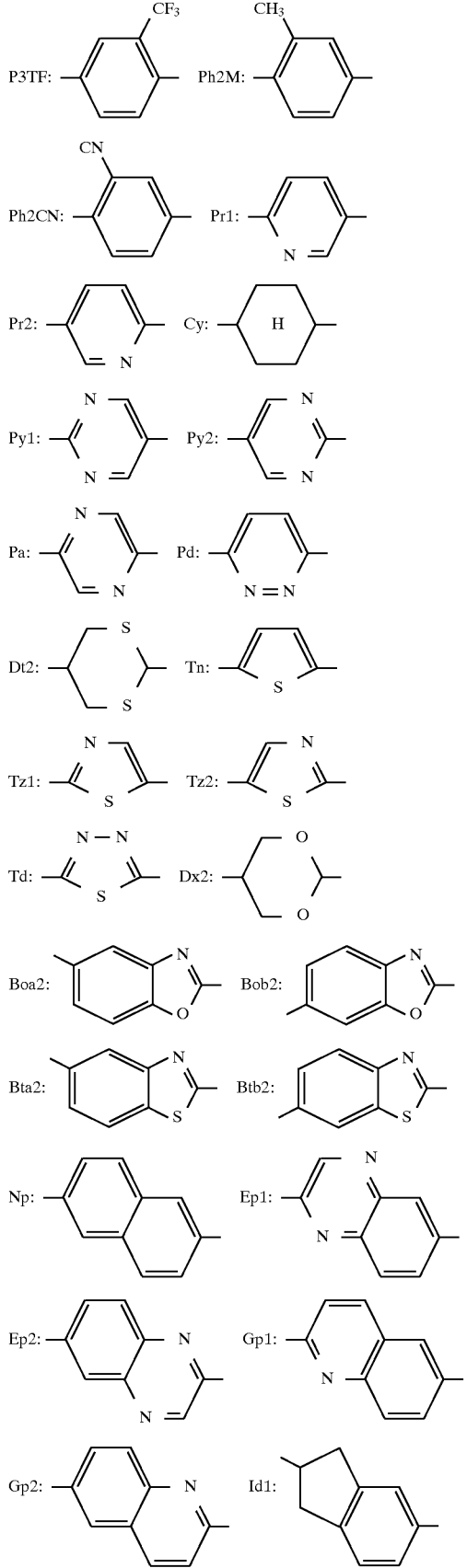

-continued
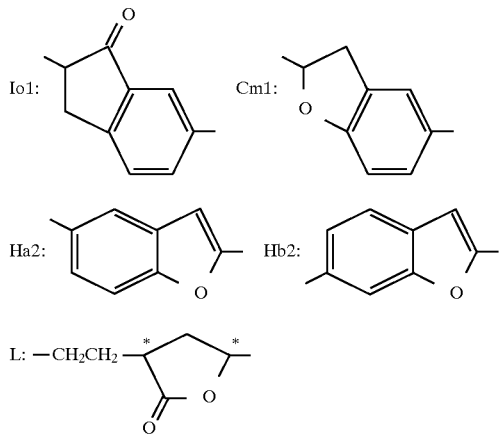
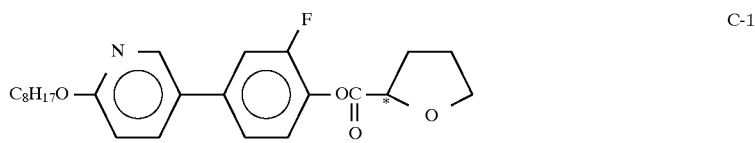
C-1
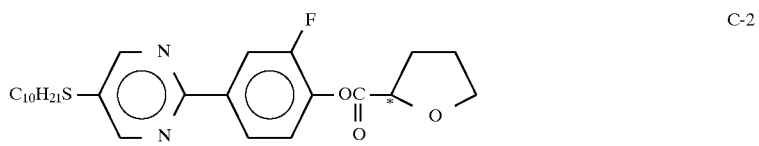
C-2
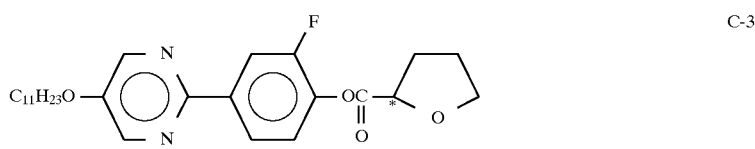
C-3
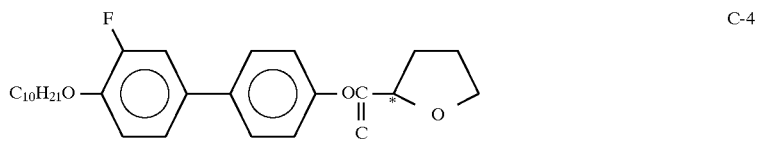
C-4
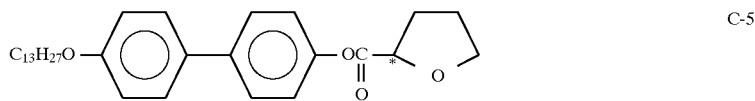
C-5
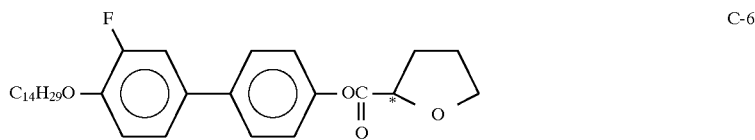
C-6
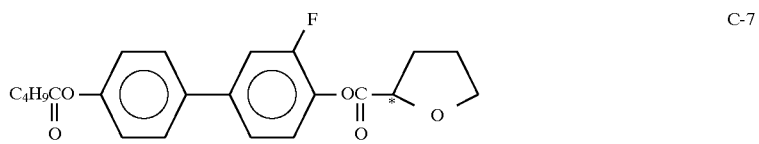
C-7
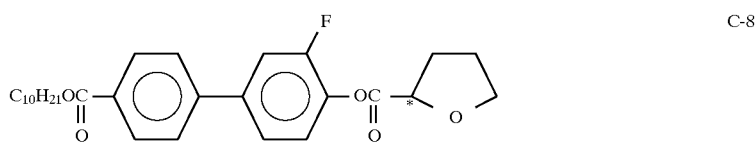
C-8

-continued
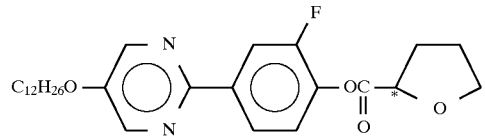
C-9
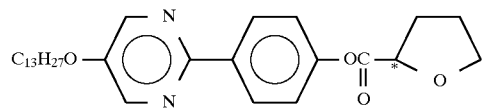
C-10
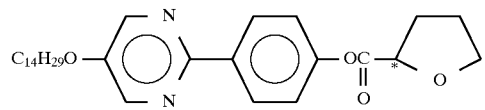
C-11
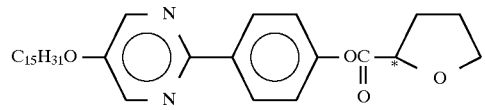
C-12
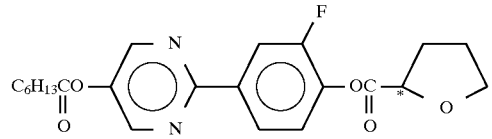
C-13
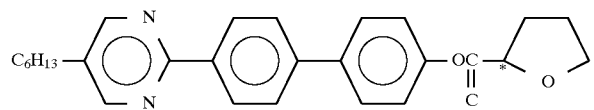
C-14
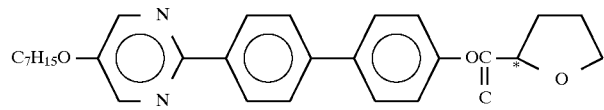
C-15
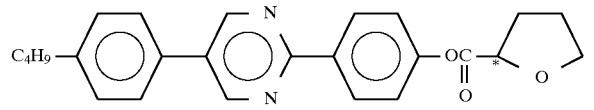
C-16
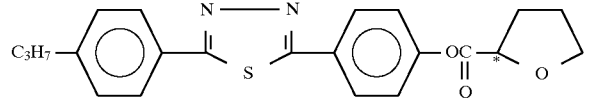
C-17
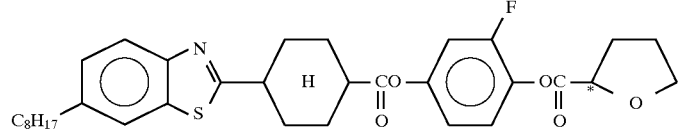
C-18
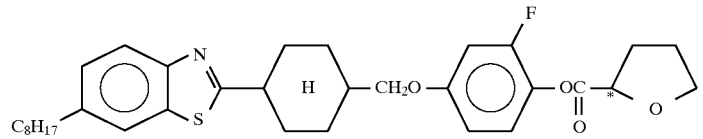
C-19
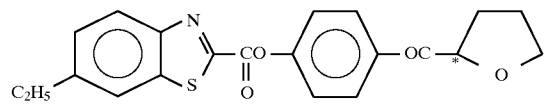
C-20

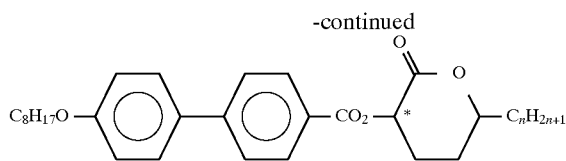
D-1: n=6, 2R, 5R
D-2: n=6, 2S, 5R
D-3: n=4, 2R, 5R
D-4: n=4, 2S, 5R
D-5: n=3, 2R, 5R
D-6: n=2, 2S, 5R
D-7: n=2, 2R, 5R
D-8: n=1, 2S, 5R
D-9: n=1, 2R, 5R
D-10: n=1
D-11: n=2
D-12: n=3
D-13: n=4
D-14: n=6
D-15: n=10
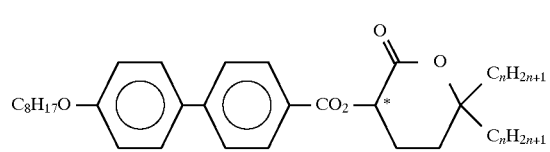
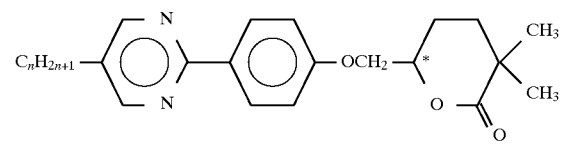
D-16: n=8
D-17: n=10
E-1: (2,5-cis)
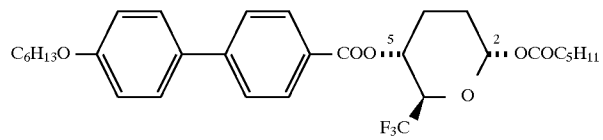
E-2: (2,5-cis)
E-3: (2,5-trans)
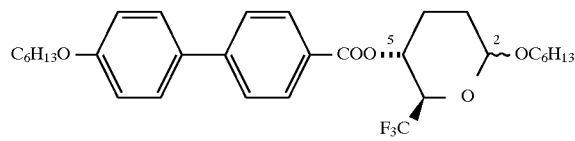
E-4: (2,5-cis)
E-5: (2,5-trans)
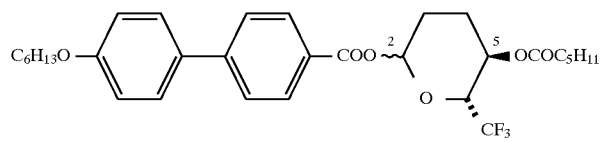
E-6: (2,5-cis)
E-7: (2,5-trans)
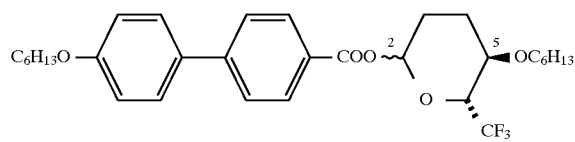
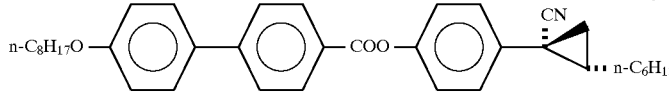
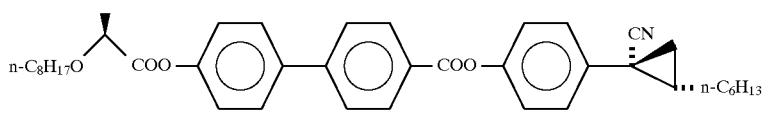
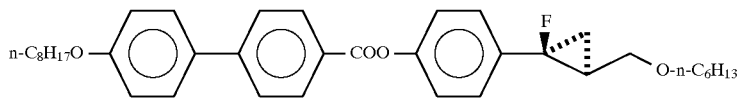
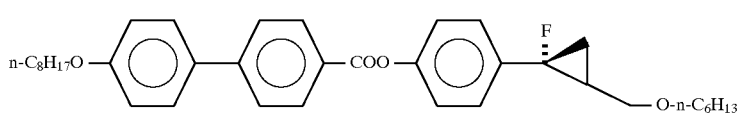

-continued

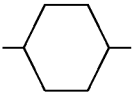

| $R_{11}$ | $R_{12}$ | $R_{13}$ | Configuration |
|---|---|---|---|
|  | $C_5H_{11}$ | $C_4H_9$ | 2S, 4S (cis) |
|  | $C_5H_{11}$ | $C_4H_9$ | 2R, 4S (trans) |
|  | $C_8H_{17}$ | $C_3H_7$ | 2S, 4S (cis) |
| 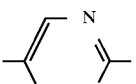 | $C_8H_{17}$ | $C_3H_7$ | 2R, 4S (trans) |
| 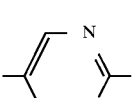 | $C_8H_{17}O$ | $C_4H_9$ | 2S, 4S (cis) |
| 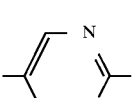 | $C_8H_{17}O$ | $C_4H_9$ | 2R, 4S (trans) |

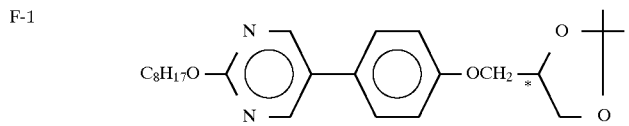

| $R_{14}$ | $R_{15}$ | Q | Configuration |
|---|---|---|---|
| $C_5H_{11}$ | $C_7H_{15}$ | H | 2R, 4S (cis) |
| $C_5H_{11}$ | $C_7H_{15}$ | H | 2S, 4S (trans) |
| $C_7H_{15}$ | $OC_9H_{19}$ | H | 2R, 4S (cis) |
| $C_7H_{15}$ | $OC_9H_{19}$ | H | 2S, 4S (trans) |
| $C_6H_{13}OCH_2$ | $C_7H_{15}$ | H | 2R, 4S (cis) |
| $C_6H_{13}OCH_2$ | $C_7H_{15}$ | H | 2S, 4S (trans) |
| $C_6H_{13}OCH_2$ | $OC_9H_{19}$ | H | 2R, 4S (cis) |
| $C_6H_{13}OCH_2$ | $OC_9H_{19}$ | H | 2S, 4S (trans) |
| $C_7H_{15}$ | $OC_9H_{19}$ | $CH_3$ | 2R, 4S (cis) |
| $C_7H_{15}$ | $OC_9H_{19}$ | $CH_3$ | 2S, 4S (trans) |

F-1

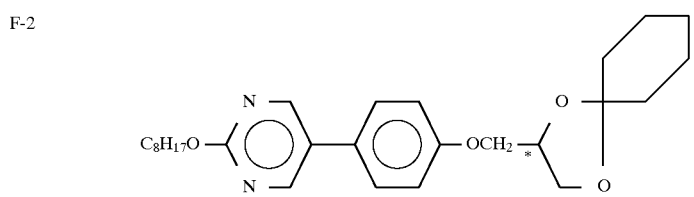

F-2

-continued

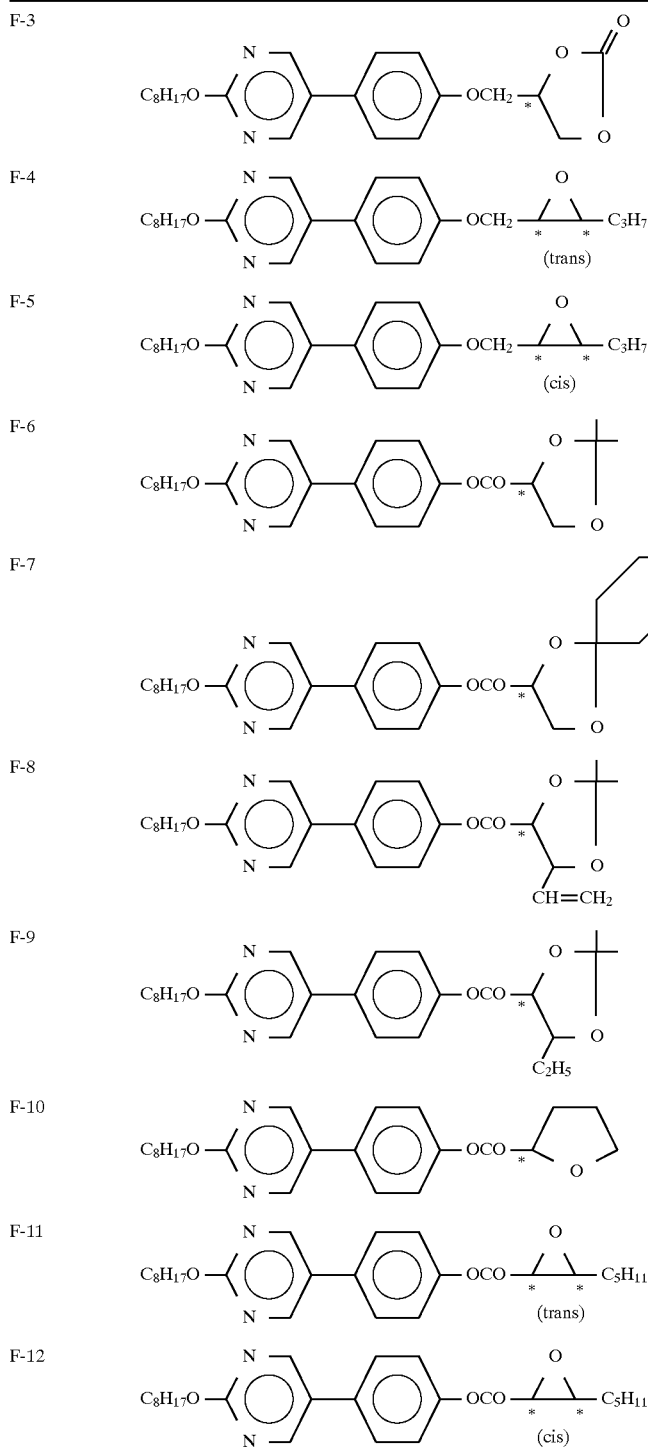

The liquid crystal composition used in the invention may further contain other compounds including additives such as an antioxidant, an ultraviolet ray-absorbing agent, dyes and pigments.

Hereinbelow, the liquid crystal device of the present invention will be described specifically with reference to FIG. 1.

FIG. 1 is a schematic sectional view of an embodiment of the liquid crystal device for explanation of the structure thereof.

Referring to FIG. 1, the liquid crystal device includes a liquid crystal layer 1 comprising a (chiral smectic) liquid crystal composition containing at least one species of the fluorine containing mesomorphic compound and at least one species of the resistivity-modifying substance (as main components) disposed between a pair of substrates 2 each having thereon a group of transparent electrodes 3 and an alignment control layer 4. In the present invention, however the alignment control layer 4 may be formed on one of the substrates 2. The substrates 2 are placed or arranged opposite each other. The periphery of the substrates 2 is sealed up with a sealing agent 5. Outside the substrates 2, a pair of polarizers 8 are disposed so as to modulate incident light $I_0$ from a light source 9 in cooperation with the liquid crystal 1 to provide modulated light I.

The liquid crystal layer 1 may preferably have a thickness (corresponding to a cell gap) of at most 5 μm, more preferably about 0.5–3 μm, in order to exhibit bistability or at least two optically stable states. Each of two substrates 2 comprise glass or plastic and is coated with a transparent electrode 3 having a prescribed pattern (e.g., stripe pattern) and comprising a film of $SnO_2$, $In_2O_3$ or ITO (indium-tin-oxide) to form an electrode plate. On at least one of the substrates 2, the alignment control layer 4 is formed via an insulating layer (not shown), as desired, by applying a solution containing a material for the alignment control layer or by vapor deposition or sputtering of a material for the alignment control layer. Examples of the material for the alignment control layer 4 may include: an inorganic material, such as silicon monoxide, silicon dioxide, aluminum oxide, zirconium oxide, magnesium fluoride, cerium oxide, cerium fluoride, silicon nitride, silicon carbide, or boron nitride; and an organic material, such as polyvinyl alcohol, polyimide, polyamide-imide, polyester, polyamide, polyester-imide, polyparaxylylene, polycarbonate, polyvinyl acetal, polyvinyl chloride, polystyrene, polysiloxane, cellulose resin, melamine resin, urea resin or acrylic resin. The surface of thus prepared alignment control layer 4 is subjected to a prescribed (uniaxial) alignment treatment, as desired, e.g., by rubbing the surface with a fibrous material such as velvet, cloth or paper. The alignment control layer 4 may be formed by an oblique vapor deposition method wherein a film of an oxide such as $SiO_2$ or an nitride is vapor-deposited on the electrode plate(s) from an oblique direction to the electrode plate.

The liquid crystal device of the invention may further comprise a short circuit-preventing layer for the pair of substrates such as an insulating layer, an inorganic material layer and an organic material layer other than those for the above-mentioned alignment control layer. The pair of substrates 2 are held to have a prescribed (but arbitrary) gap (e.g., at most 5 μm, preferably 0.5–3 μm) with a gap-controlling spacer (not shown) of, e.g., silica beads or alumina beads. A voltage is applied to the liquid crystal layer 1 in accordance with a switching signal from a signal power supply (not shown), thus effecting switching. As a result, the liquid crystal device functions as a light valve such a display device. Further, in case where two groups of electrodes are arranged in matrix (so as to intersect with each other, e.g., at right angles) on the pair of substrates, it is possible to perform pattern display and pattern exposure, so that the liquid crystal device is used as a display device for a personal computer, a word processor, etc., or a light valve for a printer.

In the liquid crystal device according to the first aspect of the present invention, as described above, the pair of substrates are subjected to different aligning treatments in order to appropriately control an alignment (orientation) state, particularly an initial alignment state, of liquid crystal molecules of a chiral smectic liquid crystal composition. This may be attributable to such a phenomenon that batonnets (e.g., islands of smectic phase) are first gradually generated and are jointed together to complete the formation of smectic layer during a phase transition from isotropic (Iso) phase to smectic (Sm) (e.g., smectic A ($S_A$) phase) since the liquid crystal composition does not assume or little assumes cholesteric (Ch) phase. In this case, the batonnets grow from the one substrate side toward the other substrate side while forming the smectic layer structure, thus readily realizing a good (uniform) alignment. Specifically, for example, it is possible to adopt different aligning treatments wherein one of the substrates is provided with a rubbing-treated alignment control layer (preferably a polyimide film) and the other substrate is provided with an alignment control film not subjected to rubbing and comprising a material identical to or different from that of the rubbing-treated alignment control layer. The different aligning treatments may be applicably to the liquid crystal device according the second aspect of the present invention.

The liquid crystal device of the present invention includes at least one alignment control layer having a thickness of at most 200 Å (the second aspect of the invention) or at least one alignment control layer consisting of a polyimide film (the first aspect of the invention).

The former alignment control layer may preferably have a thickness of at most 100 Å and may preferably comprise a polyimide film (particularly a rubbing-treated polyimide film), in order to allow good driving characteristics, a high reliability and a driving stability in a wide temperature range.

The latter alignment control layer (polyimide alignment control layer) may generally be prepared by applying a polyamic acid (polyimide precursor) solution onto the surface (electrodes) of the substrate(s), heating the applied (coating) layer and subjecting the above-described uniaxially aligning (rubbing) treatment.

In the present invention, when the polyimide alignment control layer is used in combination with a chiral smectic liquid crystal composition disposed between the pair of substrates subjected to different aligning treatments, it is possible to attain a liquid crystal device providing good driving characteristics, a high reliability and a driving stability in a very wide temperature range. Particularly, by using a polyimide alignment control layer having a small thickness (at most 200 Å) subjected to rubbing treatment formed on one substrate and an alignment control layer consisting of other materials (e.g., a layer of a silane coupling agent) not subjected to rubbing treatment on the other substrate in combination, it is possible to provide a particularly stable alignment control ability and excellent drive characteristics.

In view of uniform alignment and a good switching characteristic, the alignment control layer 4 may preferably comprise a polyimide film represented by the following formula (P) as a recurring unit.

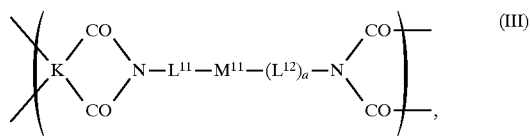

in which

K is
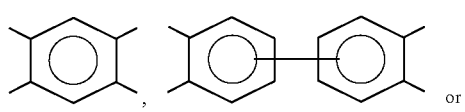,
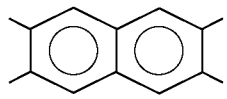
$L^{11}$ and $L^{12}$ independently denote
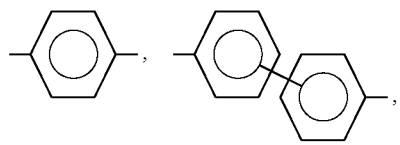,
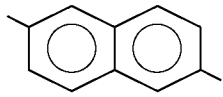
or an alkylene group having 1–20 carbon atoms;
$M^{11}$ is a single bond or —O—; and
a is 0, 1 or 2.
Specific examples of the polyimide of the formula (P) include those having the following recurring units shown below.
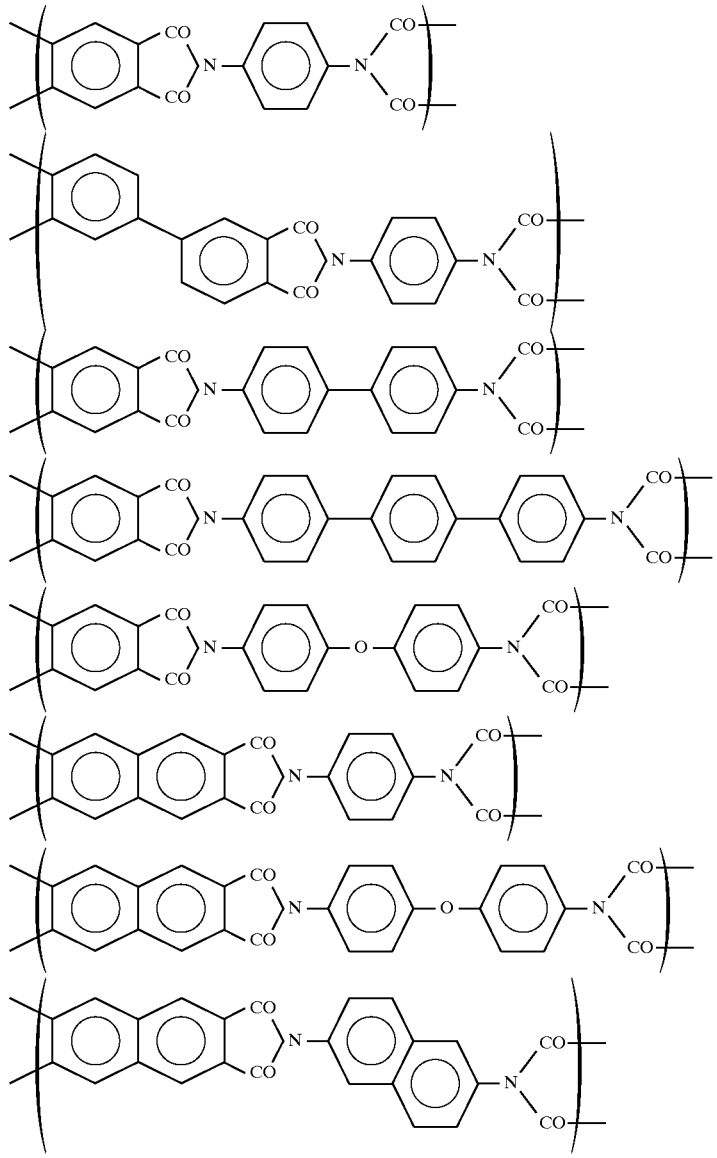

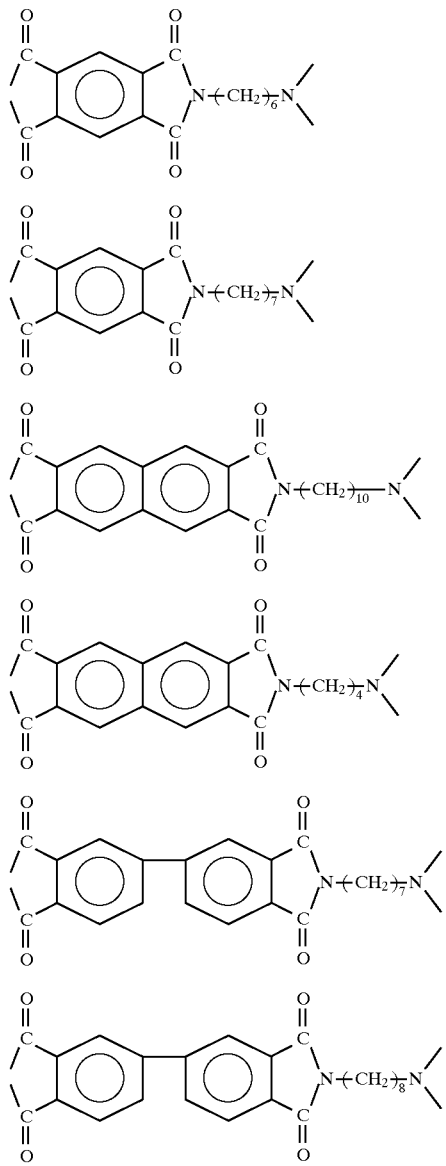

The liquid crystal device according to the present invention is used as a display element (medium), for various liquid crystal apparatus, one embodiment of which is described below.

Figure 2:
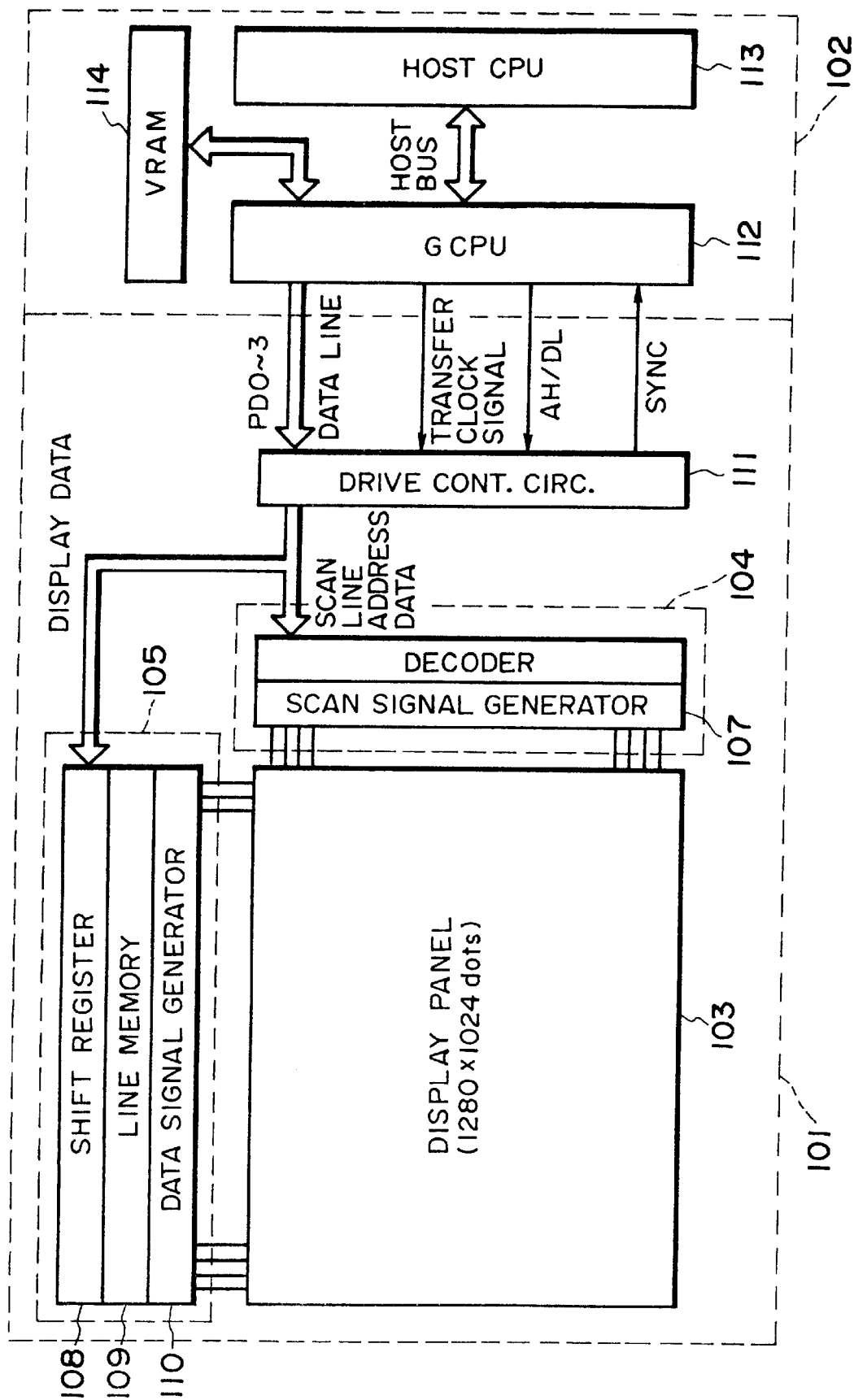
FIG. 2 is a block diagram showing a display apparatus comprising a liquid crystal device of the present invention and a graphic controller.
Figure 3:
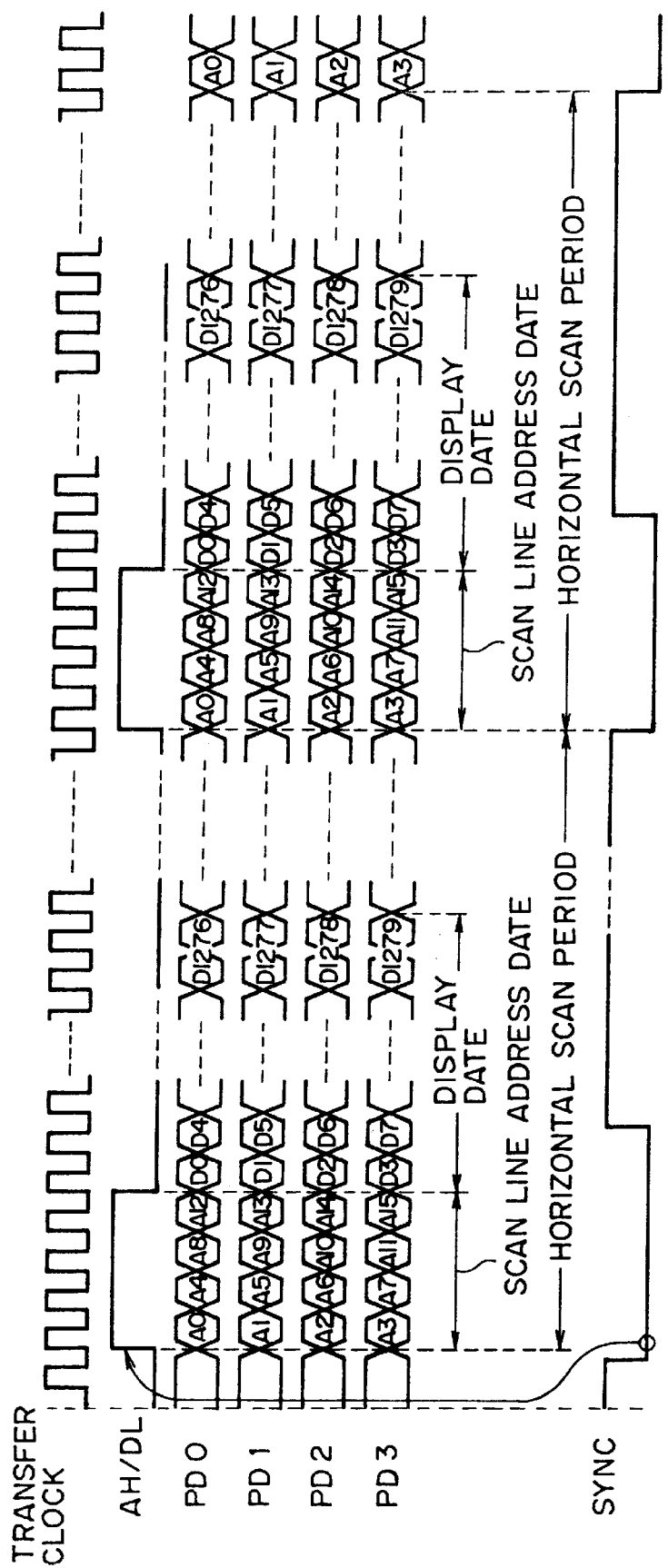
FIG. 3 is a time chart of image data communication showing time correlation between signal transfer and driving with respect to a liquid crystal display apparatus and a graphic controller.

Based on an arrangement appearing hereinbelow and data format comprising image data accompanied with scanning line address data and by adopting communication synchronization using a SYNC signal as shown in FIGS. 2 and 3, there is provided a liquid crystal display apparatus of the present invention which uses the liquid crystal device according to the present invention as a display panel portion.

Referring to FIG. 2, a chiral smectic liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means. The graphic controller 102 principally comprises a CPU (central processing unit, hereinafter referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally performed by the graphic controller 102. A light source (not shown) is disposed at the back of the display panel 103.

The liquid crystal display apparatus of the present invention employs the above-described liquid crystal device showing a good switching characteristic as a display panel (medium), so that the display apparatus exhibits excellent drive characteristics and reliability and provides high-definition and large-area display images at high speed.

The liquid crystal device using the liquid crystal composition according to the present invention may be driven by driving methods as disclosed in, e.g., JP-A 59-193426, JP-A 59-193427, JP-A 60-156046 and JP-A 60-156047.

Figure 5:
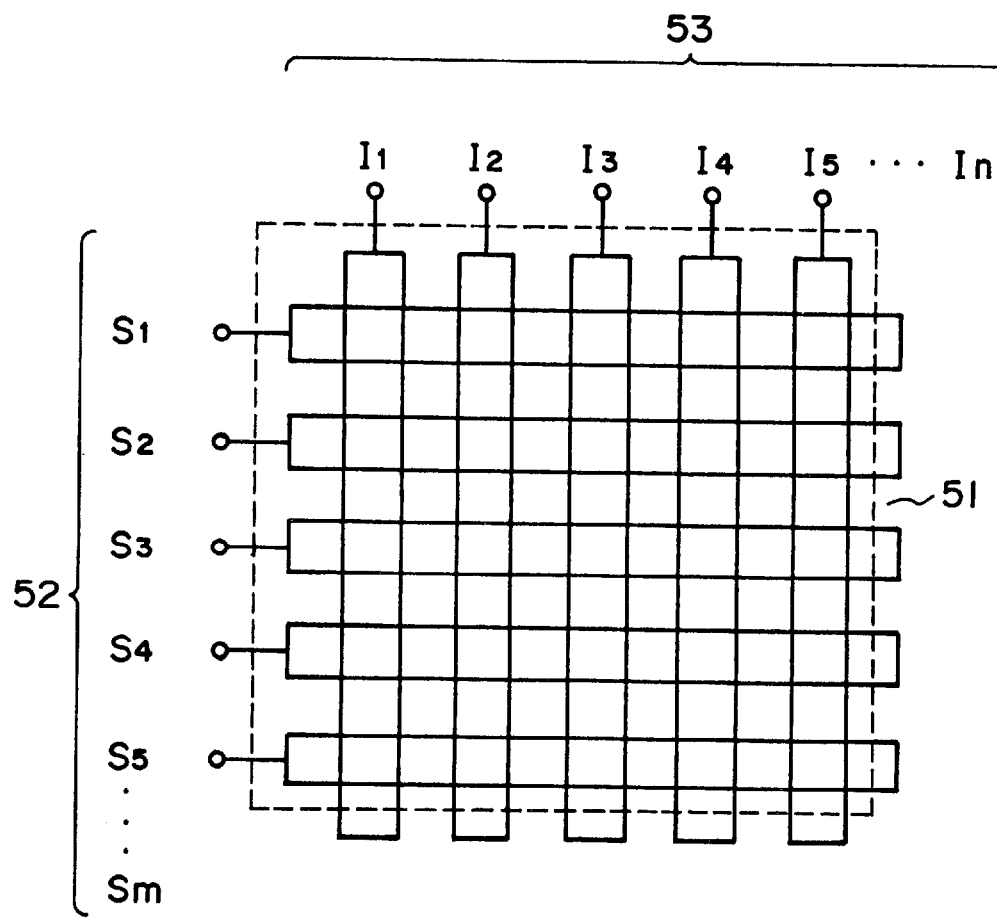
FIG. 5 is a plan view of an electrode matrix.
Figure 6A:
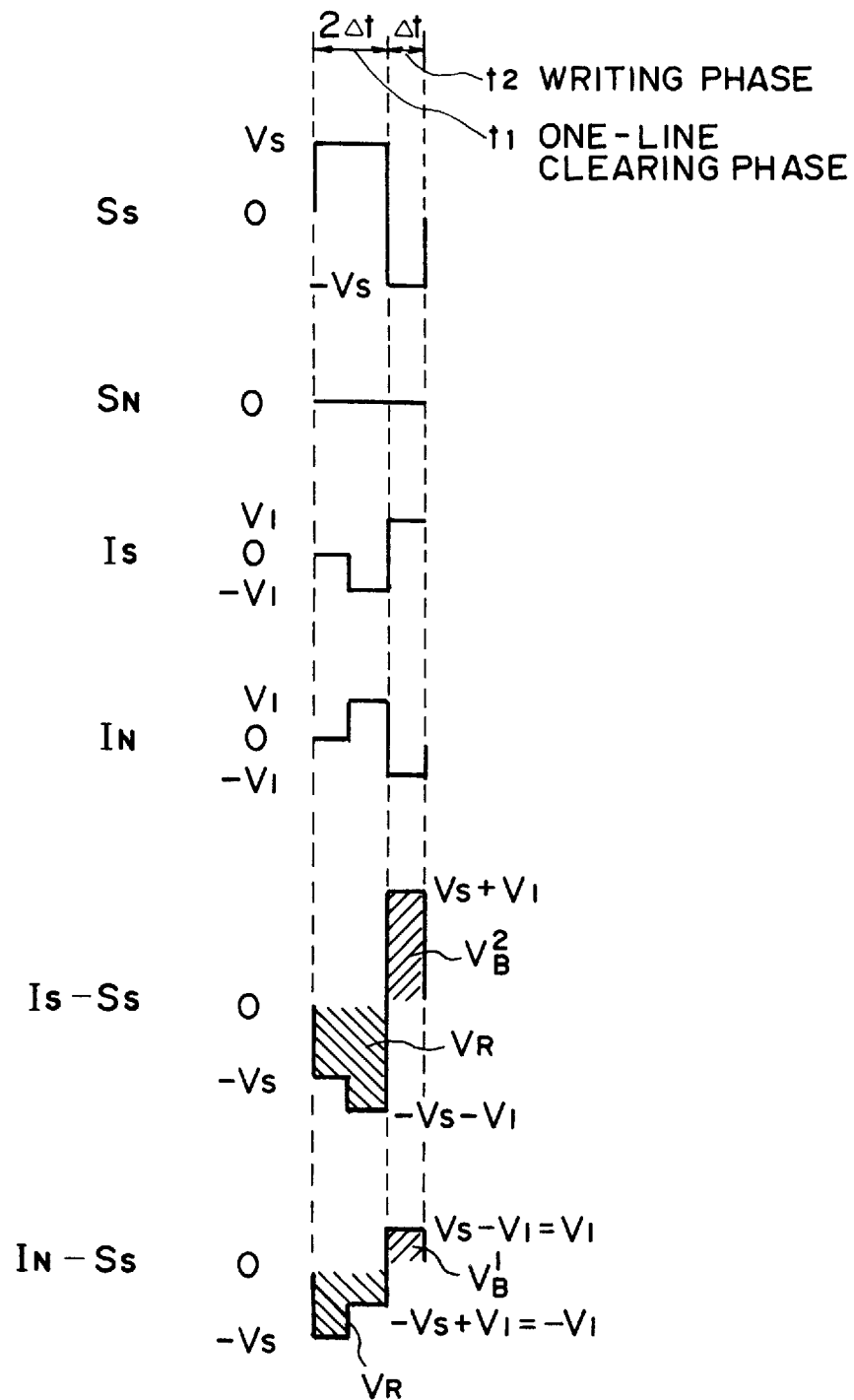
FIG. 6A shows an embodiment of unit driving waveforms and FIG. 6B is time-serial waveforms comprising a succession of such unit waveforms.
Figure 6B:
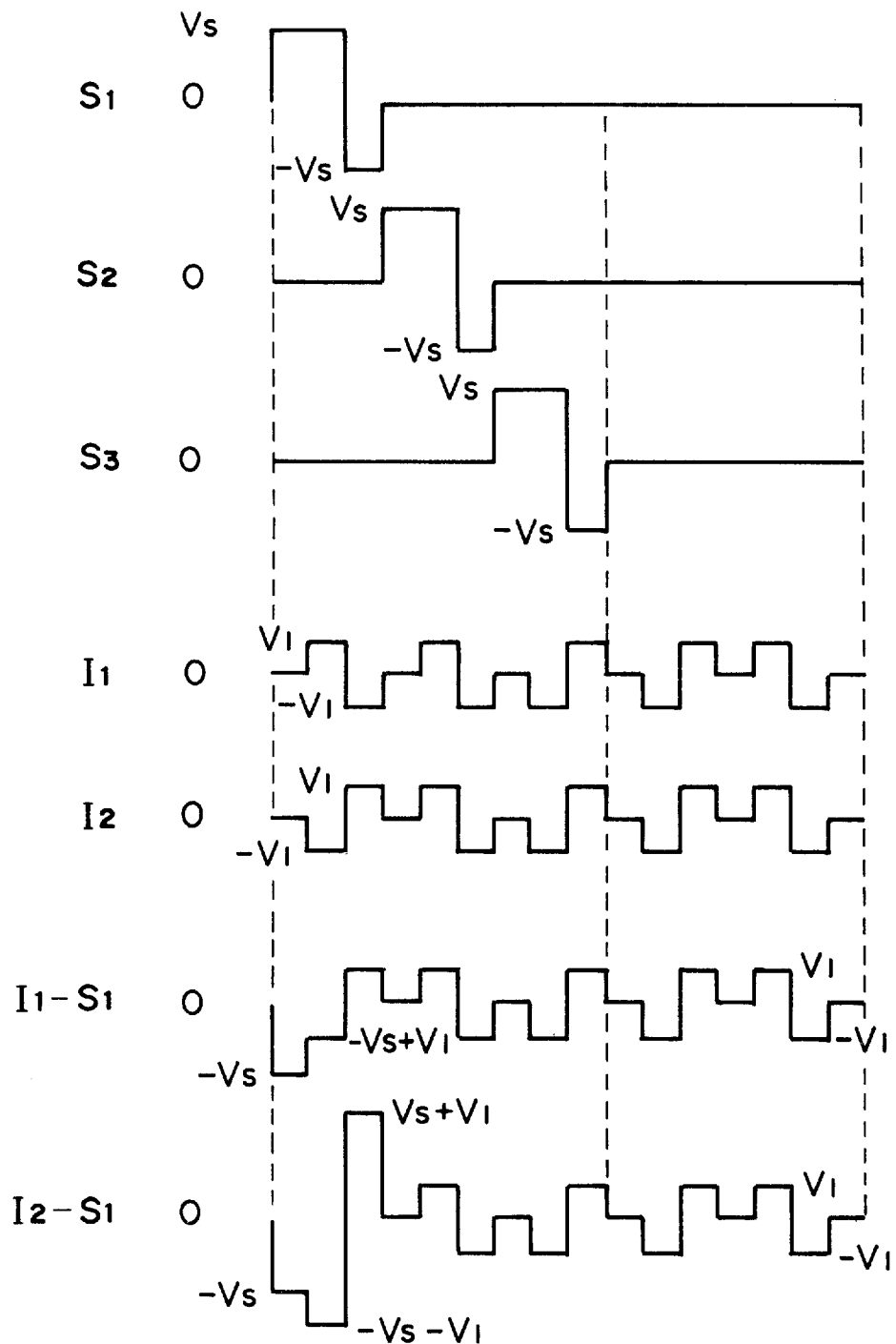

FIGS. 6A and 6B are waveform diagrams showing an example set of driving waveforms used in such a driving method. FIG. 5 is a plan view showing an electrode matrix used in a chiral smectic liquid crystal panel 51 of a simple matrix-type. The liquid crystal panel 51 shown in FIG. 5 includes scanning electrodes 52 ($S_1, S_2, S_3, \ldots S_m$) and data electrodes 53 ($I_1, I_2, I_3, \ldots I_n$) intersecting each other so as to constitute a pixel at each intersection together with a chiral smectic liquid crystal disposed between the scanning electrodes 52 and data electrodes 53.

Figure 4:
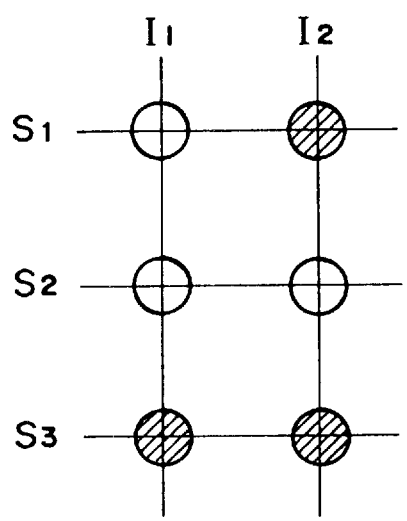
FIG. 4 is an illustration of a display pattern obtained by an actual drive using the time-serial waveforms shown in FIG. 6B.

Referring to FIG. 6A, at $S_S$ is shown a selection scanning signal waveform applied to a selected scanning line, at $S_N$ is shown a non-selection scanning signal waveform applied to a non-selected scanning line, at $I_S$ is shown a selection data signal waveform (providing a black display state) applied to a selected data line, and at $I_N$ is shown a non-selection data signal waveform applied to a non-selected data line. Further, at $I_S$–$S_S$ and $I_N$–$S_S$ in the figure are shown voltage waveforms applied to pixels on a selected scanning line, whereby a pixel supplied with the voltage $I_S$–$S_S$ assumes a black display state and a pixel supplied with the voltage $I_N$–$S_S$ assumes a white display state. FIG. 6B shows a time-serial waveform used for providing a display state as shown in FIG. 4.

In the driving embodiment shown in FIGS. 6A and 6B, a minimum duration (application time) $\Delta t$ of a single polarity voltage applied to a pixel on a selected scanning line corresponds to the period of a writing phase $t_2$, and the period of a one-line clearing phase $t_1$ is set to $2\Delta t$.

The parameters $V_S$, $V_I$ and $\Delta t$ in the driving waveforms shown in FIGS. 6A and 6B are determined depending on switching characteristics of a liquid crystal material used.

Figure 7:
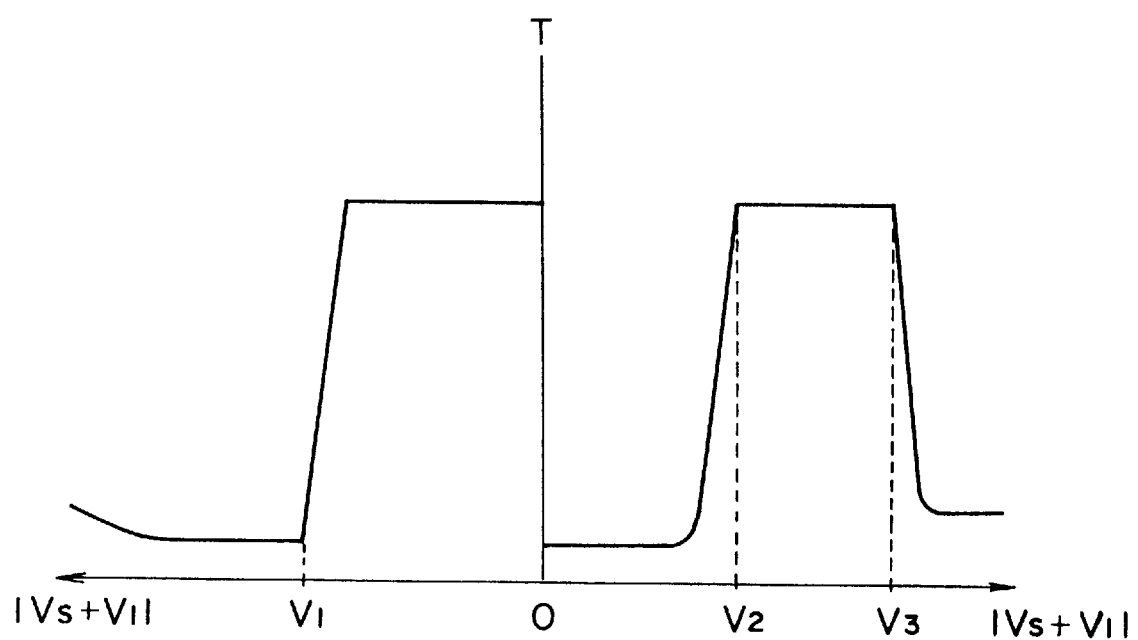
FIG. 7 is a V-T characteristic chart showing a change in transmittance under application of different drive voltages.

FIG. 7 shows a V–T characteristic, i.e., a change in transmittance T when a driving voltage denoted by ($V_S+V_I$) is changed while a bias ratio as mentioned hereinbelow is kept constant. In this embodiment, the parameters are fixed at constant values of $\Delta t=50$ $\mu s$ and a bias ratio $V_I/(V_I+V_S)$ =1/3. On the right side of FIG. 7 is shown a result when the voltage ($I_N$–$S_S$) shown in FIG. 6A is applied to a pixel concerned, and on the left side of FIG. 8 is shown a result when the voltage ($I_S$–$S_S$) is applied to a pixel concerned, respectively while increasing the voltage ($V_S+V_I$). On both sides of the ordinate, the absolute value of the voltage ($V_S+V_I$) is separately indicated. At ($I_N$–$S_S$) and ($I_S$–$S_S$), a previous (display) state is cleared by applying a voltage $V_R$ and a subsequent (display) state is determined by voltages $V_B^1$ and $V_B^2$, respectively. Referring to FIG. 8, a relationship of $V_2<V_1<V_3$ holds. The voltage $V_1$ may be referred to as a threshold voltage in actual drive and the voltage $V_3$ may be referred to as a crosstalk voltage. More specifically, as shown in FIG. 6A, a voltage $V_1$ denotes a voltage value causing switching by applying a voltage signal $V_B^2$ and a voltage $V_3$ denotes a voltage value causing switching by applying a voltage signal $V_B^1$. Further, a voltage $V_2$ denotes a voltage value required for clearing the previous state by applying a voltage signal $V_R$. The crosstalk voltage $V_3$ is generally present in actual matrix drive of a ferroelectric liquid crystal device. In an actual drive, $\Delta V=(V_3-V_1)$ provides a range of $|V_S+V_I|$ allowing a matrix drive and may be referred to as a (drive) voltage margin, which is preferably large enough. It is of course possible to increase the value of $V_3$ and thus $\Delta V$ (=$V_3-V_1$) by increasing the bias ratio (i.e., by causing the bias ratio to approach a unity). However, a large bias ratio corresponds to a large amplitude of a data signal and leads to an increase in flickering and a lower contrast, thus being undesirable in respect of image quality. According to our study, a bias ratio of about 1/3–1/4 was practical. On the other hand, when the bias ratio is fixed, the voltage margin $\Delta V$ strongly depends on the switching characteristics of a liquid crystal material used, and it is needless to say that a liquid crystal material providing a large $\Delta V$ is very advantageous for matrix drive.

Further, it is possible to drive the liquid crystal device by changing a voltage application time (duration) $\Delta t$ while keeping the driving voltage ($V_I+V_S$) so as to provide a certain (constant) value. In this case, the drive characteristic of the liquid crystal device can be evaluated in terms of a duration margin (voltage application time margin) $\Delta T=\Delta t_2-\Delta t_1$ wherein $\Delta t_1$ denotes a threshold duration and $\Delta t_2$ denotes a crosstalk duration. The duration margin $\Delta T$ means a duration allowing a matrix drive under application of a certain driving voltage ($V_I+V_S$).

The upper and lower limits of application voltages or durations and a difference therebetween (driving voltage margin $\Delta V$ or duration margin $\Delta T$) by which selected pixels are written in two states of "black" and "white" and non-selected pixels can retain the written "black" and "white" states at a constant temperature as described above, vary depending on and are intrinsic to a liquid crystal material used and a cell structure employed. Further, the driving margin (voltage or duration margin) is deviated according to a change in environmental temperature, so that optimum driving conditions should be required of an actual display apparatus in view of a liquid crystal material used, a cell (device) structure and an environmental temperature.

The parameters of an alignment characteristic, an apparent tilt angle ($\theta a$), a switching speed ($\mu sec$), a contrast (C/R ratio), a response retardation time (sec), and a volume resistivity ($\rho_{LC}$: ohm.cm) referred to herein are evaluated or measured in the following manner.

Alignment characteristic ("Alignment")

An alignment state of liquid crystal molecules is observed through a polarizing microscope immediately after drive of a liquid crystal device and after 3 hours of the drive, respectively.

Apparent tilt angle $\theta a$

A liquid crystal device sandwiched between right angle cross nicol polarizes is supplied with a single pulse of of one polarity exceeding the threshold voltage of a liquid crystal composition and is then rotated under no electric field horizontally relative to the polarizers to find a first extinction position. Then, the liquid crystal device is supplied with a single pulse of the opposite polarity exceeding the threshold voltage of the liquid crystal composition and is then rotated under no electric field relative to the polarizers to find a second extinction position. An apparent tilt angle σa is measured as a half of the angle between the first and second extinct positions.

Switching speed (response time)

A switching speed is obtained as a time ($\mu sec$) from voltage application until the transmittance change reaches 90% of the maximum under the application of a peak-to-peak voltage (Vpp) of 30 volts in combination with right-angle cross-nicol polarizers.

Contrast (C/R ratio)

Liquid crystal molecules within a liquid crystal device sandwiched between a pair of right-angle cross-nicol polarizers are placed in a first stable state at a constant light quantity of a light source (back light). Then, the liquid crystal device is rotated horizontally relative to the polarizers to find a first extinction position (a position providing the lowest transmittance), where a first transmittance (R) is measured by using a photomultiplier (available from Hamamatsu Photonics K.K.). Then, the liquid crystal molecules are placed in a second stable state by (bistable switching and the liquid crystal device is subjected to measurement of transmittance in a similar manner to obtain a second transmittance (C). A contrast is evaluated as a C/R ratio.

Response Retardation Time

Figure 8A:
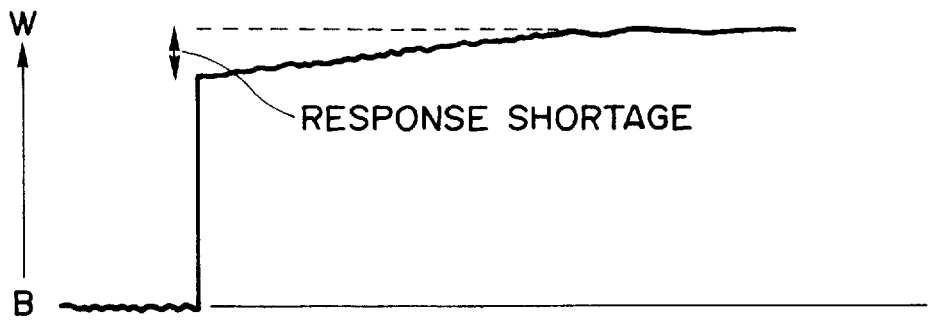
FIGS. 8A and 8B respectively a diagram for illustrating an optical response characteristic during switching when an electroconductive dopant is not added (FIG. 8A) and added (FIG. 8B), respectively.
Figure 8B:
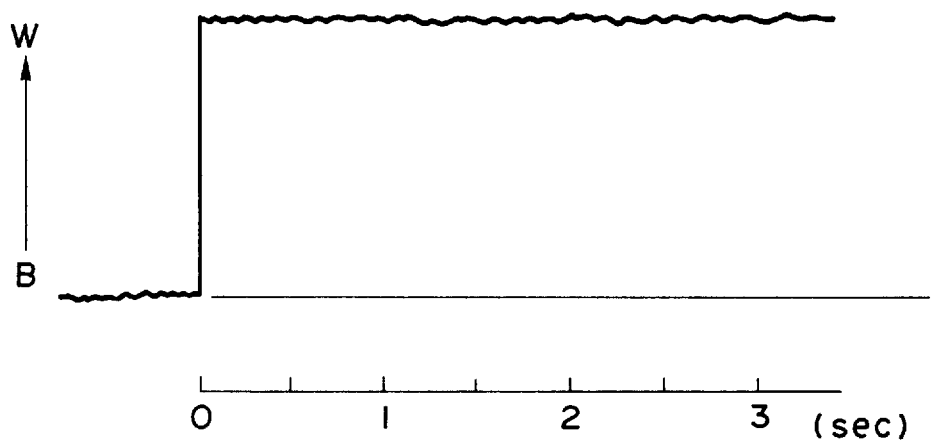

FIG. 8A shows a change in luminance (transmittance) based on a photomultiplier output signal level of "white" when a pulse voltage for switching into a "white" state is applied to a cell (liquid crystal device) which is arranged to show a "black" state under right-angle cross-nicol polarizers. In several seconds, the output signal level is lower than the prescribed "white" (saturation) level. We refer to this phenomenon as "shortage or retardation of response" leading to after image in a display region. A time from a pulse voltage application (1.2 times the threshold voltage) until the luminance reaches the prescribed "white" level is referred to as "response retardation time" and is measured by using an oscilloscope.

Volume resistivity (ρLC) (at 25° C.)

A resistivity of a liquid crystal layer ($R_{LC}$) is measured in the following manner. A rectangular wave is applied from a function generator to a cell (liquid crystal device) for resistivity measurement to which a Mylar capacitor (capacitance: Ci) is externally applied. The cell comprises an alignment control layer comprising a thin polyimide film (thickness: <50 Å) disposed on an ITO electrode. A voltage waveform applied to the cell measured through a buffer amplifier is given. At this time, a maximum voltage $V_0$ is attenuated to $V_0/e$ (e: the base of natural logarithm) in a time τ (sec) from the polarity inversion of the rectangular wave. At this time, the resistivity $R_{LC}$ is given by the following equation: $R_{LC}=\tau/(Ci+C_{LC})$ (ohm/cm$^2$), wherein $C_{LC}$ denotes a capacitance of a liquid crystal layer. The volume resistivity $\rho_{LC}$ is obtained according to the following equation: $\rho_{LC}= R_{LC} \cdot S/d_{LC}$, wherein S denotes an electrode area and $d_{LC}$ denotes a thickness of a liquid crystal layer.

Hereinbelow, the present invention will be described more specifically based on Examples. It is however to be understood that the present invention is not restricted to these Examples.

Example 1 and Comparative Example 1

Two 1.1 mm-thick glass substrates each provided with a ca. 150 nm-thick ITO film were provided, and further coated with alignment control films by spin coating under different conditions.

More specifically, one substrate (first substrate) was coated with a solution in an N-methylpyrrolidone/n-butyl cellosolve (=2/1) mixture solvent containing 1.7 wt. % (as solid) of a polyamic acid as a precursor to a polyimide ("LP-64", available from Toray K.K.), followed by hot baking to form a 20 nm-thick polyimide alignment film, which was then rubbed with a nylon cloth as a uniaxial aligning treatment.

The other substrate (second substrate) was coated with 0.5 wt. %-solution in ethanol of a silane coupling agent ("ODS-E", mfd. by Chisso K.K.) by spin coating followed by pre-drying and hot-drying.

Then, spacer silica beads of 2.0 μm in average diameter were dispersed on the second substrate and the first substrate was superposed thereon to form a blank cell, which was then filled with each of liquid crystal compositions $\alpha_1$ and β (preferred in the manner shown below) under vacuum, followed by cooling at a rate of 0.5° C./min. from an isotropic phase temperature to room temperature to produce liquid crystal devices $X_1$ and Y, respectively.

The liquid Crystal composition $\alpha_1$ (for Comparative Example 1) used in the liquid crystal device $X_1$ was prepared by mixing the following compounds in the indicated proportions.

| | Structural Formula | wt. parts |
|---|---|---|
| A: | $C_8H_{17}$—[pyrimidine ring]—[phenyl ring]—$OCH_2CF_2OCF_2CF_2OC_4F_9$ | 52 |

(phase transition)

$S_X \xrightarrow{-8} S_C \xrightarrow{50} S_A \xrightarrow{75} Iso$ (°C.)

| | | |
|---|---|---|
| $B_1$: | $C_8H_{17}$—[pyrimidine ring]—[phenyl ring]—$OCH_2C_7F_{15}$ | 10 |

$S_X \xrightarrow{71} S_C \xrightarrow{80} S_A \xrightarrow{117} Iso$ (°C.)

| | | |
|---|---|---|
| $B_2$: | $C_9H_{19}$—[pyrimidine ring]—[phenyl ring]—$OCH_2C_7F_{15}$ | 15 |

$S_X \xrightarrow{71} S_C \xrightarrow{85} S_A \xrightarrow{112} Iso$ (°C.)

-continued

| Structural Formula | wt. parts |
|---|---|
| $B_3$: $C_{10}H_{21}-\bigcirc(N,N)-\bigcirc-OCH_2C_7F_{15}$ $S_X \xrightarrow{75} S_C \xrightarrow{87} S_A \xrightarrow{104} Iso \ (°C.)$ | 15 |
| $C_1$: $C_6H_{13}-\bigcirc-\bigcirc-CO-O-*\bigcirc*-OC_6H_{13}$ with $CF_3$ | 3 |
| $C_2$: $C_8H_{17}O-\bigcirc(N,N)-\bigcirc-OCH_2-*-O-CO-C(CH_3)(CH_3)$ | 5 |

In the above phase transition series, Sx denotes a smectic phase (unidentified); Sc denotes a smectic C phase; $S_A$ denotes a smectic A phase; and Iso denotes an isotropic phase.

The liquid Crystal composition β (for Example 1) used in the liquid crystal device Y was prepared by adding 1 wt. % of a resistivity-modifying substance (electroconductive dopant) of the formula shown below to the above-prepared liquid crystal composition α1.

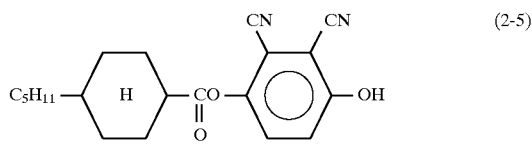

(2-5)

The liquid crystal compositions $\alpha_1$ and β respectively showed a spontaneous polarization Ps of about 40 (nC/cm²) at 30° C.

Then, the liquid crystal device Y (using the composition β for Example 1) and the liquid crystal device $X_1$ (using the composition $\alpha_1$ for Comparative Example 1) were evaluated with respect to several items according to the above-described manner when driven.

The results are shown below.
Ex. 1 (Device Y using Composition β):

| Evaluation item | Immediately after driving | After 3 hours |
|---|---|---|
| Alignment | monodomain | monodomain |
| θa (deg.) | 24.6 | 24.6 |
| Switching time (μsec) | 53 | 53.5 |
| C/R ratio | 55 | 53 |
| $\rho_{LC}$ (ohm · cm) | 3.2 × 10⁹ | |

Comp. Ex. 1 (Device $X_1$ using Composition $\alpha_1$):

| Evaluation item | Immediately after driving | After 3 hours |
|---|---|---|
| Alignment | monodomain | streak defect |
| θa (deg.) | 24.9 | 25.5 |

-continued

| Evaluation item | Immediately after driving | After 3 hours |
|---|---|---|
| Switching time (μsec) | 59 | switching failure*1 |
| C/R ratio | 50 | 32 |
| $\rho_{LC}$ (ohm · cm) | 8.9 × 10¹⁰ | |

*1 Switching failure was confirmed at a part of a display region.

As apparent from the above results of Example 1 and Comparative Example 1, the liquid crystal device Y of the present invention provided a high contrast, a high response speed and a good alignment characteristic free from an occurrence of alignment deterioration (layer structure failure or breaking) confirmed as streak defects.

EXAMPLE 2 AND COMPARATIVE EXAMPLE 2

Two 1.1 mm-thick glass substrates each provided with a ca. 150 nm-thick ITO film were provided, and further each coated with a solution in an N-methylpyrrolidone/n-butyl cellosolve (=2/1) mixture solvent containing 0.7 wt. % (as solid) of a polyamic acid as a precursor to a polyimide ("LP-64", available from Toray K.K.), followed by hot baking to form a 5 nm-thick polyimide alignment film, respectively, which was then rubbed with a nylon cloth as a uniaxial aligning treatment.

Then, spacer silica beads of 2.0 μm in average diameter were dispersed on one of the substrates and the other substrate was superposed thereon to form a blank cell, which was then filled with each of liquid crystal compositions $\alpha_2$ and (preferred in the manner shown below) under vacuum, followed by cooling at a rate of 0.5° C./min. from an isotropic phase temperature to room temperature to produce liquid crystal devices $X_2$ and Z, respectively.

The liquid Crystal composition $\alpha_2$ (for Comparative Example 2) used in the liquid crystal device $X_2$ was prepared by mixing the following compounds in the indicated proportions.

| Structural Formula | wt. parts |
|---|---|
| A: $C_8H_{17}$—[pyrimidine]—[phenyl]—$OCH_2CF_2OCF_2CF_2OC_4F_9$ | 52 |
| (phase transition) $S_X \xrightarrow{-8} S_C \xrightarrow{50} S_A \xrightarrow{75} Iso$ (°C.) | |
| $B_1$: $C_8H_{17}$—[pyrimidine]—[phenyl]—$OCH_2C_7F_{15}$ | 15 |
| $S_X \xrightarrow{71} S_C \xrightarrow{80} S_A \xrightarrow{117} Iso$ (°C.) | |
| $B_2$: $C_9H_{19}$—[pyrimidine]—[phenyl]—$OCH_2C_7F_{15}$ | 10 |
| $S_X \xrightarrow{71} S_C \xrightarrow{85} S_A \xrightarrow{112} Iso$ (°C.) | |
| $B_3$: $C_{10}H_{21}$—[pyrimidine]—[phenyl]—$OCH_2C_7F_{15}$ | 15 |
| $S_X \xrightarrow{75} S_C \xrightarrow{87} S_A \xrightarrow{104} Iso$ (°C.) | |
| $C_1$: $C_6H_{13}$—[phenyl]—[phenyl]—CO-O—*CH—O—*CH—*CH($CF_3$)—$OC_6H_{13}$ | 3 |
| $C_2$: $C_8H_{17}O$—[pyrimidine]—[phenyl]—$OCH_2$—*CH—O—CO—C($CH_3$)($CH_3$) | 5 |

The liquid Crystal composition γ (for Example 2) used in the liquid crystal device Z was prepared by adding 1 wt. % of a resistivity-modifying substance (electroconductive dopant) of the formula shown below to the above-prepared liquid crystal composition $\alpha_2$.

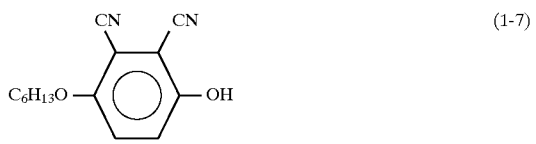

(1-7)

The liquid crystal compositions $\alpha_2$ and γ respectively showed a spontaneous polarization Ps of about 40 (nC/cm²) at 30° C.

Then, the liquid crystal device Z (using the composition γ for Example 2) and the liquid crystal device $X_2$ (using the composition $\alpha_2$ for Comparative Example 2) were evaluated with respect to several items according to the above-described manner when driven.

The results are shown below.

| | Ex. 2 | Comp. Ex. 2 |
|---|---|---|
| Device used | Device Z | Device $X_2$ |
| θa (deg.) | 24.7 | 24.9 |
| C/R ratio | 50 | 35 |
| Switching time (μsec) | 50 | 65 |
| Retardation time (sec) | 0.1 | >2 |
| $\rho_{LC}$ (ohm · cm) | $2.2 \times 10^9$ | $9.3 \times 10^{10}$ |

Further, in the liquid crystal device Z (for Ex. 2), a monodomain alignment state was observed at a time immediately after driving and also at a time after 3 hours of driving. However, the liquid crystal device $X_2$ (for Comp. Ex. 2) caused streak defects after 3 hours of driving although a monodomain alignment state was observed at a time immediately after driving.

COMPARATIVE EXAMPLES 3 AND 4

Liquid crystal devices V and W (for Comp. Ex. 3 and 4, respectively) were prepared and evaluated in the same manner as in Comparative Example 2 (using Composition $\alpha_1$) and Example 2 (using Composition γ), respectively, except that the 5 nm-thick polyimide alignment film was changed to a 50 nm-thick 6,6-nylon alignment film.

The results are shown below.

|  | Comp. Ex. 4 | Comp. Ex. 3 |
|---|---|---|
| Device used | Device W | Device V |
| θa (deg.) | 24.7 | 24.9 |
| C/R ratio | 35 | No bistability |
| Switching time (μsec) | 85 | " |
| Retardation time (sec) | 1.5 | " |

As apparent from the above results of Example 2 and Comparative Examples 2–4, the liquid crystal device Y of the present invention provided a high contrast and a high response speed while suppressing an afterimage phenomenon.

EXAMPLE 3

A liquid crystal device was prepared in the same manner as in Example 2 except that the liquid crystal composition γ was changed to a liquid crystal composition prepared by mixing 0.1 wt. % of a resistivity-modifying substance (Ex. Comp. No. 3-30) to the liquid crystal composition $\alpha_2$.

The thus-prepared liquid crystal device showed a response retardation time of 0.3 sec and provided a monodomain alignment state after 3 hours of driving similarly as in an initial stage of driving.

As described hereinabove, according to the present invention, there is provided a liquid crystal device using a specific cell structure and a specific liquid crystal composition capable of exhibiting a bookshelf structure or a structure closer thereto having a small layer inclination angle, so that it is possible to provide improved performances including a high responsiveness, a high contrast ratio, a large picture area, a high definition, a high brightness, a high display quality and an excellent durability. Further, the liquid crystal device is effective in providing a liquid crystal apparatus with a high brightness and a high contrast.

What is claimed is:

1. A liquid crystal device, comprising: a pair of substrates each having thereon at least an electrode and an alignment control layer, and a liquid crystal composition disposed between the substrates, wherein at least one of the alignment control layers has a thickness of at most 200 Å, and the liquid crystal composition comprises at least one species of a fluorine-containing mesomorphic compound in an amount of at least 70 wt. % comprising a fluorocarbon terminal portion and a hydrocarbon terminal portion, the terminal portions being connected with a central core, and having smectic mesophase or latent smectic mesophase, and comprises at least one species of a resistivity-modifying substance, wherein the fluorine-containing mesomorphic compound comprises a compound having a fluorocarbon terminal portion containing at least one catenary ether oxygen atom in an amount of at least 30 wt. % based on the liquid crystal composition.

2. A device according to claim 1, wherein at least one of the alignment control layer has a thickness of at most 100 Å.

3. A device according to claim 1, wherein said at least one of the alignment control layers comprises polyimide.

4. A device according to claim 1, wherein the pair of substrates have been subjected to mutually different aligning treatments.

5. A device according to claim 1, wherein said fluorocarbon terminal portion in the fluorine-containing mesomorphic compound is represented by the formula —$D^1$—$C_{xa}F_{2xa}$—X, where xa is 1–20; X is —H or —F; —$D^1$— is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—$N(C_{pa}H_{2pa+1})$—$SO_2$— or —$(CH_2)_{ra}$—$N(C_{pa}H_{2pa+1})$—CO— where ra and rb are independently 1–20; and pa is 0–4.

6. A device according to claim 1, wherein said fluorocarbon terminal portion containing at least one catenary ether oxygen atom is represented by the formula —$D^2$—$(C_{xb}F_{2xb}$—O$)_{za}$—$C_{ya}F_{2ya+1}$, where xb is independently 1–10 for each $(C_{xb}F_{2xb}$—O$)$; ya is 1–10; za is 1–10; —$D^2$— is —CO—O—$C_{rc}H_{2rc}$, —O—$C_{rc}H_{2rc}$—, —$C_{rc}H_{2rc}$—, —O—$(C_{sa}H_{2sa}$—O$)_{ta}$—$C_{rd}H_{2rd}$—, —O—$SO_2$—, —$SO_2$—, —$SO_2$—$C_{rc}H_{2rc}$—, —$C_{rc}H_{2rc}$—$N(C_{pb}H_{2pb+1})$—$SO_2$—, —$C_{rc}H_{2rc}$—$N(C_{pb}H_{2pb+1})$—CO—, or a covalent bond where rc and rd are independently 1–20; sa is independently 1–10 for each $(C_{sa}H_{2sa}$—O$)$; ta is 1–6; and pb is 0–4.

7. A device according to claim 1, wherein said fluorine-containing mesomorphic compound is represented by the following general formula (I):

Formula (I):

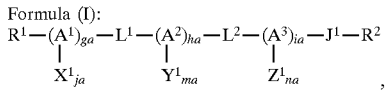

wherein $A^1$, $A^2$ and $A^3$ are each independently

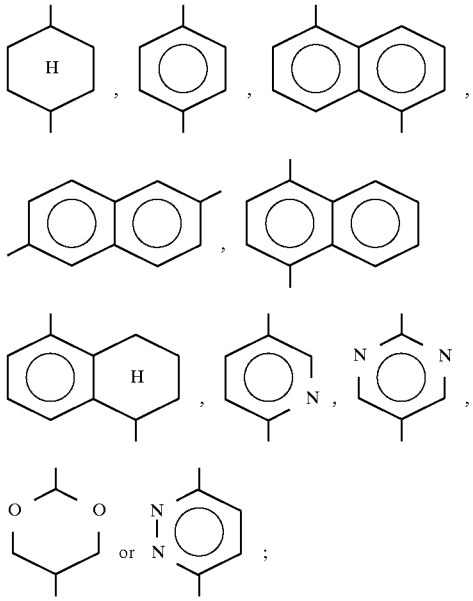

ga, ha and ia are independently an integer of 0–3 with the proviso that the sum of ga+ha+ia be at least 2;

$L^1$ and $L^2$ are independently a covalent bond, —CO—O—, —O—CO—, —COS—, —S—CO—, —CO—Se—, —Se—CO—, —CO—Te—, —Te—CO—, —$CH_2CH_2$—, —CH=CH—, —C≡C—, —CH=N—, —N=CH—, —$CH_2$—O—, —O—$CH_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —$OCH_3$, —$CH_3$, —CN or —$NO_2$;

each ja, ma and na are independently an integer of 0–4;

J$^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO— where ra and rb are independently 1–20, and pa is 0–4;

R$^1$ is —O—C$_{qa}$H$_{2qa}$—O—C$_{qb}$H$_{2qb+1}$, —C$_{qa}$H$_{2qa}$—O—C$_{qb}$H$_{2qb+1}$, —C$_{qa}$H$_{2qa}$—R$^3$, —O—C$_{qa}$H$_{2qa}$—R$^3$, —CO—O—C$_{qa}$H$_{2qa}$—R$^3$, or —O—CO—C$_{qa}$H$_{2qa}$—R$^3$ which may be either straight chain or branched where R$^3$ is —O—CO—C$_{qb}$H$_{2qb+1}$, —CO—O—C$_{qb}$H$_{2qb+1}$, —H, —Cl, —F, —CF$_3$, —NO$_2$ or —CN; and qa and qb are independently 1–20; and R$^2$ is C$_{xa}$F$_{2xa}$—X, wherein X is —H or —F, xa is an integer of 1–20.

8. A device according to claim 1, wherein said compound having a fluorocarbon terminal portion containing at least one catenary ether oxygen atom is represented by the general formula (II):

Formula (II):
R$^4$—(A$^4$)$_{gb}$—L$^3$—(A$^5$)$_{hb}$—L$^4$—(A$^6$)$_{ib}$—J$^2$—R$^5$
       |           |           |
      X$^2_{jb}$      Y$^2_{mb}$      Z$^2_{nb}$ where A$^4$, A$^5$ and A$^6$ are each independently denote

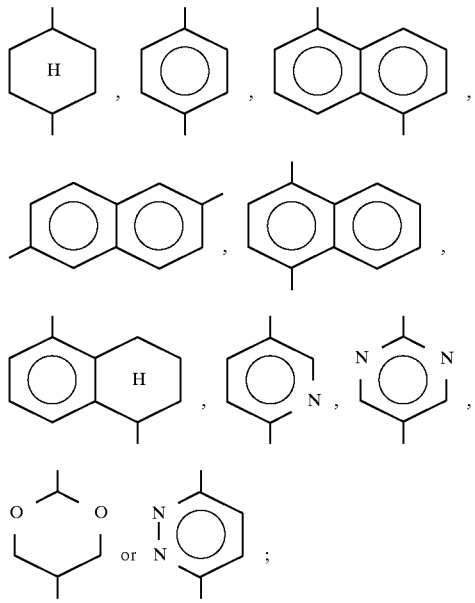

gb, hb and ib are each independently an integer of 0–3 with the proviso that the sum of gb+hb+ib be at least 2;

each L$^3$ and L$^4$ are independently a single bond, —CO—O—, —O—CO—, —CO—S—, —S—CO—, —CO—Se—, —Se—CO—, —CO—Te—, —Te—CO—, —(CH$_2$CH$_2$)$_{ka}$—(ka is 1–4), —CH=CH—, —C≡C—, —CH=N—, —N=CH—, —CH$_2$—O—, —O—CH$_2$—, —CO— or —O—;

X$^2$, Y$^2$ and Z$^2$ are each a substituent of A$^4$, A$^5$ and A$^6$, respectively, and each X$_2$, Y$_2$ and Z$_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

J$^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO— where rc and rd are independently 1–20; sa is independently 1–10 for each (C$_{sa}$H$_{2sa}$—O), ta is 1–6; pb is 0–4;

R$^4$ is —O—(C$_{qc}$H$_{2qc}$—O)$_{wa}$—C$_{qb}$H$_{2qb+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched where R$^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently 1–20; wa is 1–10; and R$^5$ is (C$_{xb}$F$_{2xb}$—O)$_{za}$—C$_{ya}$F$_{2ya+1}$, where xb is independently 1–10 for each (C$_{xb}$F$_{2xb}$—O); ya is 1–10; and za is 1–10.

9. A device according to claim 7, wherein said fluorine-containing mesomorphic compound represented by the formula (I) has a central core containing benzene ring and pyrimidine ring.

10. A device according to claim 8, wherein said compound represented by the formula (II) has a central core containing benzene ring and pyrimidine ring.

11. A device according to claim 1, wherein said liquid crystal composition comprises said compound having a fluorocarbon terminal portion containing at least one catenary ether oxygen atom in an amount of at least 50 wt. %.

12. A device according to claim 1, wherein said liquid crystal composition comprises said resistivity-modifying substance in an amount of 0.01–5 wt. %.

13. A device according to claim 1, wherein said liquid crystal composition is a chiral smectic liquid crystal composition.

14. A liquid crystal apparatus, including a liquid crystal device according to claim 1.

15. A liquid crystal device, comprising: a pair of substrates each having thereon at least an electrode and an alignment control layer, and a liquid crystal composition disposed between the substrates, wherein at least one of the alignment control layers comprises polyimide, the pair of substrates have been subjected to mutually different aligning treatments, and the liquid crystal composition comprises at least one species of a fluorine-containing mesomorphic compound in an amount of at least 70 wt. % comprising a fluorocarbon terminal portion and a hydrocarbon terminal portion, the terminal portions being connected with a central core, and having smectic mesophase or latent smectic mesophase, and comprises at least one species of a resistivity-modifying substance, wherein the fluorine-containing mesomorphic compound comprises a compound having a fluorocarbon terminal portion containing at least one catenary ether oxygen atom in an amount of at least 30 wt. % based on the liquid crystal composition.

16. A device according to claim 15, wherein said polyimide has a recurring unit represented by the following formula (P):

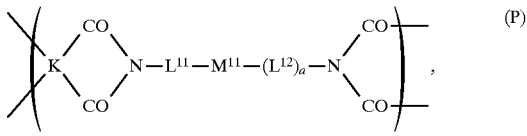

in which

K is

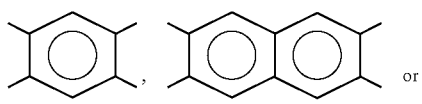

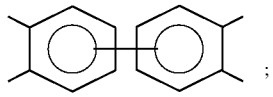

$L^{11}$ and $L^{12}$ independently denote

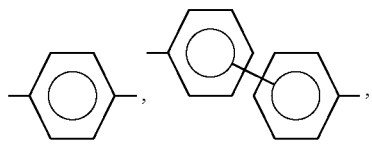

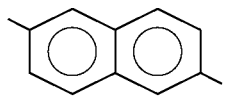

or an alkylene group having 1–20 carbon atoms;

$M^{11}$ is a single bond or —O—; and a is 0, 1 or 2.

17. A device according to claim 15, wherein said fluorocarbon terminal portion in the fluorine-containing mesomorphic compound is represented by the formula —$D^1$—$C_{xa}F_{2xa}$—X, where xa is 1–20; X is —H or —F; —$D^1$— is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—$N(C_{pa}H_{2pa+1})$—$SO_2$— or —$(CH_2)_{ra}$—$N(C_{pa}H_{2pa+1})$—CO— where ra and rb are independently 1–20; and pa is 0–4.

18. A device according to claim 15, wherein said fluorocarbon terminal portion containing at least one catenary ether oxygen atom is represented by the formula —$D^2$—$(C_{xb}F_{2xb}$—O$)_{za}$—$C_{ya}F_{2ya+1}$, where xb is independently 1–10 for each ($C_{xb}F_{2xb}$—O); ya is 1–10; za is 1–10; —$D^2$— is —CO—O—$C_{rc}H_{2rc}$—, —O—$C_{rc}H_{2rc}$—, —$C_{rc}H_{2rc}$—, —O—$(C_{sa}H_{2sa}$—O$)_{ta}$—$C_{rd}H_{2rd}$—, —O—$SO_2$—, —$SO_2$—, —$SO_2$—$C_{rc}H_{2rc}$—, —$C_{rc}H_{2rc}$—$N(C_{pb}H_{2pb+1})$—$SO_2$—, —$C_{rc}H_{2rc}$—$N(C_{pb}H_{2pb+1})$—CO—, or a covalent bond where rc and rd are independently 1–20; sa is independently 1–10 for each ($C_{sa}H_{2sa}$—O); ta is 1–6; and pb is 0–4.

19. A device according to claim 15, wherein said fluorine-containing mesomorphic compound is represented by the following general formula (I):

Formula (I):
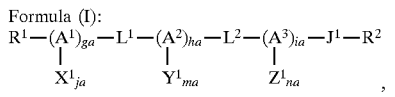

wherein $A^1$, $A^2$ and $A^3$ are each independently

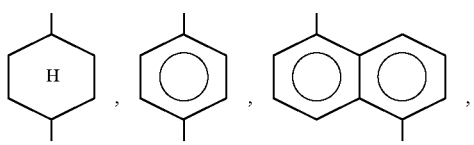

-continued

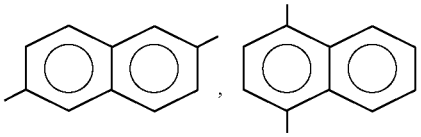

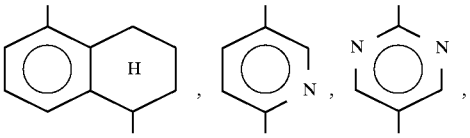

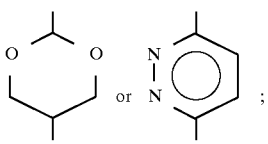

ga, ha and ia are independently an integer of 0–3 with the proviso that the sum of ga+ha+ia be at least 2;

$L^1$ and $L^2$ are independently a covalent bond, —CO—O—, —O—CO—, —COS—, —S—CO—, —CO—Se—, —Se—CO—, —CO—Te—, —Te—CO—, —$CH_2CH_2$—, —CH=CH—, —C≡C—, —CH=N—, —N=CH—, —$CH_2$—O—, —O—$CH_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —$OCH_3$, —$CH_3$, —CN or —$NO_2$;

each ja, ma and na are independently an integer of 0–4;

$J^1$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—$N(C_{pa}H_{2pa+1})$—$SO_2$— or —$(CH_2)_{ra}$—$N(C_{pa}H_{2pa+1})$—CO— where ra and rb are independently 1–20, and pa is 0–4;

$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}$—$R^3$, —O—$C_{qa}H_{2qa}$—$R^3$, —CO—O—$C_{qa}H_{2qa}$—$R^3$, or O—CO—$C_{qa}H_{2qa}$—$R^3$ which may be either straight chain or branched where $R^3$ is —O—CO—$C_{qb}H_{2qb+1}$, —CO—O—$C_{qb}H_{2qb+1}$, —H, —Cl, —F, —$CF_3$, —$NO_2$ or —CN; and qa and qb are independently 1–20; and $R^2$ is $C_{xa}F_{2xa}$—X, wherein X is —H or —F, xa is an integer of 1–20.

20. A device according to claim 15, wherein said compound having a fluorocarbon terminal portion containing at least one catenary ether oxygen atom is represented by the general formula (II):

Formula (II):
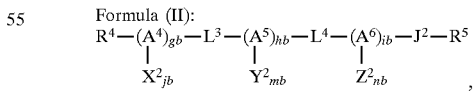

where $A^4$, $A^5$ and $A^6$ are each independently denote

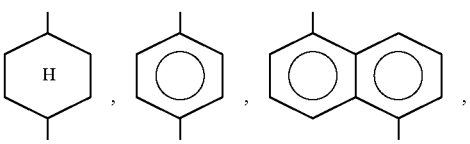

-continued

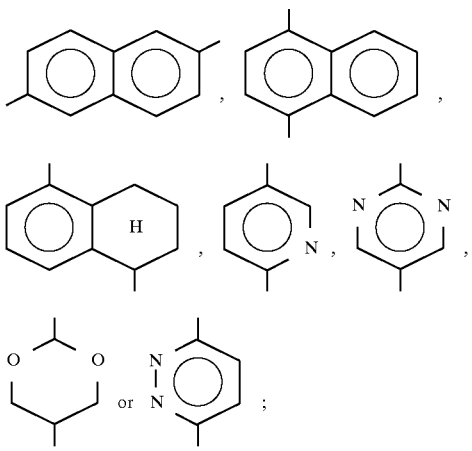

gb, hb and ib are each independently an integer of 0–3 with the proviso that the sum of gb+hb+ib be at least 2; each $L^3$ and $L^4$ are independently a single bond, —CO—O—, —O—CO—, —CO—S—, —S—CO—, —CO—Se—, —Se—CO—, —CO—Te—, —Te—CO—, —(CH$_2$CH$_2$)$_{ka}$—(ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$—N(C$_{pb}$H$_{2pb+1}$)—CO— where rc and rd are independently 1–20; sa is independently 1–10 for each (C$_{sa}$H$_{2sa}$—O), ta is 1–6; pb is 0–4;

$R^4$ is —O—(C$_{qc}$H$_{2qc}$—O)$_{wa}$—C$_{qb}$H$_{2qb+1}$, —(C$_{qc}$H$_{2q}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched where $R^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently 1–20; wa is 1–10; and $R^5$ is (C$_{xb}$F$_{2xb}$—O)$_{za}$—C$_{ya}$F$_{2ya+1}$, where xb is independently 1–10 for each (C$_{xb}$F$_{2xb}$—O); ya is 1–10; and za is 1–10.

21. A device according to claim 19, wherein said fluorine-containing mesomorphic compound represented by the formula (I) has a central core containing benzene ring and pyrimidine ring.

22. A device according to claim 20, wherein said compound represented by the formula (II) has a central core containing benzene ring and pyrimidine ring.

23. A device according to claim 15, wherein said liquid crystal composition comprises said compound having a fluorocarbon terminal portion containing at least one catenary ether oxygen atom in an amount of at least 50 wt. %.

24. A device according to claim 15, wherein said liquid crystal composition comprises said resistivity-modifying substance in an amount of 0.01–5 wt. %.

25. A device according to claim 15, wherein said liquid crystal composition is a chiral smectic liquid crystal composition.

26. A liquid crystal apparatus, including a liquid crystal device according to claim 15.

* * * * *

UNITED STATES PATENT AND TRADEMARK OFFICE
CERTIFICATE OF CORRECTION

PATENT NO. : 5,858,269

DATED : January 12, 1999

INVENTOR(S) : KENJI SHINJO ET AL.

It is certified that error appears in the above-identified patent and that said Letters Patent is hereby corrected as shown below:

On the title page: Item

[56] REFERENCES CITED

Primary Examiner
    "Shean C. Wo" should read --Shean C. Wu--.

U.S. Patent Documents
    In "M. Schadt...", "No. 4 Feb. 151,971," should read
      --No 4, Feb. 15, 1971,--.

Other Publications
    "Hanyu ete al." should read --Hanyu et al.--.

COLUMN 1

Line 34, "use" should be deleted.

COLUMN 2

Line 32, "bounary" should read --boundary--.

UNITED STATES PATENT AND TRADEMARK OFFICE
CERTIFICATE OF CORRECTION

PATENT NO. : 5,858,269

DATED : January 12, 1999

INVENTOR(S) : KENJI SHINJO ET AL.

It is certified that error appears in the above-identified patent and that said Letters Patent is hereby corrected as shown below:

COLUMN 3

Line 21, "conventinal" should read --conventional--.
    Line 34, "devie" should read --device--.

COLUMN 5

Line 12, "respectively" should read --respectively show--.

COLUMN 8

Line 26, "x$^2$," should read --X$^2$,--.
    Line 55, "descried" should read --described--.

COLUMN 9

Formula I-6, "$C_3F_{11}CH_2O-$" should read --$C_5F_{11}CH_2O-$--.

UNITED STATES PATENT AND TRADEMARK OFFICE
CERTIFICATE OF CORRECTION

PATENT NO. : 5,858,269

DATED : January 12, 1999

INVENTOR(S) : KENJI SHINJO ET AL.

It is certified that error appears in the above-identified patent and that said Letters Patent is hereby corrected as shown below:

COLUMN 33

Line 45, " 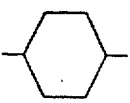 " should read --  --.

Line 49, "denotes" should read --denotes —O— --.

Line 58, "—CO—" should read ---CO— or -CH$_2$O-;--.
$\quad\quad\quad\quad\;\;\|\quad\quad\quad\quad\quad\quad\;\;\|$
$\quad\quad\quad\quad\;\,$O$\quad\quad\quad\quad\quad\quad\;$O

COLUMN 37

Line 64, "th" should read --the--.

COLUMN 42

Line 30, " 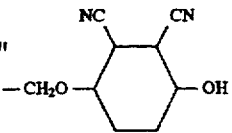 " should read -- 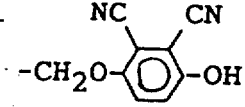 --.

UNITED STATES PATENT AND TRADEMARK OFFICE
CERTIFICATE OF CORRECTION

PATENT NO.   : 5,858,269

DATED        : January 12, 1999

INVENTOR(S)  : KENJI SHINJO ET AL.

It is certified that error appears in the above-identified patent and that said Letters Patent is hereby corrected as shown below:

COLUMN 42 CONTINUED

Line 45, "were" should read --was--.

COLUMN 43

Line 21, "toms," should read --atoms,--.

COLUMN 61

Line 25, "(case where $X_4$ is -O-)" should be deleted.
   Line 26, " ① when m is 0 or 1 and A is" should be deleted.

COLUMN 63

Line 14, "as" should read --was--.

COLUMN 64

Comp. III-1, "—$C_6H_{19}$" should read ---$C_6H_{13}$--.

UNITED STATES PATENT AND TRADEMARK OFFICE
CERTIFICATE OF CORRECTION

PATENT NO. : 5,858,269

DATED : January 12, 1999

INVENTOR(S) : KENJI SHINJO ET AL.

It is certified that error appears in the above-identified patent and that said Letters Patent is hereby corrected as shown below:

COLUMN 65

Comp. III-14, "$C_5H_{13}O-$" should read --$C_6H_{13}O-$--.

COLUMN 66

Comp. III-27, "$OC_6H_{13}-$" should read --$C_6H_{13}O-$ --.
   Comp. III-28, "$OC_6H_{13}-$" should read --$C_6H_{13}O-$--.

COLUMN 68

Comp. III-58, "$C_{13}H_{27}\backslash$" should read --$C_{15}H_{31}\backslash$ --.

COLUMN 69

Comp. III-70, "$C_8H_{17}O-$" should read --$C_6H_{13}O-$--.

COLUMN 70

Comp. III-72, "$C_6H_{17}O-$" should read --$C_8H_{17}O-$ --.
   Comp. III-73, "$C_6H_{17}O-$" should read --$C_{10}H_{21}O-$ -.

UNITED STATES PATENT AND TRADEMARK OFFICE
CERTIFICATE OF CORRECTION

PATENT NO. : 5,858,269

DATED : January 12, 1999

INVENTOR(S) : KENJI SHINJO ET AL.

It is certified that error appears in the above-identified patent and that said Letters Patent is hereby corrected as shown below:

COLUMN 70 CONTINUED

Comp. III-74, "$C_6H_{17}O-$" should read --$C_9H_{19}O-$--.
Comp. III-80, "$C_6H_{11}\underset{\underset{O}{\|}}{C}O-$" should read --$C_5H_{11}\underset{\underset{O}{\|}}{C}O-$--.

COLUMN 72

Comp. III-112, "$C_6H_{17}O-$" should read --$C_8H_{17}O-$--.

COLUMNS 73-74, TABLE A

No. 50, "TGz2 Phy" should read --Tz2 Ph--.
No. 81, "H" should read --My--.

COLUMN 81

After "respectively.", "PH:" should read --Ph:--.

COLUMN 83

Line 1, "P3TF:" should read --Ph3TF:--.

UNITED STATES PATENT AND TRADEMARK OFFICE
CERTIFICATE OF CORRECTION

PATENT NO. : 5,858,269

DATED : January 12, 1999

INVENTOR(S) : KENJI SHINJO ET AL.

It is certified that error appears in the above-identified patent and that said Letters Patent is hereby corrected as shown below:

COLUMN 87

Line C-9, "$C_{12}H_{26}O$" should read --$C_{12}H_{25}O$--.
Line C-19, " 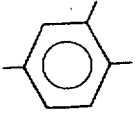 " should read -- 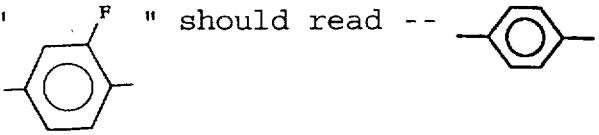 --.

COLUMN 94

Line 65, "fluorine containing" should read
--fluorine-containing--.

COLUMN 95

Line 38, "or an" should read --or a--.
Line 52, "such" should read --such as--.

COLUMN 96

Line 17, "applicably" should read --applicable--; and
"according" should read --according to--.

UNITED STATES PATENT AND TRADEMARK OFFICE
CERTIFICATE OF CORRECTION

PATENT NO. : 5,858,269
DATED : January 12, 1999
INVENTOR(S) : KENJI SHINJO ET AL.

It is certified that error appears in the above-identified patent and that said Letters Patent is hereby corrected as shown below:

COLUMN 97

Line 10, "" should read -- 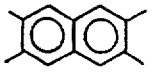 ; --.

COLUMN 102

Line 40, "right angle" should read --right-angle--.
Line 41, "cross nicol polarizes" should read
   --cross-nicol polarizers--.
Line 49, "δa" should read --θa--.

COLUMN 103

Line 20, "(ρLC)" should read --($\rho_{LC}$)--.

COLUMN 105

Form. $C_1$:, "$C_6H_{13}$—" should read --$C_6H_{13}O$— --.
Line 28, "Crystal" should read --crystal--.

UNITED STATES PATENT AND TRADEMARK OFFICE
CERTIFICATE OF CORRECTION

PATENT NO. : 5,858,269

DATED : January 12, 1999

INVENTOR(S) : KENJI SHINJO ET AL.

It is certified that error appears in the above-identified patent and that said Letters Patent is hereby corrected as shown below:

COLUMN 106

Line 33, "*1Switchinig" should read --*1: Switching--.

COLUMN 107

Form. $C_1$, "$C_6H_{13}-$" should read --$C_6H_{13}O-$--.
    Line 47, "Crystal" should read --crystal--.

COLUMN 111

Line 26, "are" should be deleted.
    Line 57, "—C—≡—" should read ---C≡ --.

COLUMN 114

Line 59, "are" should be deleted.

UNITED STATES PATENT AND TRADEMARK OFFICE
CERTIFICATE OF CORRECTION

PATENT NO.  : 5,858,269

DATED       : January 12, 1999

INVENTOR(S) : KENJI SHINJO ET AL.

It is certified that error appears in the above-identified patent and that said Letters Patent is hereby corrected as shown below:

<u>COLUMN 116</u>

Line 5, "$-(C_{qc}H_{2q}-$" should read $---(C_{qc}H_{2qc}-$ --.

Signed and Sealed this

Twentieth Day of June, 2000

Attest:

*Attesting Officer*

Q. TODD DICKINSON

*Director of Patents and Trademarks*